(12) United States Patent
Beshai et al.

(10) Patent No.: US 7,756,141 B1
(45) Date of Patent: Jul. 13, 2010

(54) BIMODAL BURST SWITCHING

(75) Inventors: Maged E. Beshai, Stittsville (CA); Bilel N. Jamoussi, Nashua, NH (US)

(73) Assignee: Nortel Networks Limited, St. Laurent, Quebec (CA)

( * ) Notice: Subject to any disclaimer, the term of this patent is extended or adjusted under 35 U.S.C. 154(b) by 301 days.

(21) Appl. No.: 11/858,373

(22) Filed: Sep. 20, 2007

(51) Int. Cl.
*H04L 12/28* (2006.01)
(52) U.S. Cl. ...................... 370/400; 709/239
(58) Field of Classification Search ............... 370/400; 709/239
See application file for complete search history.

(56) References Cited

U.S. PATENT DOCUMENTS

2003/0005152 A1* 1/2003 Diwan et al. ............... 709/239
2005/0055190 A1* 3/2005 Hosokawa ................. 703/14
2007/0212065 A1* 9/2007 Shin et al. ................. 398/45

* cited by examiner

*Primary Examiner*—Dang T Ton
*Assistant Examiner*—Wei Zhao
(74) *Attorney, Agent, or Firm*—Anderson Gorecki & Manaras LLP

(57) ABSTRACT

In a first mode of burst communication in a telecommunication network comprising electronic edge nodes interconnected by bufferless core nodes, data bursts are formulated at the edge nodes, respective burst descriptors are communicated to a controller of a core node, and burst-transfer schedules are sent from the core node to respective edge nodes. In a second mode, each burst-stream is allocated a flow rate and a core node determines burst sizes and schedules burst-transfer permits.

In a bimodal burst-switching network comprising edge nodes interconnected by core nodes, an edge node selects to send to a core node burst-transfer requests according to the first mode, or flow-rate-allocation requests according to the second mode, depending on proximity, storage capacity at the edge node, and delay-tolerance specifications.

17 Claims, 42 Drawing Sheets

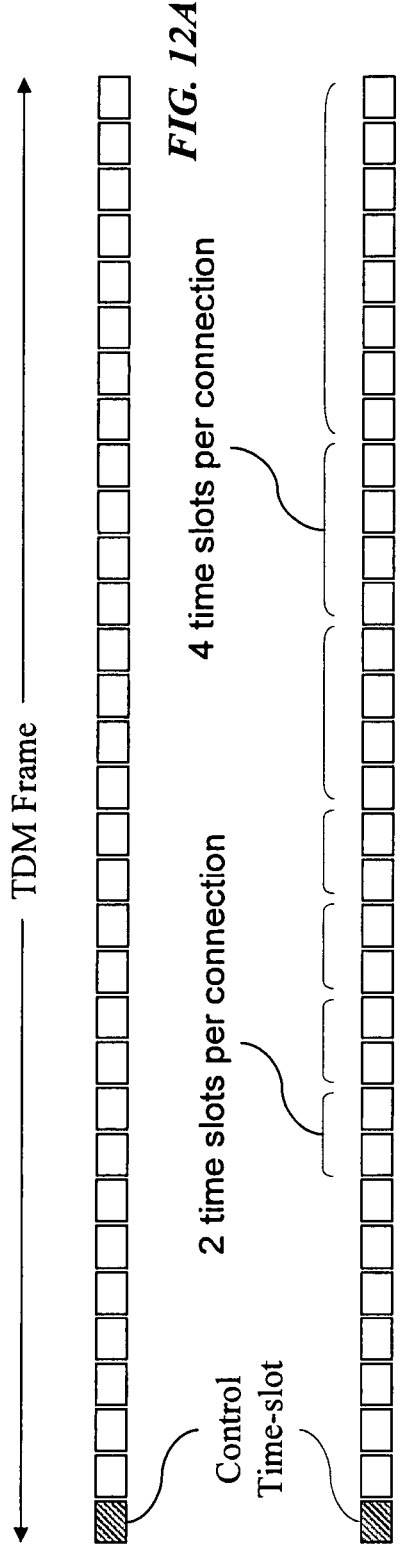
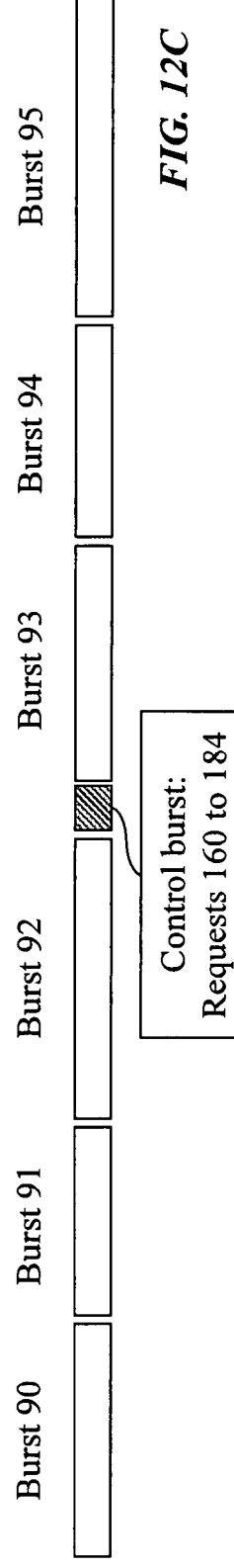
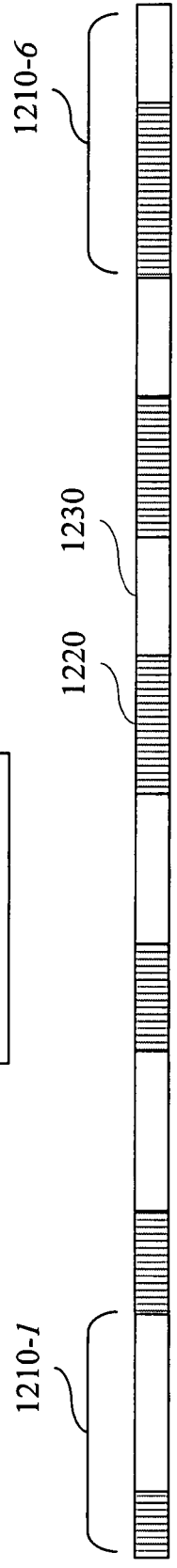
FIG. 12A
FIG. 12B
FIG. 12C
FIG. 12D

|  | 3610-7 | 3610-4 | 3610-3 | 3610-2 | 3610-1 |
|---|---|---|---|---|---|
| 3610-7 |  | 092000 (3740) |  | 000852 | 008824 |
| 3610-4 | 000000 |  |  | 000840 |  |
| 3610-3 | 012000 | 022000 |  | 012000 | 008000 |
| 3610-2 | 000000 | 004828 | 000920 |  |  |
| 3610-1 | 000820 |  | 001922 | 000242 |  |

Sending node            3610-2
Number of source nodes      4
    Source node         3610-1
    Destinations            3
        Sink node       3610-2
        Flow rate       000242
        Sink node       3610-3
        Flow rate       001922
        Sink node       3610-7
        Flow rate       000820
    Source node         3610-2
    Destinations            2
        Sink node       3610-3
        Flow rate       000920
        Sink node       3610-7
        Flow rate       012000
    Source node         3610-3
    Destinations            1
        Sink node       3610-2
        Flow rate       012000
    Source node         3610-7
    Destinations            1
        Sink node       3610-1
        Flow rate       008824

*FIG. 42A*

Sending node            3610-2
Number of source nodes      4
    Source node         3610-2
    Destinations            3
        Sink node       3610-1
        Flow rate       008000
        Sink node       3220-4
        Flow rate       004828
    Source node         3610-3
    Destinations            2
        Sink node       3610-4
        Flow rate       022000
        Sink node       3610-7
        Flow rate       012000
    Source node         3610-4
    Destinations            2
        Sink node       3610-2
        Flow rate       000840
        Sink node       3610-7
        Flow rate       000000
    Source node         3610-7
    Destinations            2
        Sink node       3610-2
        Flow rate       000852
        sink node       3610-4
        Flow rate       092000

*FIG. 42B*

BIMODAL BURST SWITCHING

FIELD OF THE INVENTION

The present invention relates to data networks and, in particular, to a high-performance burst-switching network having low burst-transfer delay and zero burst loss.

BACKGROUND

Prior-art optical burst switching has two main drawbacks: burst-transfer latency and burst loss. In a closed-loop scheme, a source node sends a request to a core node for transferring a burst, the request including a destination and size of the burst, and waits for a message from the core node, where the message acknowledges that the optical switch in the core node is properly configured, before sending the burst. In an open-loop scheme, the burst follows the burst transfer request after a predetermined time period, presumably sufficient to schedule the burst transfer across the core, and it is expected that, when the burst arrives at the core node, the controller of the core node would have set up an internal path through the optical switch to a target output port of the optical switch. The main drawback of this technique is the uncertainty of the fate of a burst thus transmitted. Even if a very long time gap is kept between a burst-transfer request and the data burst itself, the lack of buffers at the core node may result in burst loss and a significant idle time.

Thus, in the closed-loop scheme, the time delay experienced in sending a burst transfer request and receiving an acceptance before sending a burst may be unacceptably high, leading to idle waiting periods and low network utilization in addition to requiring large storage at the edge nodes. In the open-loop scheme, a burst may arrive at a core node before the optical switch can be configured to switch the burst and the burst may be lost. Furthermore, the fact that the burst has been lost at the core node remains unknown to the source node for some time and a lost burst would have to be sent again after a predefined interval of time.

In a wide-coverage network, the round-trip propagation delay from an edge node, comprising a paired source node and a sink node, to a core node can be of the order of tens of milliseconds. This renders closed-loop burst scheduling inappropriate. In closed-loop switching, a source node and a core node must exchange messages to determine the transmission time of each burst. The high round-trip delay requires that the source node have sizeable buffer storage. On the other hand, open-loop burst scheduling, which overcomes the delay problem, can result in substantial burst loss due to unresolved contention at the core nodes. It is desirable that data bursts formation at the source nodes and subsequent transfer to respective optical core nodes be performed with low delay, and that burst transfer across the core be strictly loss-free. It is also desirable that the processing effort and transport overhead be negligibly small.

Applicant's U.S. patent application Ser. No. 09/750,071, filed on Dec. 29, 2000 and titled "Burst Switching in a High-Capacity Network", discloses a method of burst switching where burst transfer requests from edge nodes are sent to a core-node controller which determines a schedule for conflict-free burst switching through the core node. Scheduling information is distributed to the sources of the burst transfer requests and to a configuration controller of the core node. Instead of handling burst requests one-by-one, burst requests are pipelined and the handling of the bursts is scheduled over a future period, thus realizing efficient utilization of network resources.

Applicant's copending U.S. patent application Ser. No. 10/054,509, filed on Nov. 13, 2001 and titled "Time-Coordination in a Burst-Switching Network", discloses a method and apparatus for low latency loss-free burst switching. Burst schedules are initiated by controllers of bufferless core nodes and distributed to respective edge nodes. Burst formation takes place at source nodes and a burst size is determined according to an allocated flow rate of a burst stream to which the burst belongs. An allocated flow rate of a burst stream may be modified according to observed usage of scheduled bursts of a burst stream. A method of control-burst exchange between each of a plurality of edge nodes and each of a plurality of bufferless core nodes enables burst scheduling, time coordination, and loss-free burst switching.

The method of application Ser. No. 09/750,071 generally yields higher network efficiency and is attractive when the propagation delay between an edge node and a core node is relatively small, of the order of a millisecond for example, or when large delay is acceptable. The method of application Ser. No. 10/054,509 is attractive when the propagation delay between an edge node and a core node is relatively large.

Burst communication is preferably incorporated within a flexible time-shared network that also provides both channel switching and time-division-multiplexed switching. Providing high-capacity wide-coverage time-shared networks using bufferless core nodes presents a significant challenge due to the difficulty of time-alignment at the bufferless core nodes. Structures of time-shared networks that facilitate extending network coverage and capacity are needed.

Furthermore, methods for burst switching adapted to take into account widely varying inter-nodal propagation delays, different network topologies, and diverse performance requirements are needed to realize a wide-coverage high-performance time-shared network.

It is also desirable to explore means for dynamic division of a parent network into embedded networks serving user communities having different service specifications or requiring private control.

SUMMARY OF THE INVENTION

To attain both low delay and zero burst loss in a burst-switching network comprising edge nodes interconnected by bufferless core nodes, the proximity of an edge node to the core node to which it is connected is used to determine whether to schedule burst transfer from an edge node based on descriptors of waiting data bursts or anticipated data bursts having sizes determined according to prescribed flow rates.

In accordance with an aspect of the present invention, there is provided a method of transfer of a plurality of signal burst streams each comprising a succession of signal bursts from a first node to a second node. According to the method, the first node transmits first-mode requests to the second node, each first-mode request including burst descriptors, and receives from the second node a schedule including a transmission time corresponding to each of the burst descriptors. The first node may also transmit a second-mode request to the second node, each second-mode request including at least a flow-rate allocation and receive from the second node a succession of burst-transfer permits each burst-transfer permit including a burst-size limit and a corresponding transmission time.

In accordance with a further aspect of the present invention, there is provided a method of bimodal burst scheduling implemented in a core node of a network comprising edge nodes interconnected by core nodes. The method comprises steps of: receiving burst-transfer requests including waiting-burst descriptors; receiving a flow-rate-allocation request for each of a plurality of burst streams; generating time-regulated burst descriptors for each of the burst streams; merging the waiting-burst descriptors and the time-regulated burst descriptors into a combined list of burst descriptors for each outlet port of the core node; and computing a scheduled arrival time at the core node for each burst in the combined list.

In accordance with a further aspect of the present invention, there is provided a bimodal core controller associated with a core node in a network comprising edge nodes interconnected through core nodes. The bimodal core controller comprises: a burst-descriptor generator operable to generate burst-descriptors; a burst scheduler operable to schedule the transfer of bursts across the core node; and a burst-transfer-request processor. The burst-transfer-request processor is operable to receive burst-transfer requests, associate each burst-transfer request with a first mode or a second mode, direct each burst-transfer request associated with the first mode to the burst scheduler; and direct each burst-transfer request associated with the second mode to the burst-descriptor generator to generate burst descriptors then direct the generated burst descriptors to the burst scheduler.

In accordance with a further aspect of the present invention, there is provided a bimodal burst switching network comprising a plurality of edge nodes each having an edge controller, the plurality of edge nodes connecting to at least one core node wherein at least one edge node from the plurality of edge nodes is operable to: determine its proximity to a selected core node; select a first-mode of burst transfer when the proximity is within a predefined proximity threshold; and select a second-mode of burst transfer when the proximity is beyond the predefined proximity.

In accordance with a further aspect of the present invention, there is provided a method of bimodal burst scheduling implemented by a first edge node selected from among a plurality of edge nodes interconnected by a plurality of independent bufferless core nodes, where each edge node has an edge-node controller and each core node has a core-node controller. The method comprises steps of determining a total flow-rate requirement for a connection from the first edge node to at least one destination edge node and selecting a core node from among the core nodes through which to route the connection. Where the selected core node is within a predefined proximity from the first edge node the method includes steps of forming a data burst according to the total flow-rate capacity requirement, sending burst transfer requests, each specifying a destination edge node and a burst size, to the core controller, and receiving from the core controller a schedule for burst transmission. Where the selected core node is beyond the predefined proximity from the first edge node, the method includes steps of sending requests for flow-rate-allocations, each request specifying a destination edge node and a flow-rate requirement and receiving from the core node burst-transfer permits each specifying a burst-size limit, a destination, and a corresponding transmission time.

BRIEF DESCRIPTION OF THE DRAWINGS

Embodiments of the present invention will be further described with reference to the accompanying exemplary drawings, in which:

FIG. 12 illustrates time-division-multiplexing, burst transmission, and interleaved burst and TDM data transfer in accordance with an embodiment of the present invention;

FIG. 37 illustrates an exemplary flow-rate-allocation matrix for a subset of the network of FIG. 36, for use with an embodiment of the present invention;

FIG. 42A and FIG. 42B illustrate example connection requests using the format of FIG. 41.

DETAILED DESCRIPTION

Figure 1:
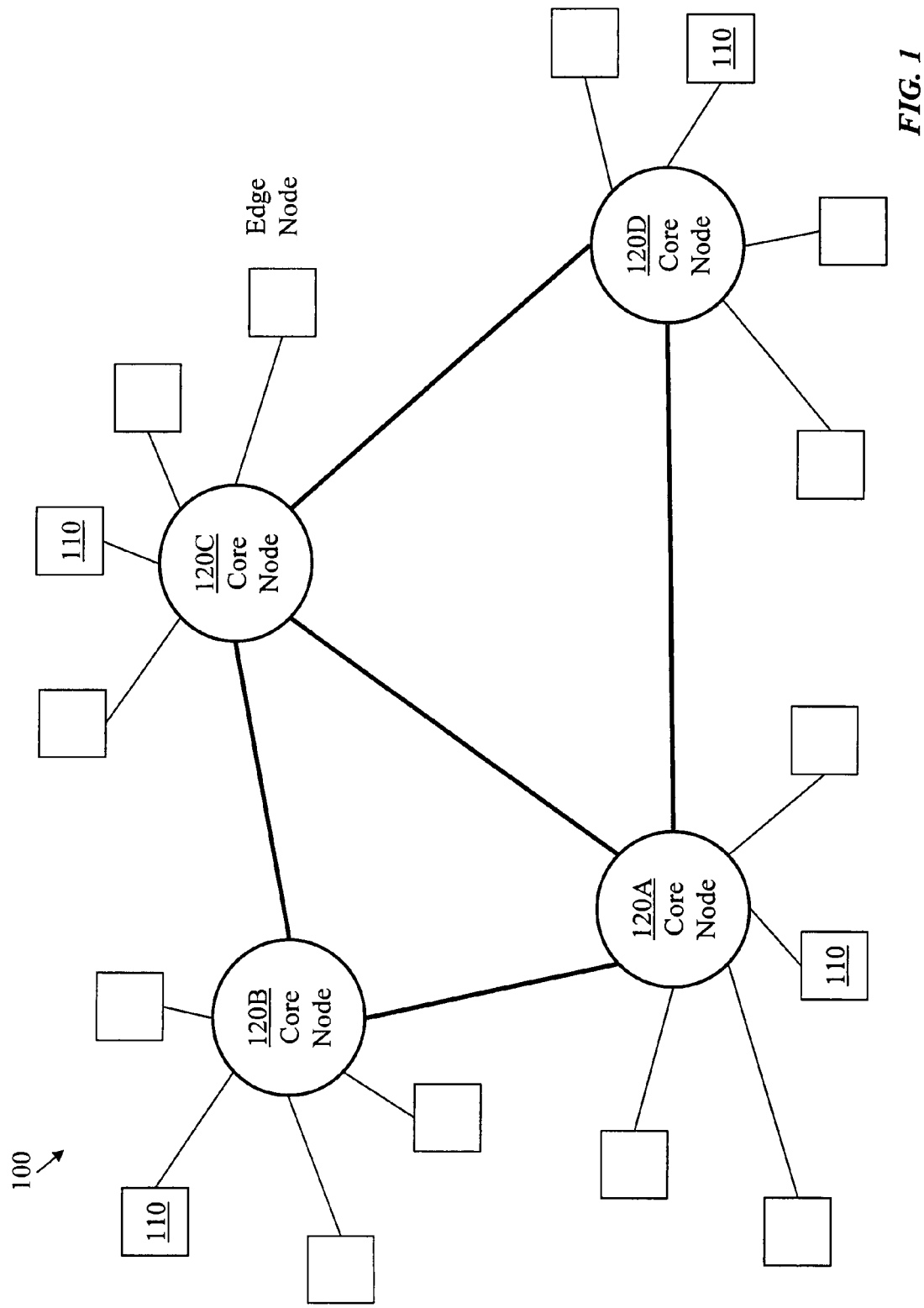
FIG. 1 illustrates a prior-art network comprising electronic edge nodes interconnected by optical core nodes.

The terminology used in describing the embodiments of the invention is listed below.

Edge node: A switching node having subtending information sources and sinks and connecting to other nodes is called an edge node.

Source node: An edge node transmitting signals, received from subtending sources, to other nodes is called a source edge node or a source node.

Sink node: An edge node receiving signals from other nodes, for delivery to subtending sinks, is called a sink edge node or a sink node.

Core node: A switching node connecting only to other switching nodes, which may be edge nodes or core nodes, is called a core node.

Input port: A port of a switching node receiving information signals from either a subtending information source or from an external node is called an input port.

Output port: A port of a switching node transmitting information signals to either a subtending information sink or an external node is called an output port.

Outer port: An edge-node port receiving signals from a source, or transmitting signals to a sink, is called an outer port.

Inner port: An edge-node port receiving signals from, or transmitting signals to, another switching node is called an inner port.

Ingress port: An input port of an edge node receiving information signals from subtending information sources is referenced as an ingress port. An ingress port is an outer port.

Egress port: An output port of an edge node transmitting information signals to subtending information sinks is referenced as an egress port. An egress port is an outer port.

Inbound port: An input port of an edge node receiving information signals from external switching nodes is referenced as an inbound port. An inbound port is an inner port.

Outbound port: An output port of an edge node transmitting information signals to external switching nodes is referenced as an outbound port. An outbound port is an inner port.

Inbound channel: An inbound channel is a communication channel, usually a wavelength channel in a fiber-optic link, connecting an inbound port to an external node.

Outbound channel: An outbound channel is a communication channel, usually a wavelength channel in a fiber-optic link, connecting an outbound port to an external node.

Inlet port: An input port, of a core node, connecting to an outbound channel is herein called an inlet port.

Outlet port: An output port, of a core node, connecting to an inbound channel is herein called an outlet port.

Inward port: An input port, of a core node, receiving a wavelength channel from another core node is called an inward port.

Outward port: An output port, of a core node, having a wavelength channel to another core node is called an outward port.

Inward and outward channels: A channel connecting a first core node to a second core node is an inward channel with respect to the second core node and an outward channel with respect to the first core node.

Uplink: An uplink is a communication link, usually a multiple-channel link, from an edge node to a core node.

Downlink: A downlink is a communication link, usually a multiple-channel link, from a core node to an edge node.

Up-channel: An up-channel is a channel, usually a wavelength channel, within an uplink.

Down-channel: A down-channel is a channel, usually a wavelength channel, within a downlink.

Core link: A core link is a link connecting two core nodes. A core link is preferably a WDM fiber link.

Core channel: A channel in a core link is a core channel.

Upstream: The adjective 'upstream' refers to a flow in the direction from an edge node to a core node.

Downstream: The adjective 'downstream' refers to a flow in the direction from a core node to an edge node.

Data packet: It is a conventional data block of arbitrary size and having an identifying header.

Data burst: A data burst is an aggregation of data packets having a burst header in addition to the individual packet headers; a data burst may contain only one packet of a large size, in which case only the burst header is required.

Data stream: A data stream is a flow of data units having the same destination edge node and, possibly, assigned to the same route towards the destination node.

Packet stream: A packet stream is a data stream where the data units are data packets generally of variable and arbitrary sizes.

Burst stream: A burst stream is a data stream in which data units are aggregated into data bursts. Where distinction is not required, the terms 'data stream', 'packet stream', and 'burst stream' may be used interchangeably.

Flow rate: The mean rate, usually in bits per second, of a data stream of any data format is the flow rate of the data stream.

Time-limited signal: A signal occupying a channel during a relatively short period of time, 16 microseconds for example, is called a time-limited signal. Successive time-limited signals carried by a channel may be directed to different destinations.

Time Locking: It is a technique for time coordination using time-counters to enable time alignment of signals received at connecting nodes. A first node is time-locked to a second node if a signal transmitted at an instant of time indicated by a time counter at the first node arrives at the second node at the same instant of time as indicated by an identical time counter at the second node. When a first node is time-locked to a second node along a given path, the given path is said to be time-locked. The path may include multiple wavelength channels in which case, due to dispersion, each of the channels may be time locked separately.

Wavelength router: A wavelength router is an optical device, well-known to a person skilled in the art, which has a set of WDM input ports and a set of WDM output ports, and which connects wavelength channels received at an input port to corresponding output ports. The connection pattern is static; typically based on a spatial cyclic mapping of input wavelengths to output port numbers.

Optical-Core Network

FIG. 1 illustrates a network 100 comprising electronic edge nodes 110 interconnected by optical core nodes 120. Each edge node 110 receives data from subtending data sources (not illustrated) and organizes the received data into data blocks. The data blocks may be of equal sizes, or bursts of adaptive sizes. It is also possible that an edge node 110 organize data in both fixed TDM data blocks and bursts of adaptive sizes. The data blocks and bursts modulate an optical carrier of a predetermined wavelength and the resulting modulated optical carrier is transmitted along a wavelength channel to an optical core node. The wavelength channel is time shared so that successive data blocks or successive bursts carried by the channel may have different destination edge nodes and, hence, may exit the core node 120 from different output ports. An edge node is preferably sufficiently flexible to handle a mixture of TDM and burst data and to provide flow-rate control for burst streams. A universal electronic switching node adapted to serve as an edge node in a high-capacity network with an optical core is described in Applicant's U.S. patent application Ser. No. 10/025,982 filed on Dec. 26, 2001 and titled "Universal edge node", the specification of which is incorporated herein by reference. The universal edge node may handle a variety of traffic classes and may control traffic admission, connection definition, connection routing, and core node configuration. The provided capabilities significantly simplify network operation and control.

The core node 120 is preferably bufferless for two reasons. Firstly, to avoid the need for buffer management in the core where overflow can result in data loss and, secondly, to enable the introduction of photonic switches in the core or the replacement of existing electronic core switches with photonic switches.

When several edge nodes transmit optical signals to a core node 120 in a time-shared mode, either TDM or burst multiplexing, they must observe a strict timing discipline because of the absence of signal buffers at the optical switch 120. Such a process is preferably implemented by letting the core node 120 determine the required arrival time for each data block or burst. Each edge node 110 must then establish a precise estimation of the one-way propagation delay to each core node 120 to which it connects.

Time-Shared Optical Core

Time-sharing the optical-core capacity can significantly reduce the mean number of hops per connection, thus increasing the network efficiency. Time-sharing also enables multi-grained connections where the capacity of a channel can be divided, in different proportions, among several users.

A time-shared channel carries successive time-limited signals that may have different destinations. The time-limited signals may be of equal or arbitrary time-varying sizes. If the signals are of equal sizes, a TDM frame comprising a number of time slots may be used, with each signal occupying a time slot. A connection is allocated at least one time-slot per TDM frame and the identity of a connection can be derived from the time slots it occupies. When a connection is allocated two or more time slots per TDM frame, the allocated time slots may occupy arbitrary time slots in the TDM frame. To establish a multiple-time-slot connection between an input port and an output port of a bufferless node, such as an optical core node 120, a time-slot-matching process is required to find contemporaneous unassigned time slots. The connection set-up rate decreases, but the processing effort per connection increases, as the number of time-slots per connection increases.

If the time-limited signals are of variable-size, connections of a wide-range of flow-rates can be accommodated, and the duration of the time-limited signals can be adapted to the flow rate. For example, the burst size may be 2000 bits at a flow-rate of 10 Megabits per second (Mb/s) and 20000 bits at a flow rate of 100 Mb/s. A method of computing the burst size as a function of the flow rate of a corresponding burst stream is described in Applicant's U.S. patent application Ser. No.

10/054,509, filed on Nov. 13, 2001 and titled "Time-Coordination in a Burst-Switching Network", the specification of which is incorporated herein by reference.

Time-sharing the optical-core capacity requires fast and scalable optical switches. Applicant's U.S. patent application Ser. No. 10/390,880 filed on Mar. 19, 2003 and titled "Fast optical switch" describes an optical switch in which switching is effected by rapid wavelength conversion. The described optical switch handles both wavelength channels and TDM optical signals but can be adapted to switch optical bursts of variable sizes. A modular structure may be configured to comprise several fast optical switches to yield a high-speed, high-capacity, fully-connected optical switch.

Circumventing the Limitation of Optical Switching

Electronic switching nodes may have random-access data buffers. This capability enables temporal decoupling of the operation of successive switching nodes, thus significantly simplifying network control. Currently, random-access buffers are not easily realizable in photonic switches. This limitation dictates that the edge nodes have time-locked paths to the optical core nodes. A path originating from an edge node having a data buffer and traversing only one optical node, or generally one bufferless core node, can always be time locked. Time-locking paths that successively traverse more than one optical node cannot, however, be realized network-wide; only selected paths traversing two or more optical nodes may be time locked.

High-capacity edge nodes and core nodes enable the realization of rational network structures that avoid multiple hops. High capacity nodes, both electronic (at the edge) and optical (at the core) require high-speed schedulers. High-speed high-throughput schedulers can be realized as an array of pipelined scheduler modules. Pipelining also results in a significant reduction of contention loss, hence high fabric utilization. A pipelined scheduler for a high-capacity switching node is disclosed in the aforementioned Applicant's U.S. patent application Ser. No. 10/025,982 and Applicant's U.S. patent application Ser. No. 10/223,222 filed Aug. 20, 2002 and titled "Modular High-Capacity Switch", the specification of which is incorporated herein by reference.

Decoupled Nodes

Figure 2:
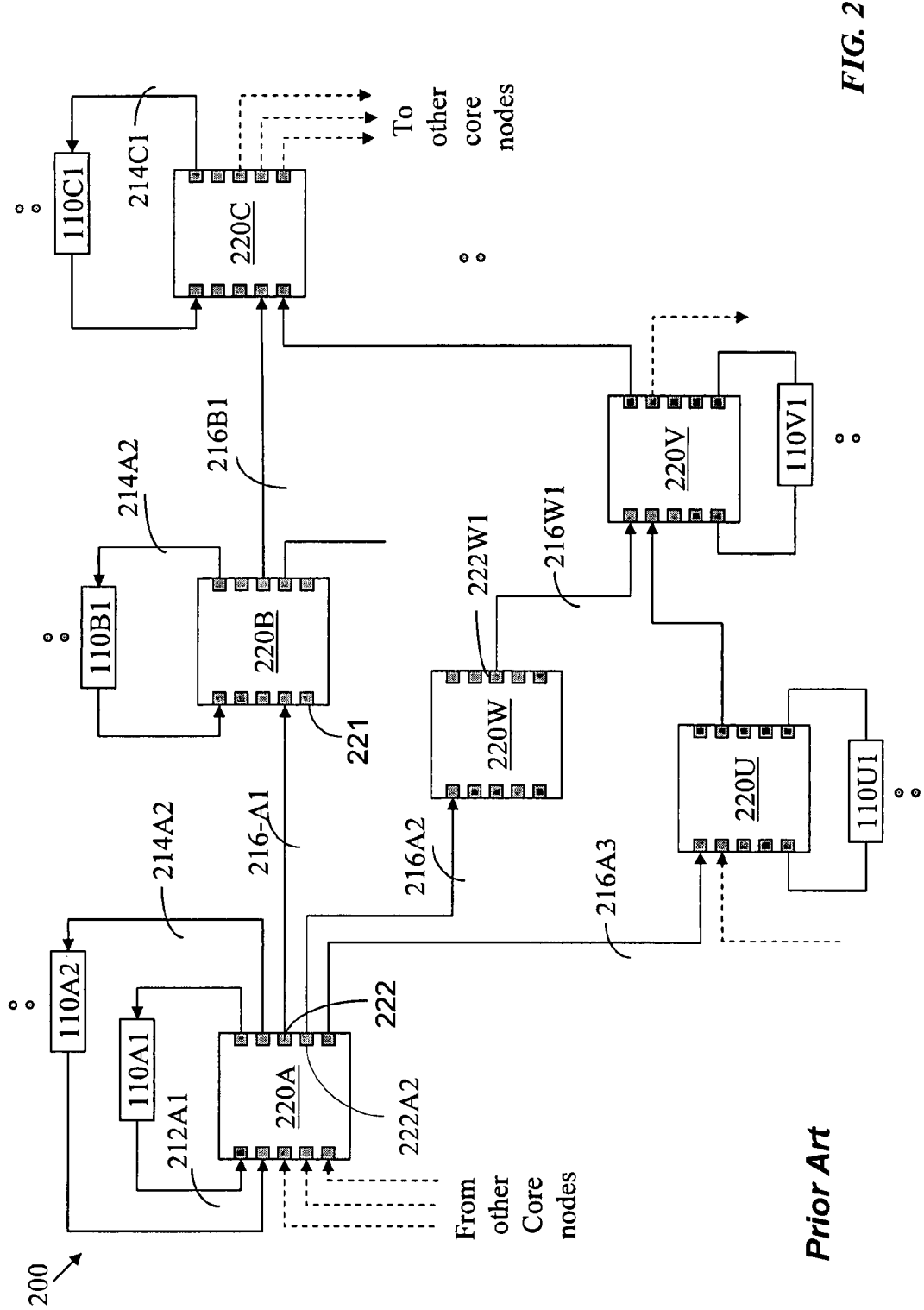
FIG. 2 illustrates a prior art network comprising electronic edge nodes interconnected by core nodes with each port of each core node provided with a buffer.

FIG. 2 illustrates a prior-art network 200 comprising edge nodes 110 interconnected by core nodes 220. Data buffers are provided at each input port and at each output port of each edge node and each core node. Providing such buffers permits independent time-alignment at each edge or core node and, hence, a complete decoupling of the nodes where independent time references may be used and temporal coordination among nodes is not required. The edge nodes interface with data sources and sinks (not illustrated) and are preferably based on an electronic switch fabric as described above with reference to FIG. 1. A core node that includes input buffers and output buffers may either use an electronic switch fabric or an optical switch fabric. An electronic switch fabric requires optical-to-electrical (O-E) conversion at each input port and an electrical-to-optical (E-O) conversion at each output port. A buffer at an input port or an output port of an optical switch fabric can be realized using an O-E converter, a data memory, and an E-O converter.

Six core nodes 220, labeled 220A, 220B, 220C, 220U, 220V, and 220W are illustrated. A core node may have several subtending edge nodes 110. The edge nodes subtending to core node 220A are labeled core 110A1, 110A2, etc., the edge nodes subtending to core node 220B are labeled 110B1, 110B2, etc., and similarly for the remaining core nodes. At least one upstream channel 212 and at least one downstream channel 214 connect an edge node 110 to a core node 220. Core channels 216 may connect a core node 220 to selected core nodes 220. For example, core channel 216A1 connects an output port 222 of core node 220A to an input port 221 of core node 220B.

Time-Locked Multi-Hop Path

Time-locking an upstream channel from an edge node to an adjacent bufferless core node can be realized through exchange of timing signals between a controller of the edge node and a controller of the core node as described in U.S. Pat. No. 6,570,872 issued to Beshai et al. on May 27, 2003, and titled "Self-configuring distributed Switch", the specification of which is incorporated herein by reference, and the aforementioned applicant's U.S. patent application Ser. No. 10/054,509. Time-locking the upstream channel enables the edge node to transfer time-limited signals carried by the upstream channel to several output ports of a bufferless core node.

A path from an edge node traversing a first core node towards a second core node can be time locked through an exchange of timing signals between a controller of the edge node and a controller of the second core node. The input ports of the first core node may receive signals from several edge nodes and other core nodes. Likewise, the input ports of the second core node may receive signals from different edge nodes and other core nodes. Consequently, except by coincidence, the edge node cannot time-lock to both the first and second core nodes due to the differing propagation delays for different node pairs. However, time-locking the edge node to the second core node can be consistently realized if the upstream channel from the edge node to the first core node is switched exclusively to a core channel connecting the first core node to the second core node. Likewise, the edge node can time lock to a third core node over a path comprising several concatenated channels if each channel, except the last one in the path, is switched exclusively to its subsequent channel. Time-locking can then be realized with the controller of the edge node exchanging timing messages with a controller of the third core node.

Partial Decoupling

Figure 3:
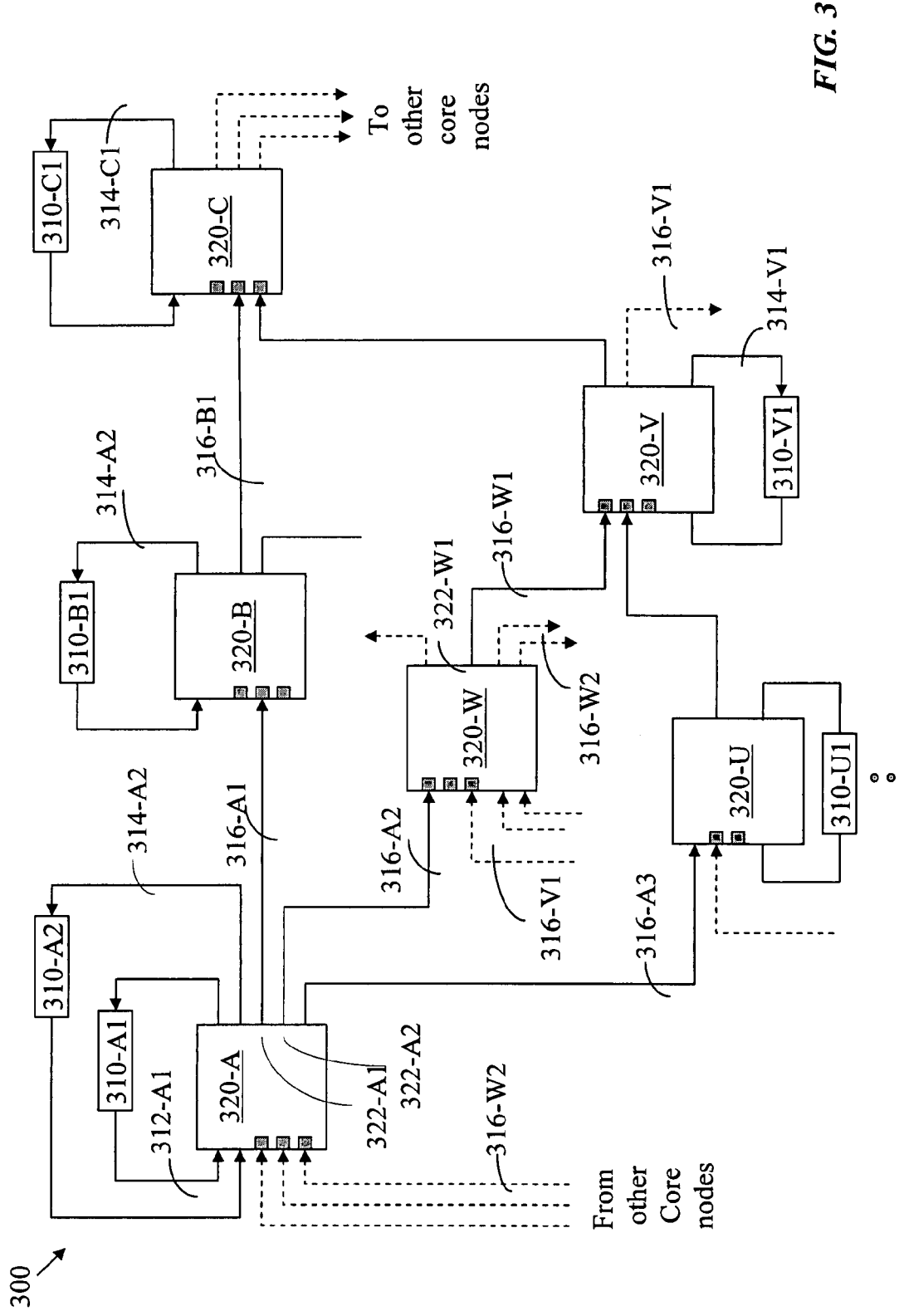
FIG. 3 illustrates a network similar to that of FIG. 2 but with buffers provided only at inward ports of the core nodes in accordance with an embodiment of the present invention.

FIG. 3 illustrates a network 300 comprising optical core nodes 320 with some core nodes 320 have subtending edge nodes. Each core node 320 is provided with buffers, herein called inward buffers, at selected inward ports (input ports connecting to other core nodes). The core nodes of network 300 require O-E and E-O conversion only at the selected inward ports. There is no need for buffers at any inlet port or any output port.

Each edge node 310 is preferably time-locked to the core node to which it subtends. Elimination of the output buffers is realized by time-locking each channel connecting an outbound port of an edge node to an inlet port of a core node and time-alignment at each inward buffer of the same core node to a reference time of the core controller. Time-locking the channels from outbound ports of edge nodes is feasible due to the availability of buffers at the outbound ports.

At least one upstream channel 312 and at least one downstream channel 314 connect an edge node 310 to a core node 320 and core channels 316 may connect a core node 320 to selected core nodes 320.

In order to switch time-limited signals received at the inward ports of a core node 320, the signal may be time-aligned at their respective inward ports. All signals received at inlet ports and inward ports obey a time reference set by a time counter associated with the core node. The inward buffers are used to realize the required time alignment. Buffers are not required at inlet ports because the edge nodes are time-locked to their adjacent core nodes. The use of inward buffers greatly facilitates the process of establishing a connection across the network because it decouples the successive channels of a path as will be described below. Additionally, the inward buffers may be exploited to facilitate the process of scheduling. The signals received at the inward ports may be sorted at the inward buffer according to their destination outlet ports towards sink edge nodes or outward ports towards other core nodes.

Figure 4:
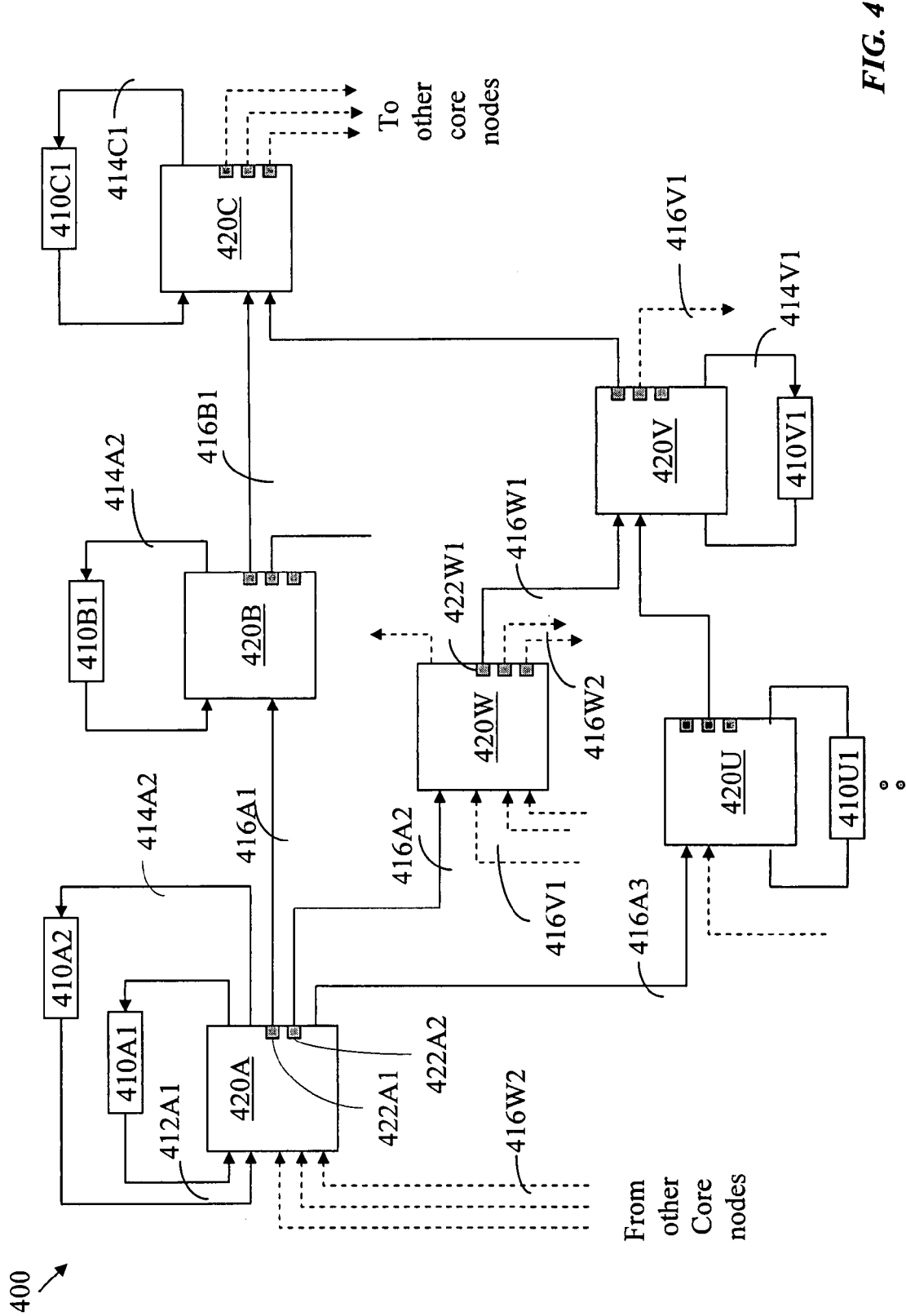
FIG. 4 illustrates a network similar to that of FIG. 2 but with buffers provided only at outward ports of the core nodes in accordance with an embodiment of the present invention.

FIG. 4 illustrates a network 400, similar to network 300, but each core node 420 is provided with buffers, herein called outward buffers, only at selected outward ports connecting to other core nodes. Elimination of the input buffers is realized by time-locking each channel connecting an outbound port of an edge node to an input port of a core node and time locking selected core channels connecting two core nodes. Time-locking selected core channels is feasible due to the availability of buffers at the selected outward ports of the core nodes. The core nodes of network 400 require O-E and E-O conversion only at the selected outward ports. At least one upstream channel 412 and at least one downstream channel 414 connect an edge node 410 to a core node 420 and core channels 416 may connect a core node 420 to selected core nodes 420.

The outward buffers serve the same purpose of the inward buffers of network 300 of FIG. 3. However, the process of time alignment is different. There is a core channel from an outward port of a first core node to a corresponding inward port of a second core node. The inward channels of the second core node may also receive signals from outward ports of other geographically distributed core nodes. Each outward buffer in an outward port has a buffer controller that includes a time counter. The buffer controller exchanges timing signals (timing messages) with a controller of the second core node. To enable switching time-limited signals through the second core node, each outward port of any core node connecting to the second core node is required to time-lock to the second core node.

To facilitate scheduling transfer of signals across two or more core nodes 420, the waiting signals in an outward buffer of a core node 420 may be sorted according to the destined output ports of a subsequent core node 420, which include outlet ports delivering signals to sink edge nodes subtending to the subsequent core node and outward ports connecting to other core nodes.

Each core node 420 has a core controller (not illustrated in FIG. 4). The core controller will be described below with reference to FIG. 17. Subtending edge nodes are preferably time-locked to the core nodes to which they connect as described with reference to FIG. 3. A buffer at an outward port comprises an optical-to-electrical (O-E) converter, an electronic memory, and an electrical-to-optical (E-O) converter.

The core controller includes a master time counter and a master timing circuit (not illustrated) adapted to transmit and receive timing signals. An outward port provided with a buffer also includes a time-locking circuit adapted to exchange time-locking signals with a core controller of another of the core nodes. The core controller is adapted to receive connection requests from, and transmit connection schedules to, subtending edge nodes.

Figure 5:
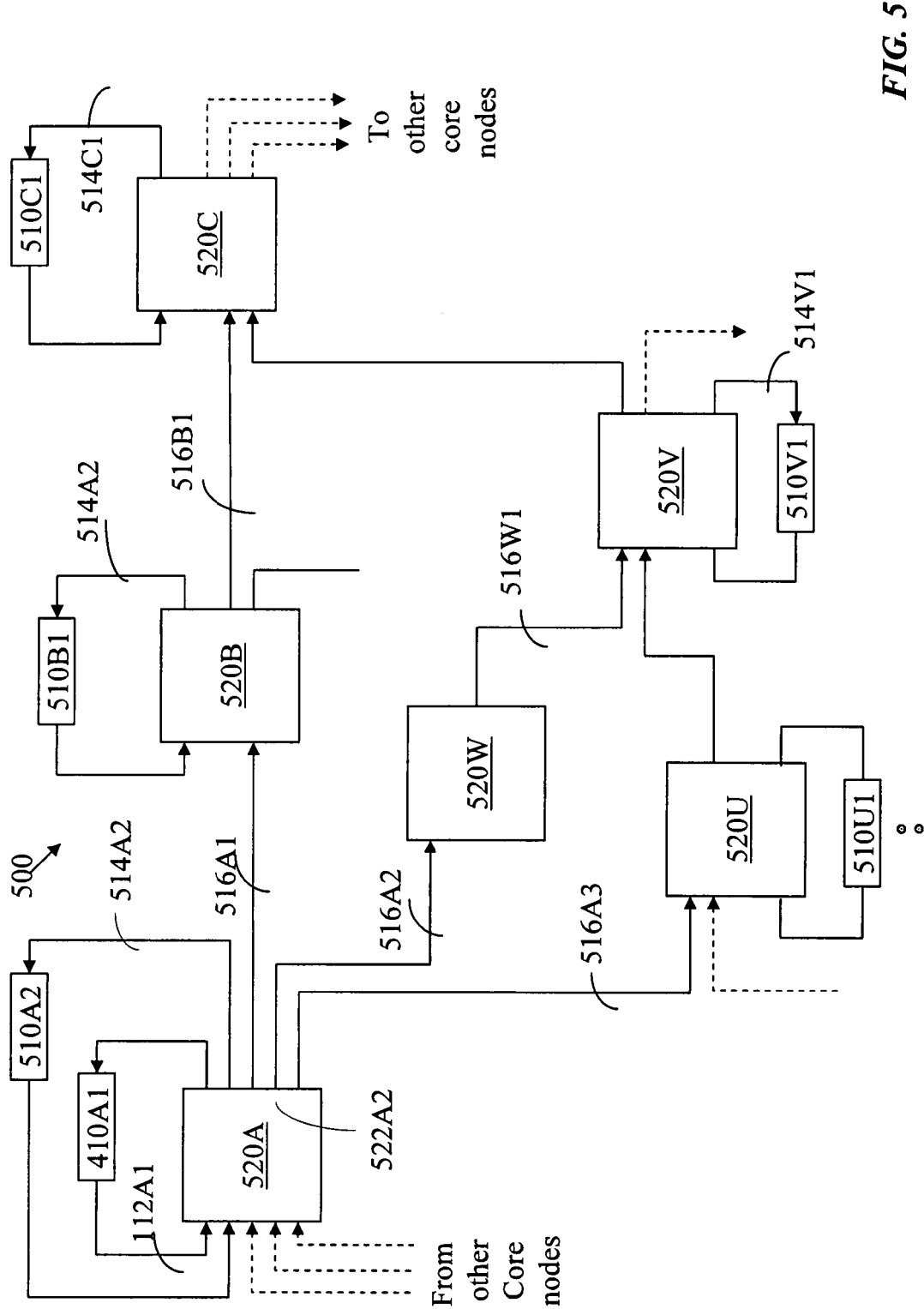
FIG. 5 illustrates a network similar to that of FIG. 2 but with completely bufferless core nodes for use with an embodiment of the present invention.

FIG. 5 illustrates a network 500 similar to the networks of FIGS. 3, and 4 but none of the core nodes is provided with input or output buffers. Buffers are available only at the edge nodes. Each outbound port of an edge node may be time locked to a core node to which it connects (i.e., each upstream channel is time locked). However, none of the core nodes is time locked to any other core node (i.e., none of the core channels is time locked). A time-locked path can only be provided between any two edge nodes subtending to the same core nodes. Establishing a time-slotted connection traversing two or more core nodes is thus infeasible due to the difficulty of time locking. This forces rethinking the network structure to reduce or eliminate the need for cascade time locking.

Data bursts, or time-slotted data, originating at the edge nodes of a core node 520 and destined to the plurality of edge nodes subtending to another core node may be aggregated on a single channel that terminates on a selected one of the destined edge nodes. The selected edge node then distributes the data to respective edge nodes using time-locked paths through their common core node. This process is further illustrated in FIG. 6.

Simple Matching

In a simple time-slot matching process, the occupancy states of two channels along a path are compared during successive time slots and any time slot that is found to be vacant in both channels is considered an allocable time slot. Hereinafter, a simple time-slot-matching process is also called a first-order matching process. First-order matching has been used extensively in circuit switching and several techniques have been developed to increase the probability of successful matching. This process can be extended to handle time-intervals of variable duration.

Compound Matching

In a compound time-slot matching process, the occupancy states of three or more channels along a path are compared during successive time slots and any time slot that is found to be vacant in all the channels of the path is considered an allocable time slot that may be used for a connection. The order of a matching process is defined as the number of occupancy-state comparisons per time slot. Thus, a simple matching process is a first-order matching process. If successive channels along the path are separated by signal buffers, the compound matching process of an order G, where G is greater than unity, can be decomposed into G stages, each stage requiring a first-order matching process. If the channels of the path traverse bufferless core nodes, a compound matching process of order G requires concurrent time slot availability in (G+1) ports. As described in the aforementioned Applicant's U.S. patent application Ser. No. 10/223,222, the probability of successful compound matching decreases rapidly with the order of the compound matching process. The probability of successful matching becomes even lower with burst switching where the burst sizes are variable.

In order to permit decomposition of a compound matching process into a series of simple (first-order) matching processes, decoupling buffers may be provided at either inward ports or outward ports of a bufferless core node as illustrated in FIGS. 3 and 4. Providing a decoupling buffer at a port of an optical core node requires optical-to-electrical (O-E) conversion and electrical-to-optical (E-O) conversion. A buffer controller is associated with each decoupling buffer in order to control timing and scheduling.

Figure 6:
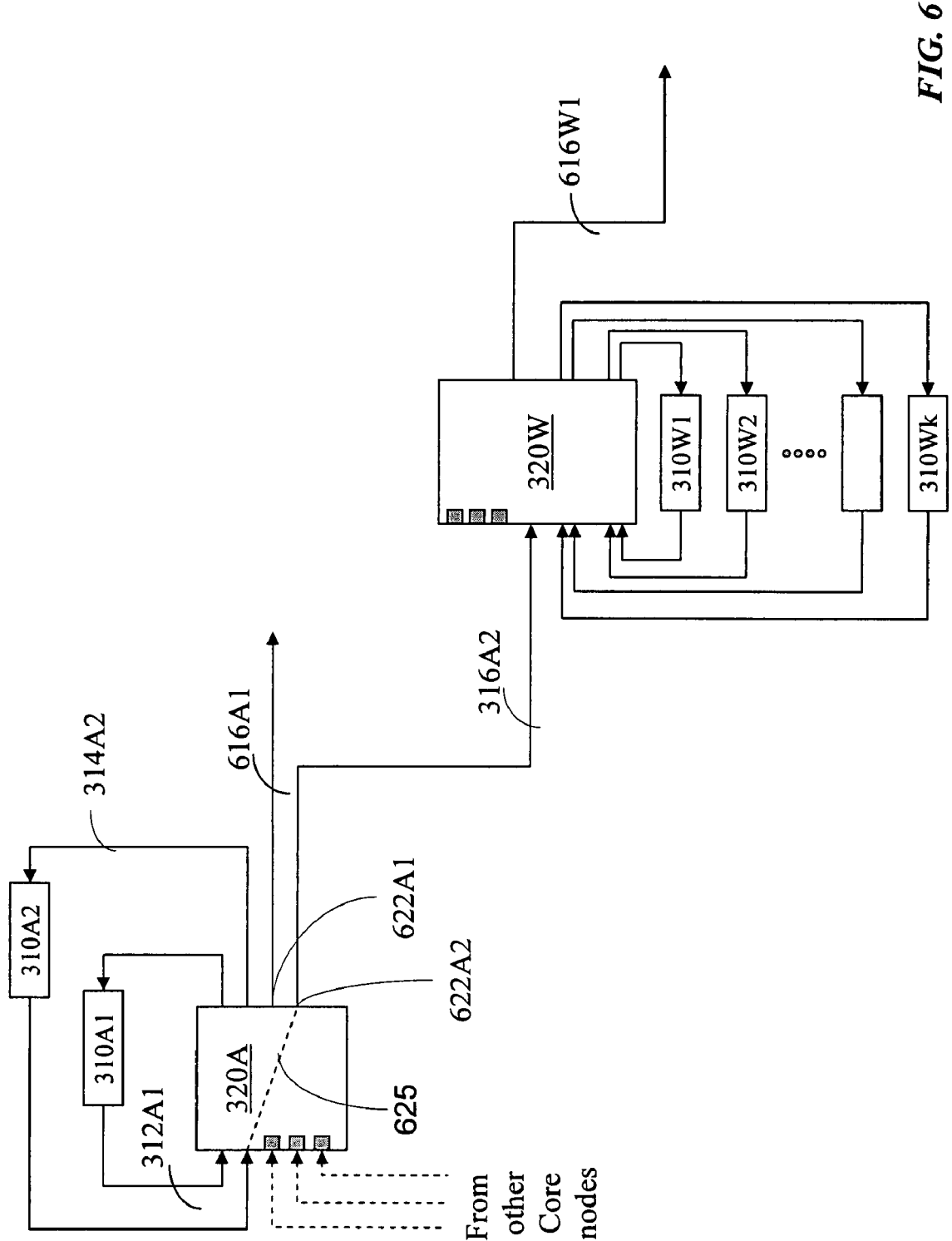
FIG. 6 illustrates a segment of a network of the structure of FIG. 3 where a first core node is connected to a second core node by a bufferless path for use with an embodiment of the present invention.

FIG. 6 illustrates a segment of a network similar to network 300 but with two core nodes 320A and 320W interconnected by a core channel 316A2 without a buffer at either end of the core channel. The path from core node 320A to 320W is not time locked and must, therefore, terminate on a single edge node. The time-slotted data, or burst data, originating from edge nodes 310A1, 310A2, etc., and destined to edge nodes 310W1, to 310Wk, subtending to core node 320W, may be switched through core node 320W to edge node 310W2, for example. Edge node 310W2 then distributes the time-slotted data, or burst data, destined to each of its neighbours through time-locked paths traversing core node 320W. It is noted that the example of FIG. 6 is relevant to any path that is not time locked in any of the networks of FIG. 3, 4, or 5.

It may be desirable to time lock an edge node 310 to a non-adjacent core node 320 in order to enable time-switching of time-limited signals transmitted by the edge node to output ports of the non-adjacent core node. For example in order to enable edge node 310A2 to send time-limited signals, such as time-slotted signals in a TDM frame, or bursts of arbitrary sizes, to edge nodes 310W1, 310W2, . . . , 310Wk, a time locked path is required from edge node 310A2 to core node 320W. Such a path would be channel-switched in core node 320A, through internal channel 625, so that core node 320W would appear as an adjacent core node to edge node 310A2.

Figure 7:
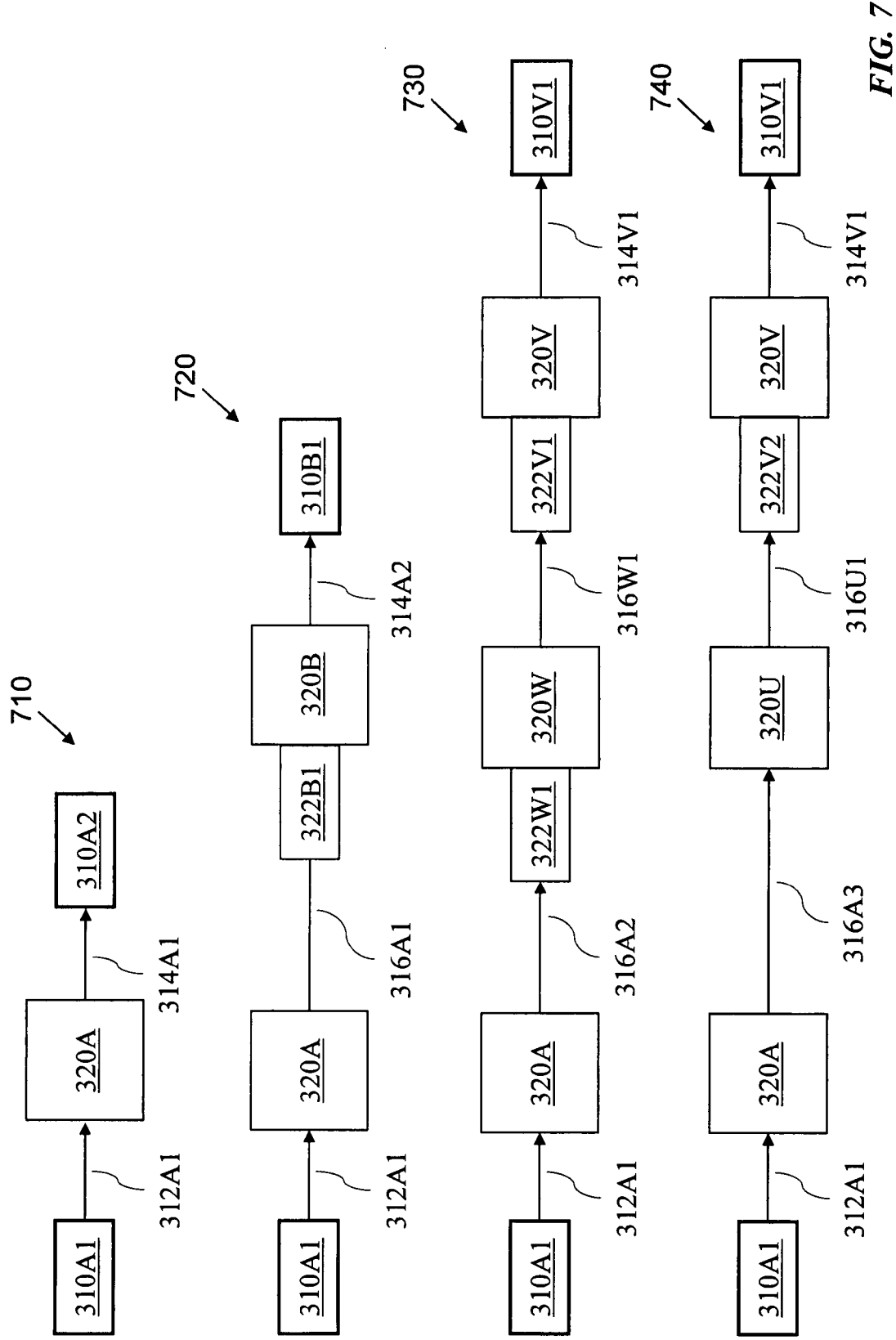
FIG. 7 illustrates paths traversing a single core node, two core nodes, and three core nodes in the network of FIG. 3.

FIG. 7 illustrates exemplary paths 710, 720, 730, and 740 in the network 300 of FIG. 3. The illustrated path 710 connects two edge nodes 310A1 and 310A2 subtending the same core node 320A. Core node 320A may be receiving signals from other subtending edge nodes 310 and, hence, edge node 310A1 must be time locked to core node 320A. Transferring an optical burst across core node 320A requires a first-order temporal-matching process.

The illustrated path 720 connects an edge node 310A1 subtending to a core node 320A to an edge node 310B1 subtending to a core node 320B. Edge node 310A1 is time-locked to core node 320A. A decoupling buffer 322B1 is provided at an inward port of core node 320B. The decoupling buffer 322B1 enables time-alignment at the inward ports so that all input ports, including inlet ports and inward ports, have a common time reference. Decoupling buffer 322B1 also provides temporal switching so that bursts continuing to a third core node can be time-aligned to the third core node. Transferring an optical burst from edge node 310A1 to edge node 310B1 requires two independent first-order temporal matching processes. One first-order matching process is performed by a controller of core node 320A and the other is performed by a controller of core node 320B. Without the decoupling buffer 322B1, time-alignment would be difficult to realize and, if time-alignment can be realized, a second-order temporal matching process would be required.

The illustrated path 730 connects an edge node 310A1 subtending to a core node 320A to an edge node 310V1 subtending to a core node 320V. Edge node 310A1 is time-locked to core node 320A. A core channel 316-A2 connects core node 320A to core node 320W and a core channel 316-W1 connects core node 320W to core node 320V. A decoupling buffer 322W1 is provided at an inward port of core node 320W and a decoupling buffer 322V1 is provided at an inward port of core node 320V receiving a core channel 316-W1 from core node 320W. Transferring an optical burst from edge node 310A1 to edge node 310V1 requires three independent first-order temporal matching processes, one across each of the three core nodes 320A, 320W, and 320V, performed by controllers of core nodes 320A, 320W, and 320V, respectively. Without the decoupling buffers 322W1 and 322V1, time-alignment would be difficult to realize and a third-order temporal matching process would be required.

The illustrated path 740 connects edge node 310A1 to edge node 310V1 through core nodes 320A, 320U, and 320V. Upstream channel 312-A1 from edge node 320A is switched in its entirety to a bufferless outward port of core node 320A connecting to core channel 316-A3 which leads to a bufferless inward port of core node 320U. In establishing paths 710, 720, and 730, edge node 310A1 time locks to its adjacent core node 320A. In establishing path 740, edge node 310A1 time-locks to core node 320U and, hence, may switch time-limited signals to several outlet ports of core node 320U leading to edge nodes 310 subtending to core node 320U and to an outward port of core node 320U. Core channel 316-U1 leading to core node 320V terminates in an inward buffer 322V2. It is noted that edge node 310A1 may not, except by coincidence, be time-locked to core node 320V. The inward buffer 322V2 is controlled by a core controller (not illustrated in FIG. 7) of core node 320V. The core controller determines a schedule for switching time-limited signals (such as time-slots in a TDM frame or data bursts) from the inward port to output ports of core node 320V, including the outlet port leading to edge node 310V1.

Figure 8:
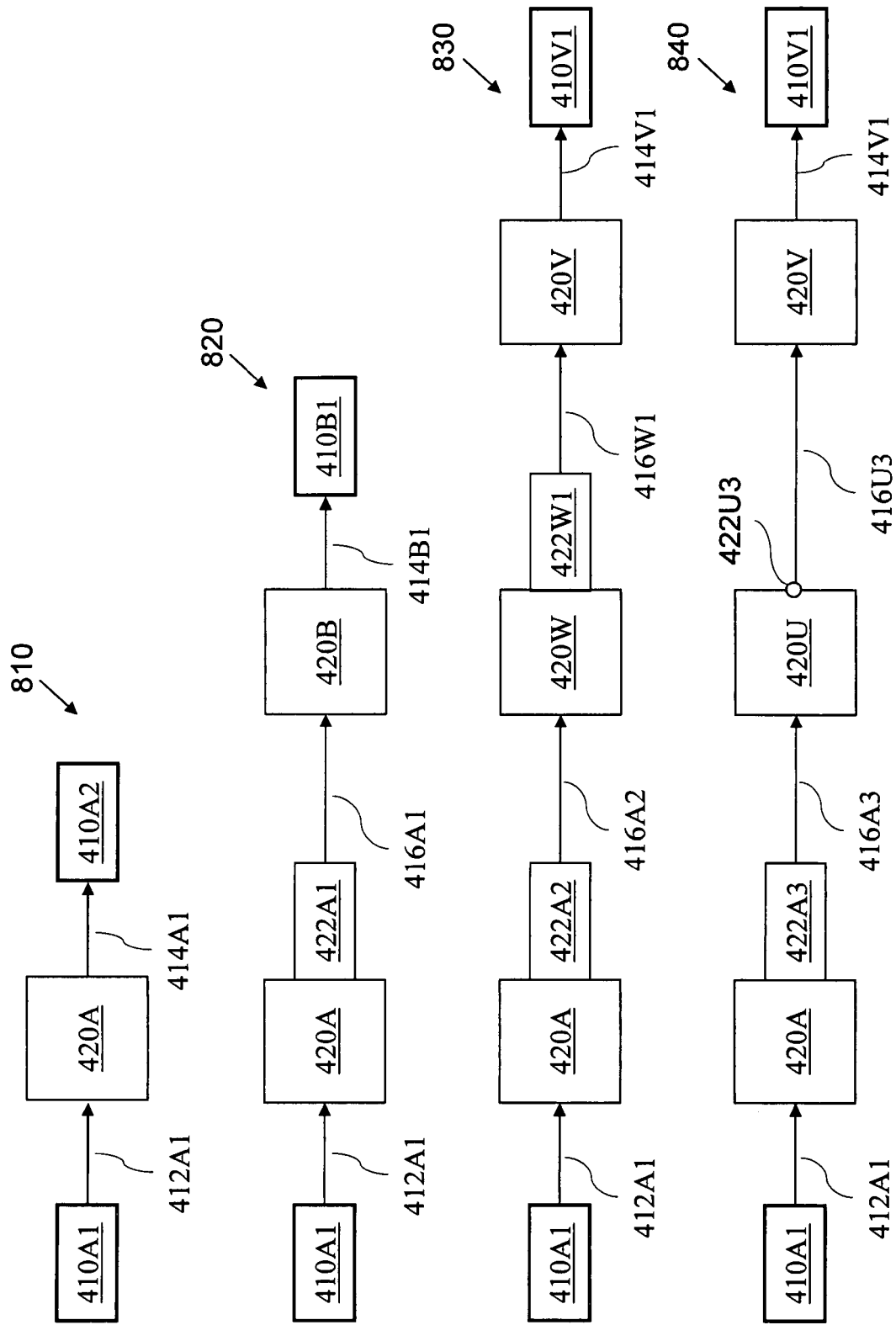
FIG. 8 illustrates paths traversing a single core node, two core nodes, and three core nodes in the network of FIG. 4.

FIG. 8 illustrates exemplary path 810, 820, 830, and 840 in the network 400 of FIG. 4. The illustrated paths bear one-to-one correspondence to paths 710, 720, 730, and 740 of FIG. 7, and core channels 416 correspond to core channels 316. Paths 810 and 710 are identical.

The illustrated path 820 connects an edge node 410A1 subtending to a core node 420-A to an edge node 410B1 subtending to a core node 420-B. Edge node 410A1 is time-locked to core node 420-A. A decoupling buffer 422A1 is provided at an outward port of core node 420-A. An outward-port controller (not illustrated) is operable to cause time-locking of the decoupling buffer 422A1 to core node 420B, thus enabling time-alignment along core channel 416A1 so that a signal arriving to core node 420-B along core channel 416A1 obeys a common time reference at core node 420-B. Decoupling buffer 422A1 also provides temporal switching so that bursts continuing to a third core node can be time-aligned to the third core node. As in path 720, transferring an optical burst from edge node 410A1 to edge node 410B1 requires two independent first-order temporal matching processes performed by a controller of core node 420-A and a controller of core node 420-B. Without the decoupling buffer 422A1, time-alignment would be difficult to realize and, if realized, a second-order temporal matching process would be required.

The illustrated path 830 connects an edge node 410A1 subtending to a core node 420A to an edge node 410V1 subtending to a core node 420-V. A core channel 416A2 connects core node 420-A to core node 420-W and a core channel 416W1 connects core node 420-W to core node 420-V. A decoupling buffer 422A2 is provided at an outward port of core node 420-A and a decoupling buffer 422W1 is provided at an outward port of core node 420W. Transferring an optical burst from edge node 410A1 to edge node 410V1 requires three independent first-order temporal matching processes, one across each of the three core nodes 420-A, 420-W, and 420-V, performed by controllers of core nodes 420-A, 420-W, and 420-V, respectively. Without the decoupling buffers 422A2 and 422W1, time-alignment would be difficult to realize and a third-order temporal matching process would be required.

The illustrated path 840 connects edge node 410A1 to edge node 410V1 through core nodes 420-A, 420-U, and 420-V. Time-limited signals carried by upstream channel 412-A1 from edge node 320A are switched to outward port 422A3 of core node 320A. Outward port 422A3 is provided with a buffer and a buffer controller (not illustrated). Core channel 416A3 is switched in its entirety through core node 420-U to a bufferless output port 422U3 connecting to core channel 416U3 leading to a bufferless inward port of core node 420-V. Through exchange of timing signals with a core controller of core node 320V, output port 422A3 time-locks to core node 420-V. Thus, time-limited signals sent from edge node 410A1 can be switched to any output port of core node 420-V, including the outlet port connecting to downstream channel 414-V1 leading to edge node 410V1.

Figure 9:
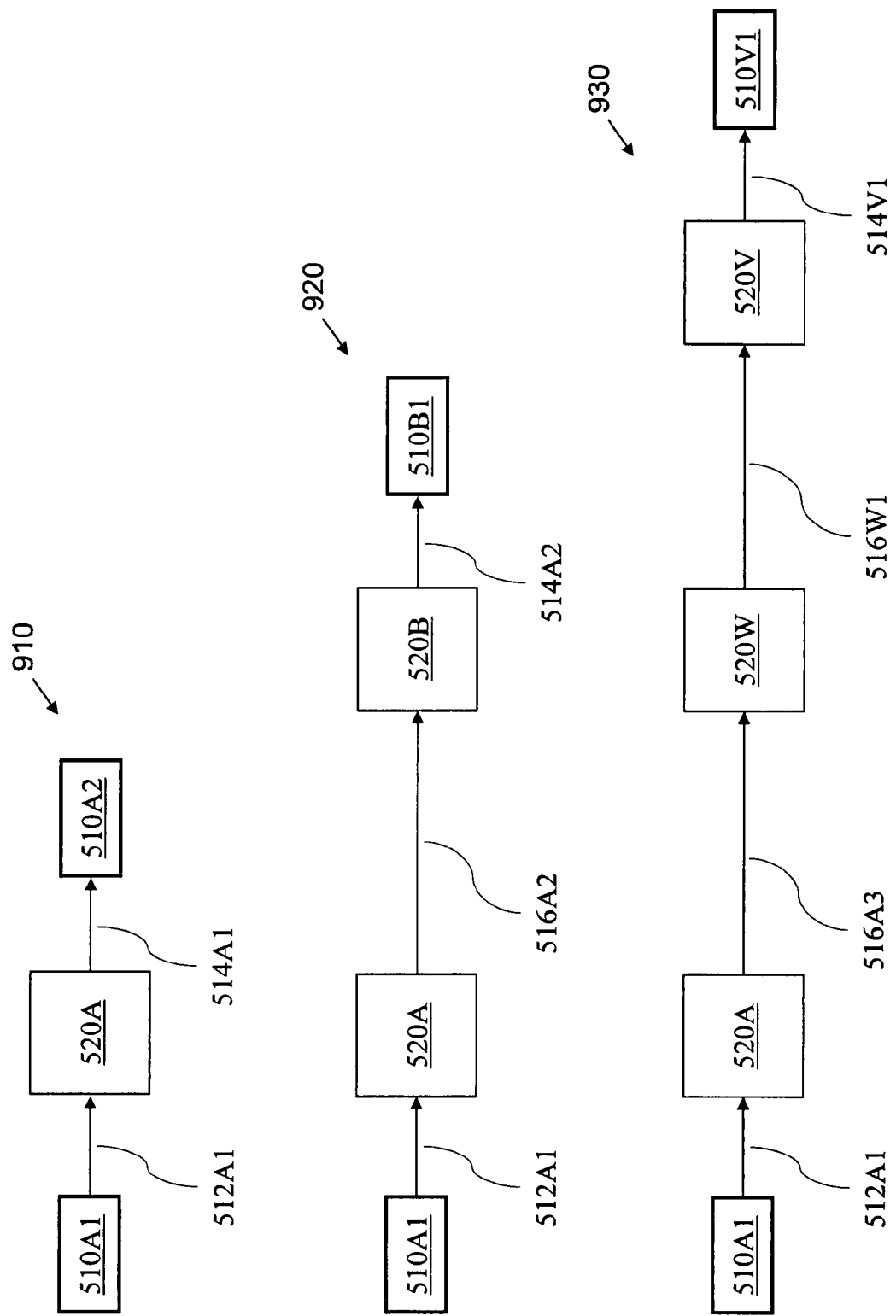
FIG. 9 illustrates paths traversing a single core node, two core nodes, and three core nodes in the network of FIG. 5.

FIG. 9 illustrates paths in a network 500 of FIG. 5. A path 910 from edge node 510A1 to edge node 510A2 traverses a single core node 520A, a path 920 from edge node 510A1 to edge node 510B1 traverses two core nodes 520A and 520B, and a path from edge node 510A1 to edge node 510V1 traverses three core nodes 520A, 520B, and 520V.

Path Setup

The process of setting up a path 710 from edge node 310A1 to edge node 310A2 includes steps of:
(1) time-locking edge node 310A1 to core node 320A, and
(2) allocating a time-interval in upstream wavelength channel 312A1 connecting edge node 310A1 to core node 320A and downstream wavelength channel 314A1 connecting core node 320A to edge node 310A2.

The process of setting up a path 720 from edge node 310A1 to edge node 310B1 includes steps of:
(1) time-locking edge node 310A1 to core node 320A,
(2) allocating a first time-interval in two wavelength channels 312A1 and 316A1, where upstream wavelength channel 312A1 connects edge node 310A1 to core node 320A and core wavelength channel 316A1 connects core node 320A to core node 320B,
(3) independently allocating a second time-interval in downstream wavelength channel 314A2 connecting core node 320B to edge node 310B1, and
(4) time-switching the first time-interval to the second time interval at decoupling buffer 322B1 placed at the inward port, of core node 320B, which receives core wavelength channel 316A1.

The process of setting up a path 730 from edge node 310A1 to edge node 310V1 includes steps of:
(1) time-locking edge node 310A1 to core node 320A,
(2) allocating a first time-interval in two wavelength channels 312A1 and 316A2, where upstream wavelength channel 312A1 connects edge node 310A1 to core node 320A and core wavelength channel 316A2 connects core node 320A to core node 320W,
(3) independently allocating a second time-interval in core wavelength channels 316W1 connecting core node 320W to core node 320V,
(4) independently allocating a third time-interval in downstream wavelength channel 314V1 connecting core node 320V to edge node 310V1,
(5) time-switching the first time-interval to the second time interval at decoupling buffer 322W1 placed at the inward port, of core node 320W, which receives core wavelength channel 316A2, and
(6) time-switching the second time-interval to the third time interval at decoupling buffer 322V1 placed at the inward port, of core node 320V, which receives core wavelength channel 316W1.

The process of setting up a path 740 from edge node 310A1 to edge node 310V1 is quite similar to the process of setting up a path 720. The main difference is that a wavelength channel from core node 320A is switched in its entirety, through core node 320U, to core node 320V, thus core node 320V becomes adjacent to core node 320A and path 740 effectively reduces to path 720.

The process of setting up a path 820 from edge node 410A1 to edge node 410B1 includes steps of:
(1) time-locking edge node 410A1 to core node 420A,
(2) allocating a first time-interval in upstream wavelength channel 412A1 connecting edge node 410A1 to core node 420A,
(3) allocating a second time-interval in two wavelength channels, 416A1 and 414B1, core channel 416A1 connecting core node 420A to core node 420B and downstream channel 414B1 connecting core node 420B to edge node 410B1,
(4) time-locking decoupling buffer 422A1, placed at the outward port of core node 420A from which channel 416A1 originates, to core node 420B, and
(5) time-switching the first time-interval to the second time interval at decoupling buffer 422A1.

The process of setting up a path 830 from edge node 410A1 to edge node 410V1 includes steps of:
(1) time-locking edge node 410A1 to core node 420A,
(2) allocating a first time-interval in upstream wavelength channel 412A1 connecting edge node 410A1 to core node 420A,
(4) independently allocating a second time interval in core wavelength channel 416A2 connecting core node 420A to core node 420W,
(3) independently allocating a third time-interval in two wavelength channels, 416W1 and 414v1, core channel 416W1 connecting core node 420W to core node 420V and downstream channel 414V1 connecting core node 420V to edge node 410V1,
(5) time-locking decoupling buffer 422A2, placed at the outward port of core node 420A from which channel 416A2 originates, to core node 420W,
(6) time-locking decoupling buffer 422W1, placed at the outward port of core node 420W from which channel 416W1 originates, to core node 420V,
(7) time-switching the first time-interval to the second time interval at decoupling buffer 422A2, and
(8) time-switching the second time-interval to the third time interval at decoupling buffer 422W1.

The process of setting up a path 840 from edge node 410A1 to edge node 410V1 is quite similar to the process of setting up a path 820. The main difference is that a wavelength channel from core node 420A is switched in its entirety, through core node 420U, to core node 320V, thus core node 420V becomes adjacent to core node 420A and path 840 effectively reduces to path 820.

A time-locked wavelength channel from edge node 510A1 to non-adjacent core node 520B may be realized by channel-switching through core node 520A and timing-signal exchange between a controller of edge node 510A1 and a core controller of core node 520B through upstream channel 512A1 and core channel 516A2. Likewise, a time locked wavelength channel from edge node 510A1 to core node 520W is realized by channel switching through core node 520A and timing-signal exchange between the edge controller of edge node 510A1 and the core controller of core node 520W through upstream channel 512A1 and core channel 516A3. A time-locked wavelength channel from edge node 510A1 to core node 520V is realized by channel switching through core nodes 520A and 520W and timing-signals exchange between the edge controller of edge node 510A1 and the core controller of core node 520V through upstream channel 512A1 and core channels 516A3 and 516W1.

Figure 10:
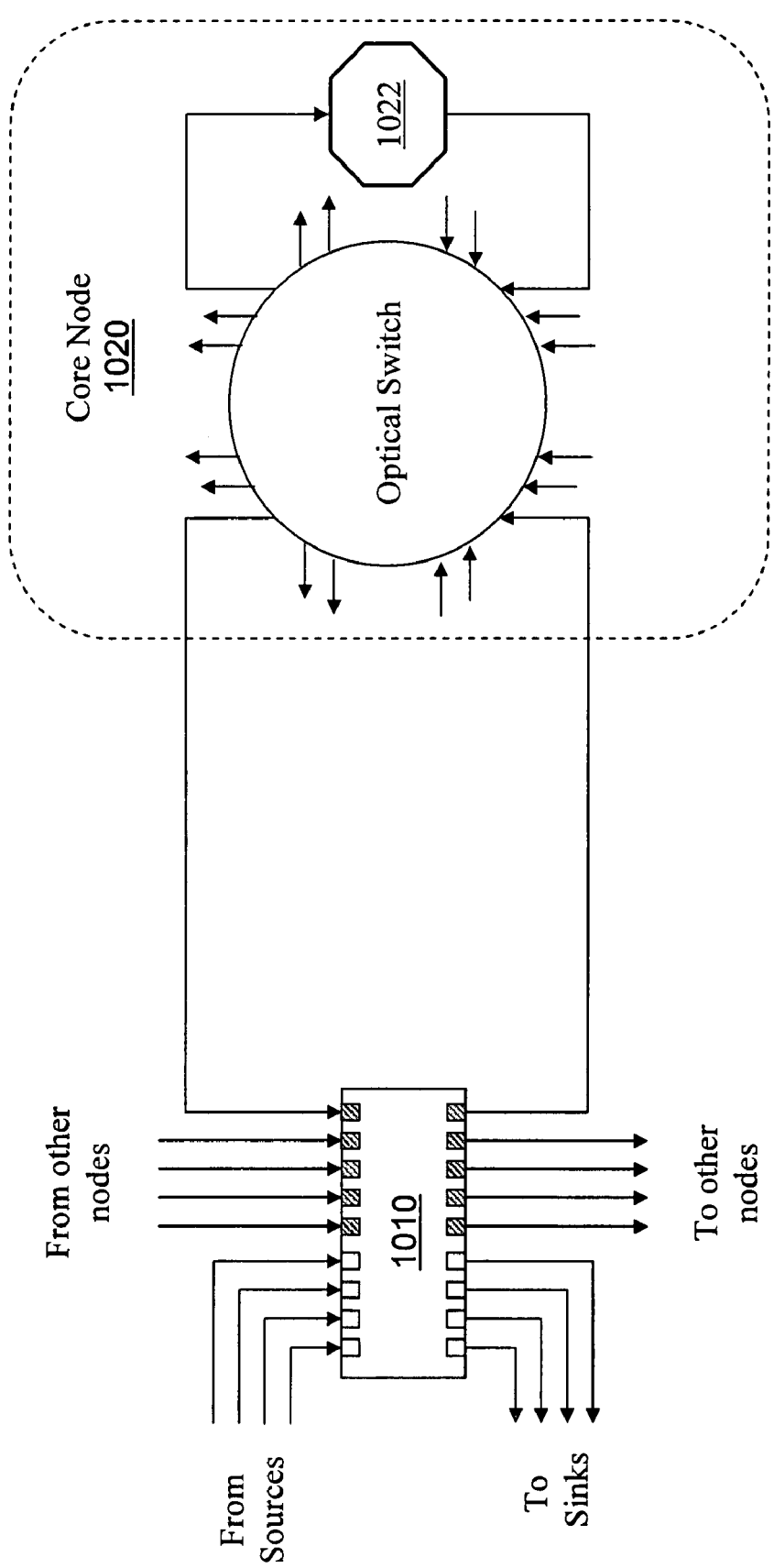
FIG. 10 illustrates a mechanism for time-locking an edge node to a core node for use in an embodiment of the present invention.

FIG. 10 illustrates a mechanism for time-locking an edge node 1010 to a core node 1020. A controller 1022 of a core node 1020 includes a time counter of a predefined period and wordlength. A wavelength channel connects an outbound port of edge node 1010 to an inlet port of core node 1020. The outbound port includes a time counter having the same period and wordlength of the time counter of the core controller 1022. An exchange of time-counter readings enables edge node 1010 to time lock to the core node 1020. The outbound ports of the edge node 1010 may connect to different core nodes 1020 and each outbound port may have its own time counter. The technique of time locking is described in the aforementioned U.S. Pat. No. 6,570,872. Time locking, as described in the above US patent, allows a node having a buffer to time lock to another node.

Control signals from an edge node to a bufferless core node are transmitted over a time-locked path. When the time-locked path carries time-limited signals such as bursts or signals confined in time-slots in a TDM frame, control signals are interleaved with payload signals. A method of establishing and maintaining time locking in a time-shared channel is described in the aforementioned U.S. patent application Ser. No. 10/054,509, filed on Nov. 13, 2001. Control signals from a core node to its adjacent core nodes are transmitted over direct paths or indirect paths through other intermediate nodes.

Burst-Switching Modes

Consider a first node sending burst streams to a second node, each burst stream comprising a succession of data bursts. The first node may form data bursts then send a descriptor of each data burst to the second node for scheduling the data-burst transfer to specified output ports of the second node. The second node may receive signals from other nodes and, hence, scheduling the transfer of signals across the second node is required to avoid collision at its output ports. Scheduling information must be sent back to the first node if the second node is not provided with signal buffers at its input. According to a first mode of burst transfer, the first node may choose to form bursts then send a descriptor of each burst to the second node, the descriptor including a burst size and a burst destination. The second node responds by sending an indication of the time at which the burst must be received at the second node. Alternatively, according to a second mode of burst transfer, the first node may choose to send a flow-rate-allocation request for a burst stream to the second node and the second node may then send back burst permits, each burst permit including a burst-size upper bound and an instant of time at which the burst must be received at the second node. The first node may choose to use the first mode for some burst streams and the second mode for other burst streams.

Each Data packet received at an input port of an edge node is switched to an output port selected according to the packet's destination. An output port can be an egress port connecting to subtending data sinks or an outbound port connecting to one of the core nodes. An outbound port connects to a specific core node and the destination of the packet determines an output port of the specific core node. The packets received at input ports of an edge nodes may be grouped into data streams defined according to their destination sink node. A destination sink node, in turn, is reached through at least one output port of a core node. The packet streams defined at input may be rate regulated. At an outbound port of the edge node, data packets received from several input ports may be grouped into data bursts where all constituent packets of a data burst are directed to the same output port of the core node to which the outbound port connects. At the outbound port of the edge node, data bursts may be grouped into two categories according to the desired switching mode. In the first switching mode, a request to schedule a burst is sent to a core node only after the burst is formed. In the second mode, the core node to which the outbound port is connected sends burst-transfer permits to the edge node. Messages from a core node to inbound ports of edge nodes are carried by downlinks as will be described below.

Completely-Coupled Core

Figure 11:
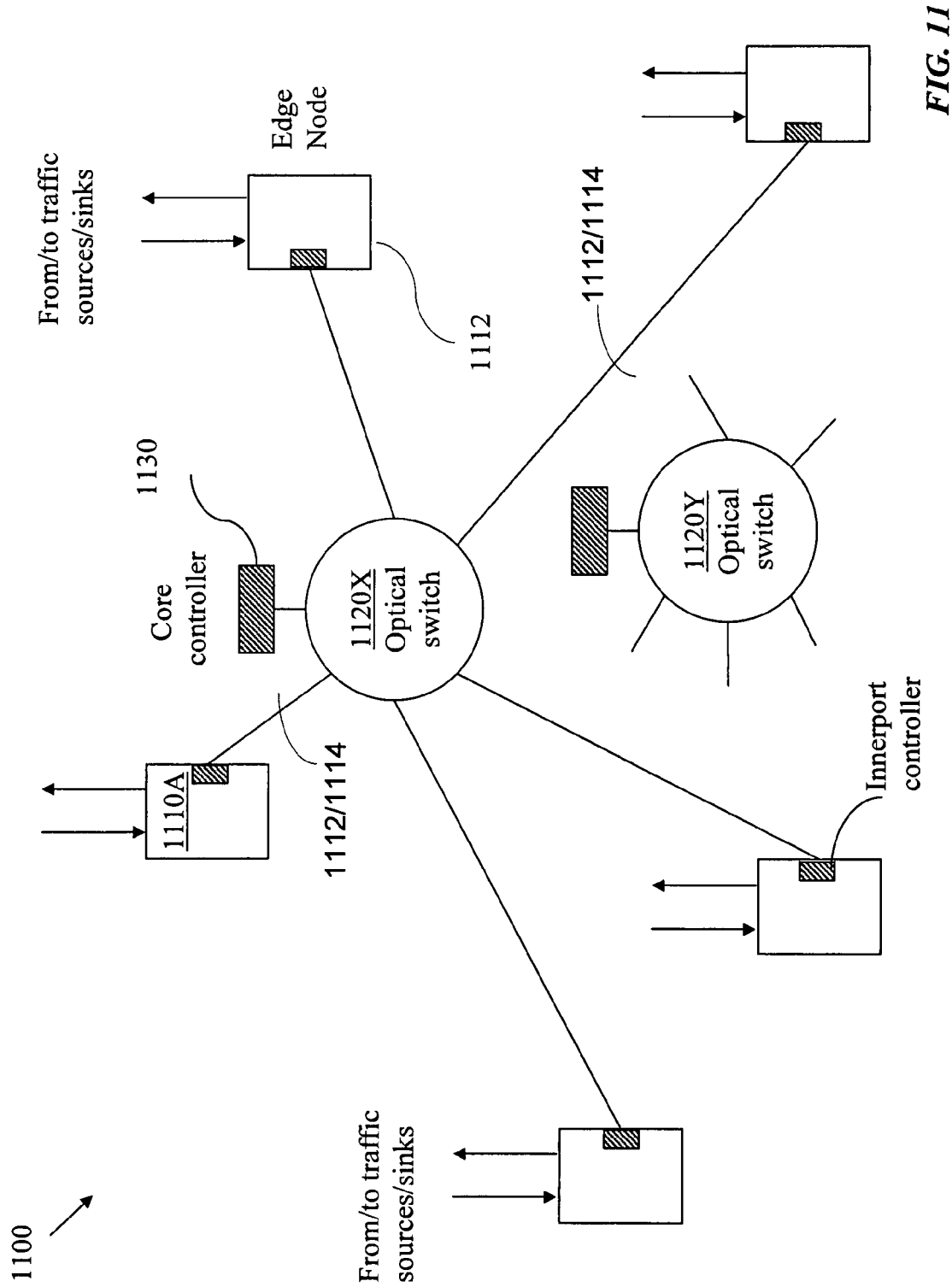
FIG. 11 illustrates a prior-art network having a plurality of edge nodes interconnected by independent bufferless core nodes.

FIG. 11 illustrates a composite-star network comprising a plurality of edge nodes 1110 interconnected by a plurality of independent core nodes 1120, two of which are illustrated.

The core nodes 1120 are bufferless and may comprise electronic space switches or optical space switches. Controllers of edge nodes 1110 communicate with controllers of core nodes 1120 to enable time locking the edge nodes to their adjacent core nodes.

An upstream channel 1112 connecting an edge node 1110-A to a specific core node, 1120-X for example, may be a channel in an upstream link connecting the edge node 1110-A to the core node 1120-X or a channel in a link from the edge node 1110-A that is switched through another core node 1120 to the specific core node 1120-X. Likewise, a downstream channel 1114 from a core node 1120 to an edge node 1110A may be a direct channel or a channel switched through another core node 1120.

An edge node 1110 may connect to selected core nodes 1120. The round-trip propagation delays between the edge node 1110 and the individual core nodes 1120 may vary significantly. An outbound-port controller (not illustrated) of the edge node 1110 may determine the burst-switching mode to be used with respect to each core node 1120. The edge node 1110 has at least one outbound port linked to each of the selected core node 1120, and the burst formation at each outbound port depends on the mode of burst switching used. The selection of the burst switching mode may be based on traffic classes. An outbound port may use the first mode for delay-tolerant traffic and the second mode for delay-sensitive traffic. The mode selection may also be based on the proximity of the core node to the edge node as will be described below.

To facilitate time-division-multiplexed (TDM) sharing of channel capacity among several connections, a conventional slotted TDM frame may be used (FIG. 12A). A connection may be allocated several time slots per TDM frame as illustrated in FIG. 12B. At least one time slot per TDM frame, herein called a control time slot, may be used for communicating control signals. FIG. 12C illustrates a time-sharing scheme where successive bursts, possibly belonging to different data streams, are transmitted along a time-shared channel connecting a first node to a second node. A control burst, containing control data from one node to another, is inserted at arbitrary time intervals. FIG. 12C illustrates the propagation of bursts labeled 90 to 95 from the first node to the second with a control burst containing transfer requests for bursts labeled 160 to 184 interleaving the data bursts.

FIG. 12D illustrates data transfer using both a burst mode and a TDM mode. Time is organized in time frames 1210. Each time frame 1210 is dynamically divided between a sub-frame 1220 to be used for TDM and a sub-frame 1230 to be used for burst transfer. The boundaries between sub-frames 1220 and 1230 are flexible. The duration T of the time frame 1210 is selected to be large enough to allow a contiguous period of time to schedule bursts of variable sizes, and short enough to render the delay for a TDM connection using one time slot per frame 1210 acceptable. Selecting the duration T to be 1 millisecond and a time-slot duration $\Delta$ for the TDM sub-frame as one microsecond, and limiting the size of each data burst so that the burst duration on a shared channel does not exceed 10 microseconds, for example, then a sub-frame 1220 of 250 time slots, for example, would have a duration of 250 microseconds, thus leaving a contiguous interval of 750 microseconds for sub-frame 1230. An interval of 750 microseconds would accommodate a minimum of 75 data bursts, each limited to a duration of 10 microseconds. It is noted that at channel capacity of 10 Gb/s, a burst of 10 microseconds includes 12500 octets (100,000 bits), which is much larger than a typical data packet and a data burst may then contain numerous data packets.

A scheduler handling interleaved TDM-burst intervals is required to ensure that a burst is completely contained in a sub-frame 1230. This may lead to a slight waste, less than the maximum duration of a burst (10 microseconds in the above example) per sub-frame 1230. The waste can be further reduced by scheduling control bursts, which typically have relatively short duration at the end of a sub-frame 1230.

In order to realize high scheduling efficiency, temporal-packing techniques, well-known in the art, may be employed. For example, time-slots for the TDM sub-frame 1220 may be attempted starting from a fixed position, proceeding across the sub-frame 1220 in a predetermined order. To increase the contiguous time-interval to be used for sub-frame 1230, the fixed position should be the start or end of a sub-frame 1220, and the predetermined order should be a forward sequential order, when the fixed position is the start of sub-frame 1220 or in a backward sequential order when the fixed position is the end of sub-frame 1220. It is noted that, during time-frame 1210, the scheduling process may perform temporal-matching processes of input and output ports of core nodes over successive (future) time frames 1210.

Figure 13:
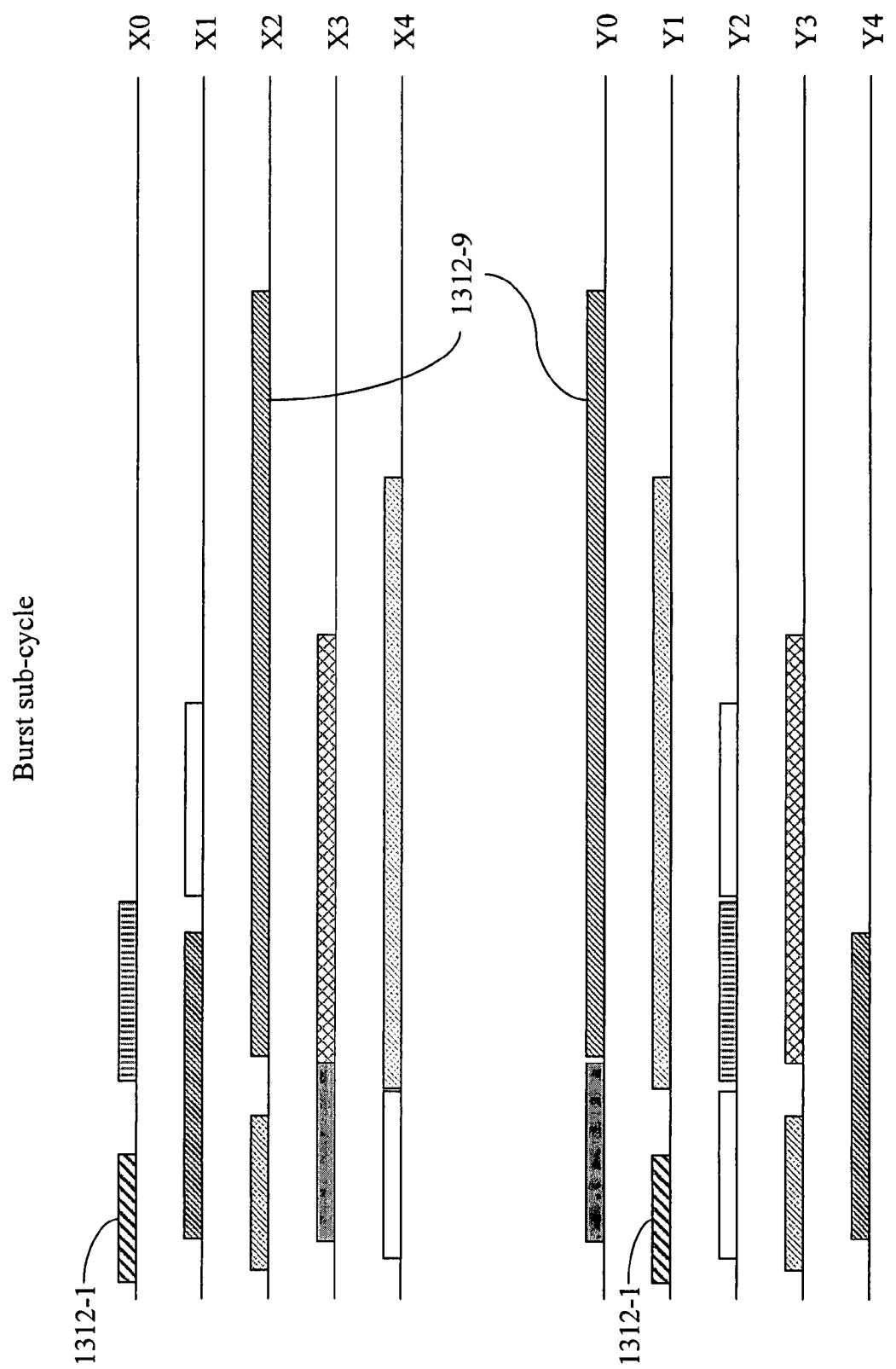
FIG. 13 illustrates a process of burst scheduling in a switch fabric having five input ports and five output ports for use in an embodiment of the present invention.
Figure 14:
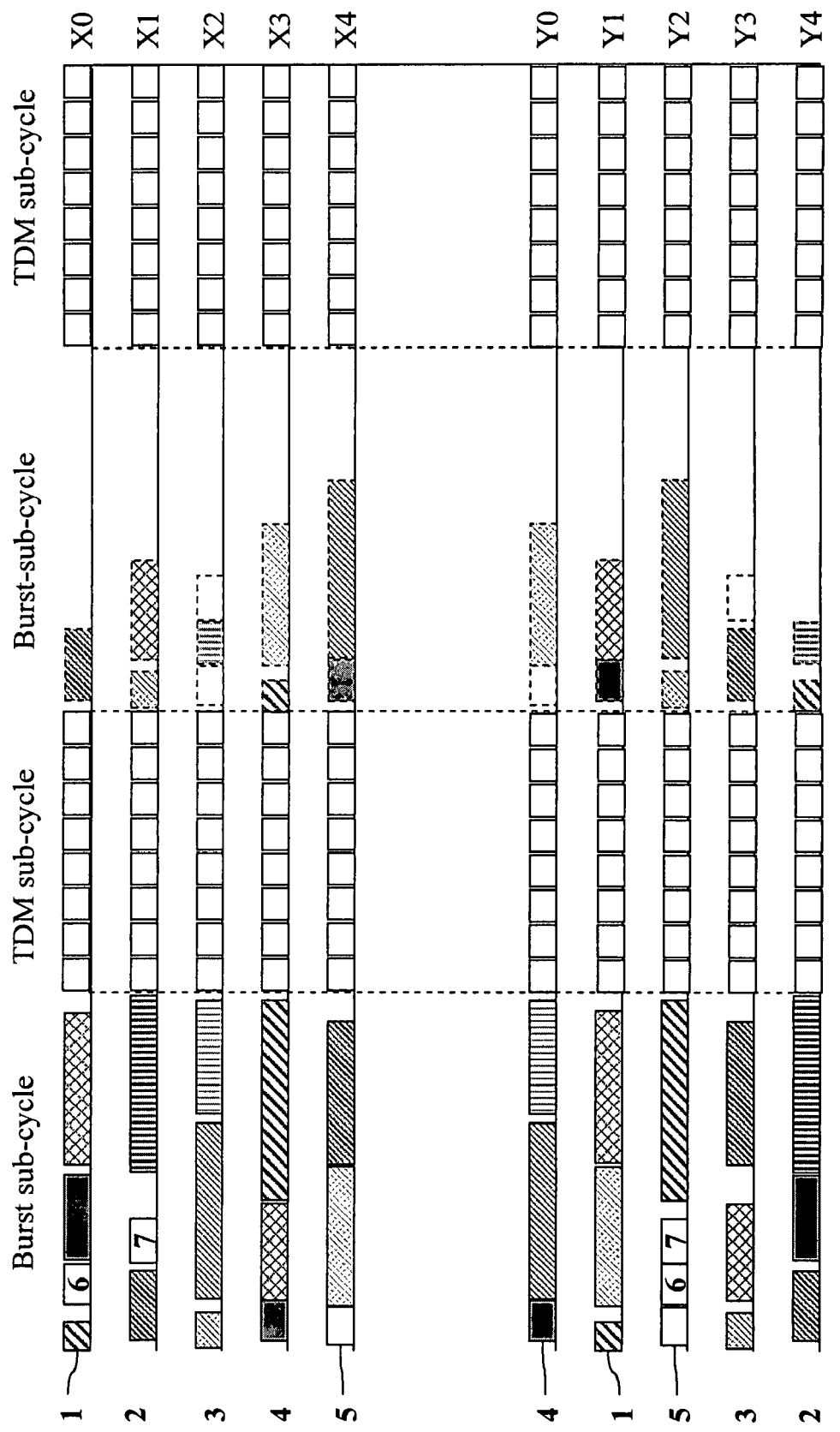
FIG. 14 illustrates a process of interleaved burst and TDM scheduling in a switch fabric having five input ports and five output ports in accordance with an embodiment of the present invention.

FIG. 13 illustrates burst scheduling in a space switch having five input ports labeled X0, X1, X2, X3, and X4 and five output ports labeled Y0, Y1, Y2, Y3, and Y4. The figure illustrates a burst 1312-1 transferred from input port X0 to output port Y1 and a burst 1312-9 transferred from input port X2 to output port Y0. The scheduling process preferably attempts to reduce unused time intervals between successive bursts. A burst scheduler that attempts to reduce the idle time between successive bursts is described in the aforementioned Applicant's U.S. patent application Ser. No. 09/750,071, filed on Dec. 29, 2000 and titled "Burst Switching in a High-Capacity Network", the specification of which is incorporated herein by reference FIG. 14 illustrates a burst-scheduling process in a space switch having five input ports and five output ports using time frames each including a burst sub-frame and a TDM sub-frame as described with reference to FIG. 12D. Exemplary bursts transferred from input to output are likewise labeled in FIG. 14. The scheduler described in the aforementioned patent application Ser. No. 09/750,071 can be adapted to schedule interleaved burst-TDM switching by treating the TDM frames as pre-scheduled bursts.

Bimodal Edge Node

Figure 15:
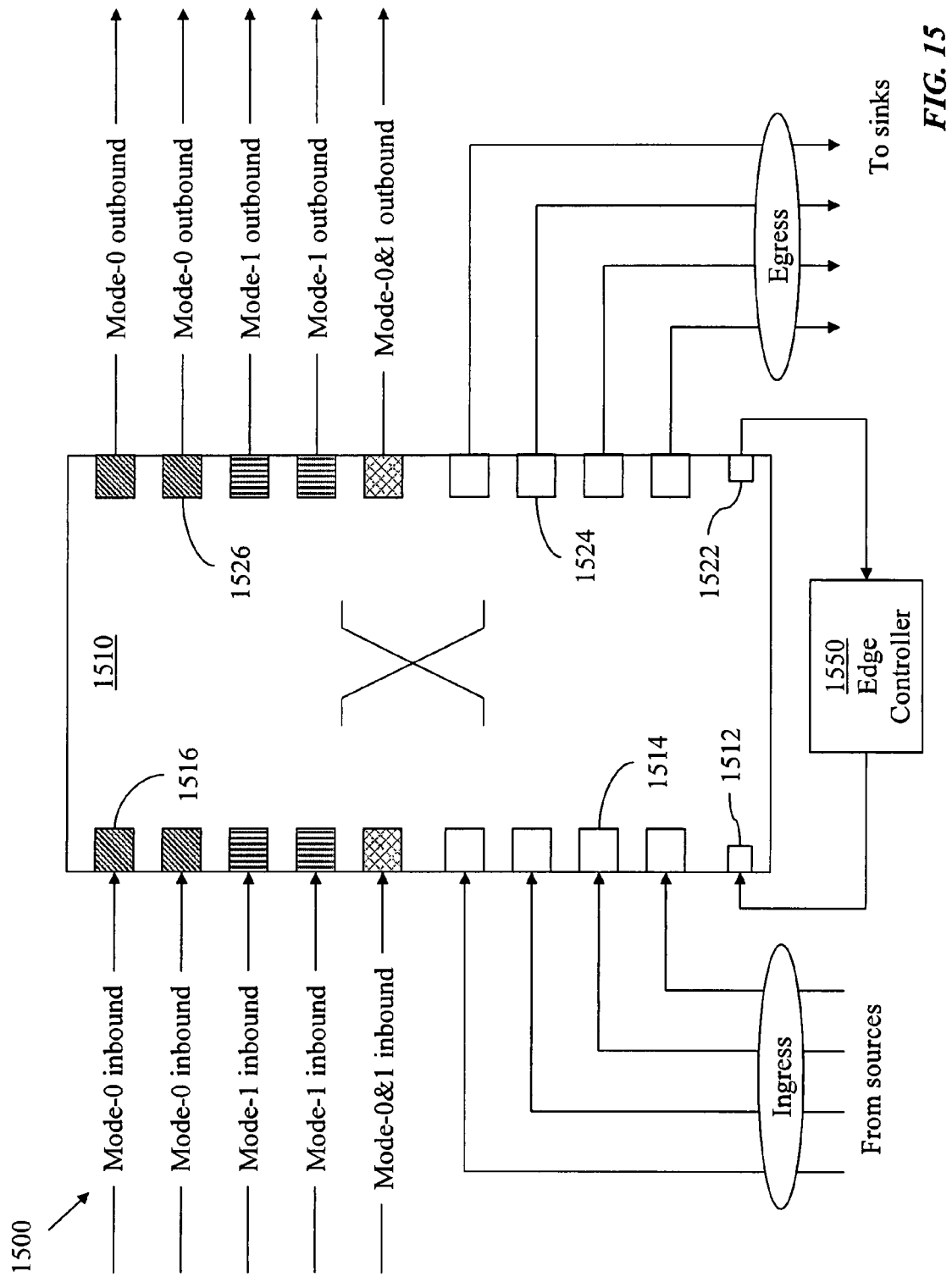
FIG. 15 illustrates an edge node adapted to transmit and receive data bursts from core nodes in accordance with an embodiment of the present invention.

FIG. 15 illustrates a configuration of an exemplary edge node 1510 having nine input ports and nine output ports. The input ports are divided into ingress ports 1514 receiving signals from subtending sources (not illustrated) and inbound ports 1516 receiving signals from external nodes. The output ports are divided into egress ports 1524 delivering signals to subtending sink (not illustrated) and outbound ports 1526 sending signals to external nodes. An external node may be a core node or another edge node. An ingress port 1514 may be adapted to receive data packets or data bursts from subtending sources and an egress port 1524 may be adapted to transmit data packets or data bursts to subtending sinks. A data burst may include several packets. An inbound port 1516 is adapted to receive data bursts from external nodes and parse each burst into separate constituent data packets that may be directed to different egress ports 1524 and outbound ports 1526. An outbound port 1526 is adapted to receive packets from ingress ports 1514 and inbound ports 1516 through the switching fabric 1540 and assemble packets of the same destination into data bursts. An edge node 1510 preferably switches signals from ingress ports to egress ports and outbound ports and from inbound ports to egress ports. However, it may be desirable that an edge node 1510 also perform a tandem-switching function and transfer data from inbound ports 1516 to outbound ports 1526. A controller 1550 of edge node 1510 receives control signals from input ports either through a data bus connecting the input ports or through the switching fabric in several ways well known in the art. Likewise, the edge node controller 1550 communicates with output ports through a bus or through the switching fabric. Controller 1550 may communicate with the input and output ports through the switching fabric 1540, a control input port 1511, and a control output port 1522 as illustrated. Control signals from the edge controller 1550 are sent to output ports of the edge node through control input port 1511 and the switch fabric 1540. Control signals received at the input ports of the edge node are sent to the edge controller 1550 through the switch fabric 1540 and the control output port 1522.

At least one outbound port of edge node 1510 has a burst-formation device that aggregates data packets into data bursts according to one of the burst-transfer modes described above. The burst-formation device will be described below with reference to FIG. 35.

Each core node is provided with a core controller. The controller receives control signals from incoming links and transmits control signals through outgoing links. A link may carry signals in several spectral bands, often referenced as wavelength channels. With photonic switching, baseband data is not detected from incoming optical signals and the controller has to rely on either of two methods of acquiring the control information. In a first method, the control signals are carried in a dedicated spectral band (dedicated wavelength channel) and the method is often referenced as an 'out-of-band-control' method. A dedicated spectral band would be used within an upstream fiber link from an edge node to a core node, a downstream fiber link from the core node to the edge node, and possibly a core link connecting core nodes. In a second method, the control signals are time-interleaved with payload signals received from and transmitted to an edge node. The signals are retrieved by temporal identification of their relative position in a time frame. This process requires that the edge node be time-locked to the core node.

Figure 16:
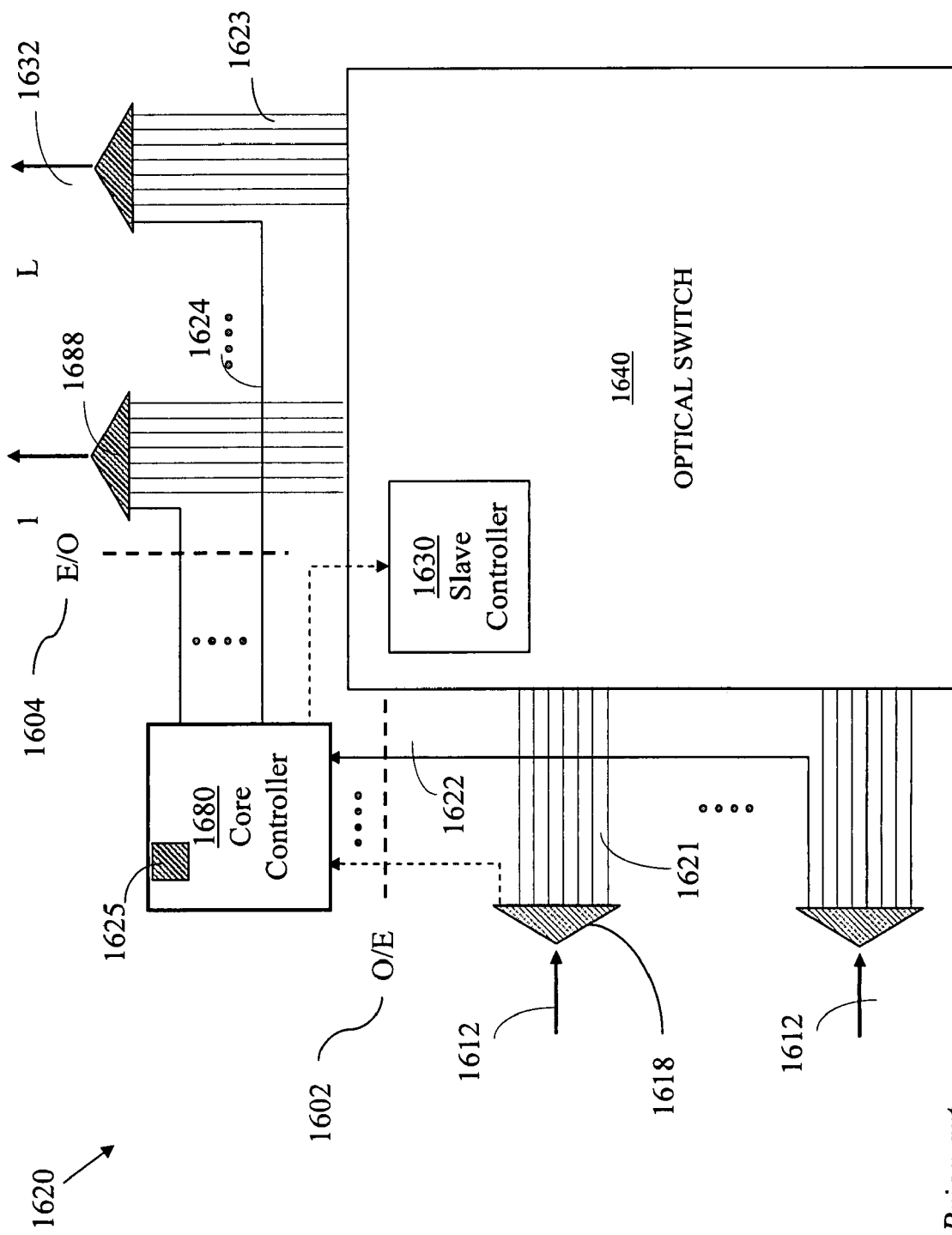
FIG. 16 illustrates a core node receiving and transmitting control signals over separate spectral bands for use in an embodiment of the present invention.

FIG. 16 illustrates a core node 1620 adapted for out-of-band control. The core node comprises an optical switch fabric 1640. An input fiber link 1612 is demultiplexed at a demultiplexer 1618 into component wavelength channels. At the output of the optical switch fabric 1620, groups of output payload wavelength channels 1623 are received by multiplexers 1688 where the output payload wavelength channels 1623 are multiplexed into output fiber links 1632.

The core node includes a core controller 1680 for controlling the operation of the optical switch fabric 1620. To communicate with controllers of the electronic edge nodes and the core node, each input fiber link 1612 and output fiber link 1632 may include a control wavelength channel dedicated to carry control signals. An input control wavelength channel 1622 is sent to the core controller 1680 through an optical-to-electrical (O-E) interface 1602. Conversely, the core controller 1680 sends an output control wavelength channel 1624, through an electrical-to-optical (E-O) interface 1604, to each multiplexer 1688 to be included in the signal placed on the output fiber links 1632.

The core controller 1680 includes an admission controller 1625 that receives connection requests from edge nodes for the establishment of connections through the core node to other edge nodes. The admission controller 1625 may also receive requests from edge nodes for increments or decrements in the capacity of previously established connections, or the complete removal of previously established connections. Based on a record of the occupancy of the input ports and output ports of the optical switch fabric 1640, the admission controller 1625 may accept or reject a given request for a capacity increment. A slave controller 1630 periodically receives from core controller 1680 a connection schedule for each input port and configures the switch fabric 1640 accordingly. The connection schedule specifies time instants at which each input port establishes a connection to a corresponding output port.

Figure 17:
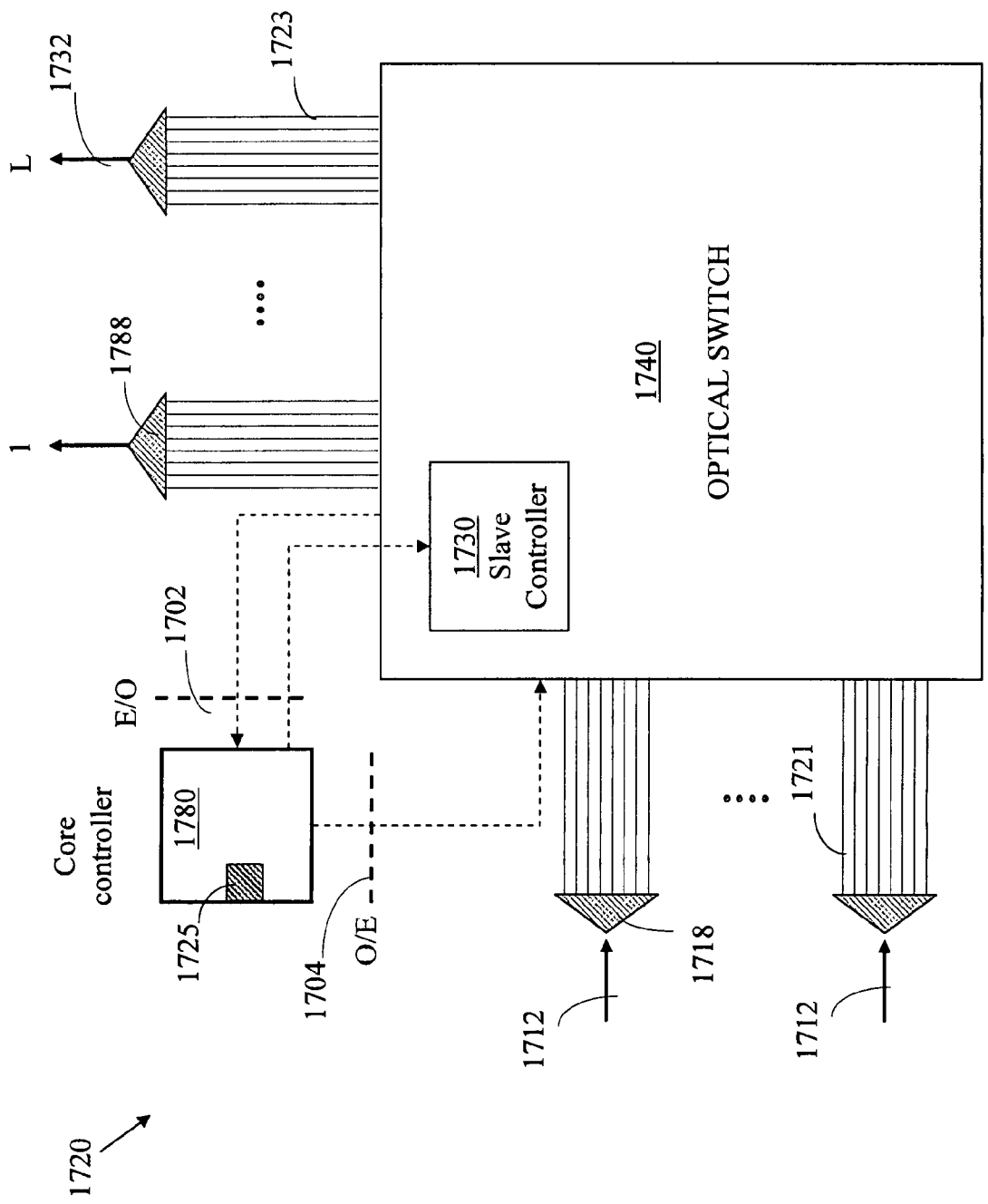
FIG. 17 illustrates a core node receiving and transmitting control signals interleaved with payload signals for use in an embodiment of the present invention.

FIG. 17 presents a second core node 1720 adapted for in-band control. In-band control time multiplexes control signals with payload signals as described above. When in-band control is used, the transmitting device must time-lock to the receiving device. In-band control may be realized only when the input channels and output channels of the core node are time-shared either in a TDM mode or in a burst mode.

The core node 1720 comprises an optical switch fabric 1740. An input fiber link 1712 is demultiplexed at a demultiplexer 1718 into component wavelength channels. At the output of the optical switch 1740, groups of output payload wavelength channels 1723 are received by multiplexers 1788 where the output payload wavelength channels 1723 are multiplexed into output fiber links 1732. The core node 1720 includes a core controller 1780 for controlling the operation and connectivity of the optical switch fabric 1740. Core controller 1780 has a channel from the switch fabric 1740 through an O-E interface 1702 and a channel to the switch fabric 1740, through an E-O interface 1704. Core controller 1780 has an internal connection to a slave controller 1730 which configures the connectivity of the switch fabric 1740 according to instructions received from the core controller 1780. At least one wavelength channel within each input fiber link 1712 may be time shared. The core controller 1780 of FIG. 17 includes an admission controller 1725. Core controller 1780 periodically sends a connection schedule to slave controller 1730 which configures the switch fabric 1740 accordingly. The connection schedule specifies time instants at which each input port establishes a connection to a corresponding output port.

The optical switch fabric 1640 or 1740 may comprise a single switching plane or parallel switching planes. If a single switching plane is used, wavelength converters may be needed at input or at output.

Each of the control functions of the core controller 1680 or core controller 1780 can be implemented in application-specific hardware, which is the preferred implementation when high speed is a requirement. However, in an alternative implementation, the core controller 1680 or 1780 may be loaded with controlling software for executing methods exemplary of this invention.

Figure 18:
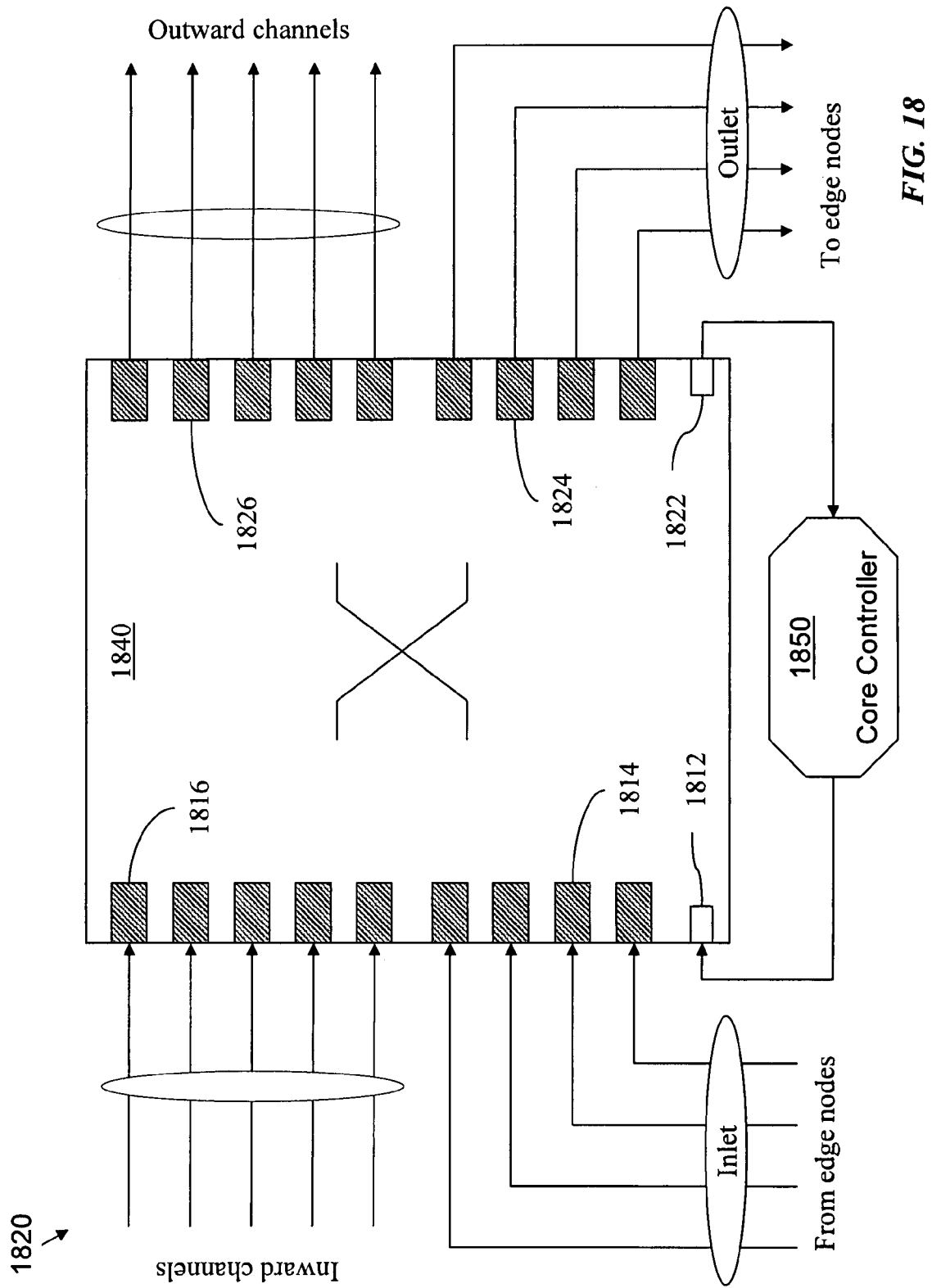
FIG. 18 illustrates a prior-art core node in the network of FIG. 2.

FIG. 18 illustrates a prior-art core node 1820 (corresponding to core node 220 of FIG. 2) having buffers at each inlet port 1814, inward port 1816, outlet port 1824, and outward port 1826. A core controller 1850 receives control signals from inlet ports 1814 and inward ports 1816 through the switch fabric 1840 and output control port 1822. The core controller 1850 distributes control signals to outlet ports 1824 and outward ports 1826 through input control port 1812 and the switch fabric 1840. Time coordination with subtending edge nodes and other core nodes 1820 is not required due to the availability of buffers which permit both time alignment and decoupling. This arrangement is suitable if the switch fabric 1840 is electronic. With an optical switch fabric, each input buffer requires optical-to-electrical (O-E) conversion and electrical-to-optical (E-O) conversion, and each output buffer requires O-E and E-O conversion (not illustrated).

Figure 19:
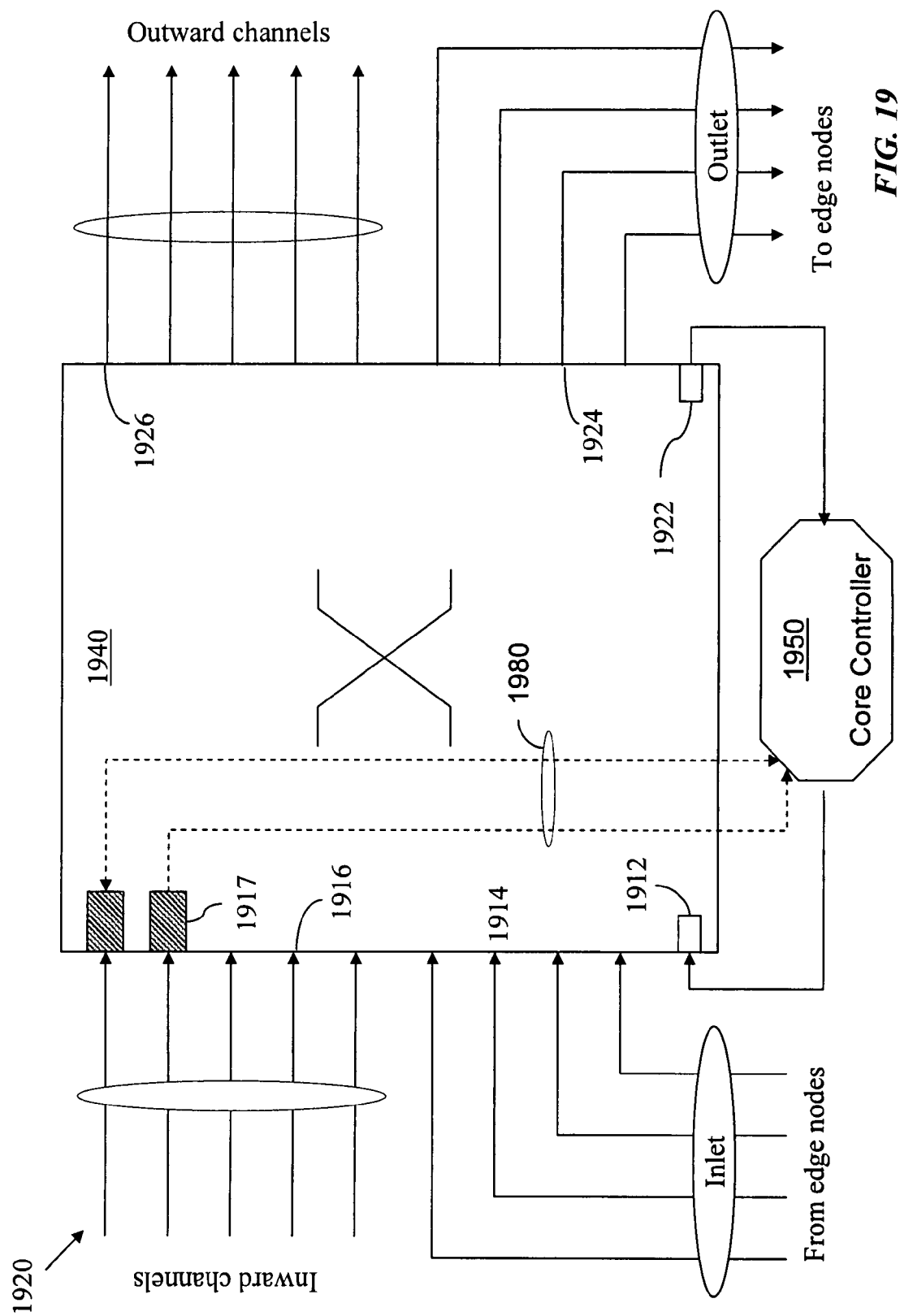
FIG. 19 illustrates a core node in the network of FIG. 3 in accordance with an embodiment of the present invention.

FIG. 19 illustrates a core node 1920 (corresponding to core node 320) having buffers at selected inward ports 1916. All other ports are bufferless. The buffers at the selected inward ports have control paths 1980 to core controller 1950. Control paths 1980 may share a common internal channel (not illustrated). The control paths are necessary for timing the transfer of signals across the switch fabric 1940. A core controller 1950 receives control signals from inlet ports 1914 and inward ports 1916 through the switch fabric 1940 and output control port 1922. The core controller 1950 distributes control signals to outlet ports 1924 and outward ports 1926 through input control port 1922 and the switch fabric 1940. Inlet channels, originating from subtending edge nodes and terminating on inlet ports, can be time-locked due to the availability of buffers at the electronic edge nodes. Inward channels arriving from other core nodes 1920 to inward ports 1917 that are provided with buffers need not be time locked. Inward channels arriving at an inward port 1916 that is not provided with a buffer is switched in its entirety to either an outward channel 1926 leading to another core node or to an outlet channel 1924 leading to a subtending edge node.

The core controller 1950 includes a master time counter and a master timing circuit (not illustrated) adapted to transmit and receive timing signals. The master timing circuit distributes a time reference to inward ports 1917. The core controller 1950 is adapted to receive connection requests from, and transmit connection schedules to, subtending edge nodes. The core controller 1950 further includes a scheduling mechanism for computing the connection schedules as will be described with reference to FIG. 33.

The core controller 1950 may receive burst-transfer requests and compute corresponding burst-transfer schedules. The core controller 1950 may also receive flow-rate-allocation requests and schedule a corresponding number of time slots per time-division-multiplexed frame. Alternatively the core controller 1950 may compute burst-transfer permits based on the flow-rate-allocation requests. The core controller 1950 may further be adapted to allocate an entire channel to an outward port leading to a selected edge node subtending to another core node.

Figure 20:
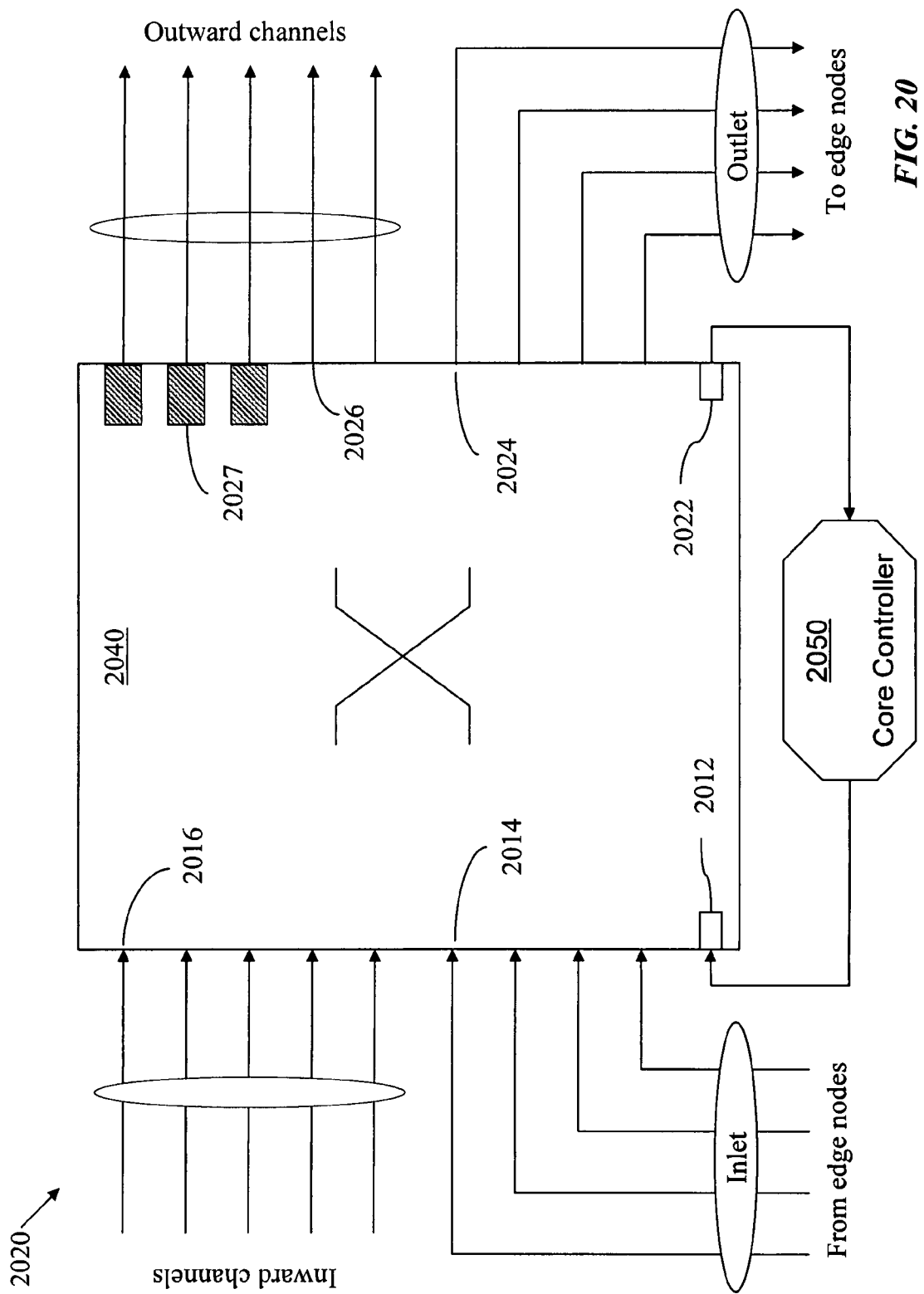
FIG. 20 illustrates a core node in the network of FIG. 4 in accordance with an embodiment of the present invention.

FIG. 20 illustrates a core node 2020 (corresponding to a core node 420) having buffers at selected outward ports 2027. All other ports are bufferless. A core controller 2050, similar to core controller 1950, receives control signals from inlet ports 2014 and inward ports 2016 through the switch fabric 2020 and output control port 2022. The core controller 2050 distributes control signals to outlet ports 2024 and outward ports 2026/2027 through input control port 2012 and the switch fabric 2040. Inlet channels, originating from subtending edge nodes and terminating on inlet ports, can be time-locked due to the availability of buffers at the electronic edge nodes. An inward channel arriving from an outward port 2027 of another core node, where the outward port 2027 has a buffer, can be time locked. An inward channel arriving to a core node 2020A from a bufferless outward port 2026 of another core node is switched in its entirety to either an outward channel connecting to outward port 2026 of core node 2020A leading to another core node or to an outlet channel connecting to outlet port 2024 leading to a subtending edge node.

Figure 21B:
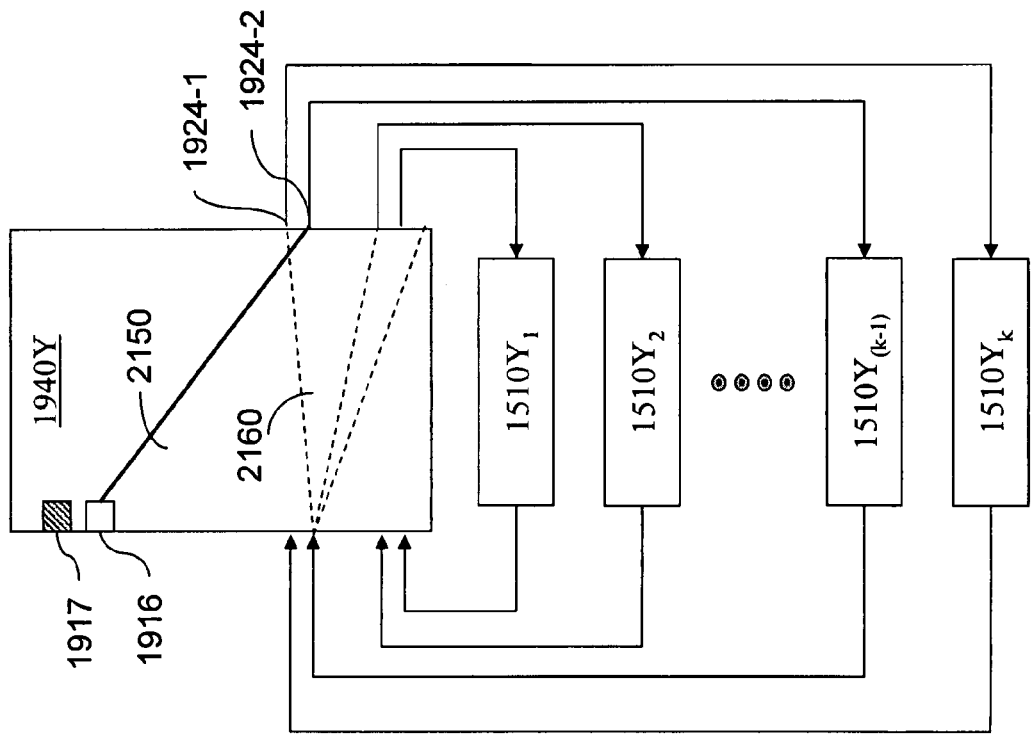
FIG. 21B illustrates signal switching from a bufferless inward port to a plurality of outlet ports in an optical switching fabric in accordance with an embodiment of the present invention.
Figure 21A:
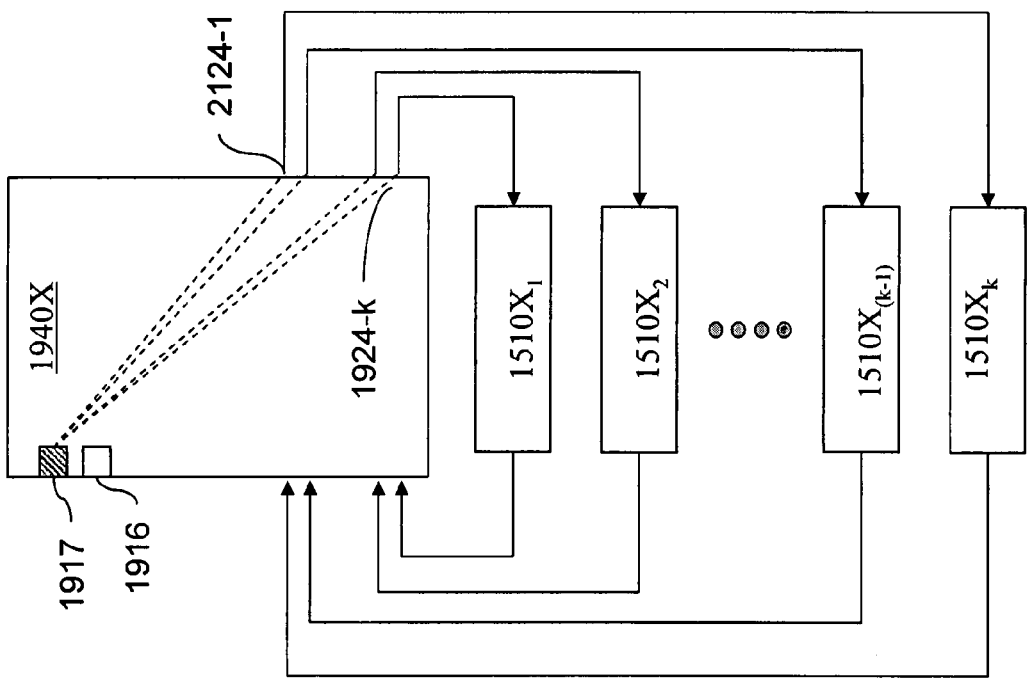
FIG. 21A illustrates signal switching from an inward port provided with a buffer to a plurality of outlet ports in an optical switching fabric in accordance with an embodiment of the present invention.

FIG. 21A illustrates signal switching within an optical switch fabric 1940X from an inward port 1917, provided with a buffer, to a plurality of outlet ports 1924 and outward ports 1926. A port 1917 may receive an inward channel carrying time-limited signals destined to edge nodes 1510 (FIG. 15) subtending to optical switch fabric 1940X and to other core nodes. A signal destined to an edge node 1510 is switched to an outlet port 1924 connecting to the edge node. An edge node connects to a core node through at least one inlet port and at least one outlet port. A signal destined to another core node is switched from inward port 1917 to a respective outward port of switch fabric 1940.

FIG. 21B illustrates signal switching from a bufferless inward port 1916 to a plurality of outlet ports 1924 in an optical switching fabric 1940Y. An inward port 1916 may receive an inward channel carrying time-limited signals to be processed by a subsequent core node (not illustrated) or to subtending edge nodes 1510. Due to the absence of a buffer at the inward port, the inward channel must be switched in its entirety to either an outward port leading to another core node or to an outlet port leading to a single subtending edge node, such as edge-node 1510Y2 in the illustrated example. Edge node 1510Y2, which is equipped with buffers, may then switch the time-limited signals destined to neighboring edge nodes 1510Y1, 1510Y3, . . . , 1510Yk, through the switch fabric 1940Y. Thus, the arrangement of FIG. 21B requires that a portion of the signals destined to the subtending edge nodes be switched twice through the switch fabric, firstly along a path 2150 from the inward port to one of the edge nodes 1510, and secondly along path 2160 from an inlet port to respective outlet ports.

Figure 22:
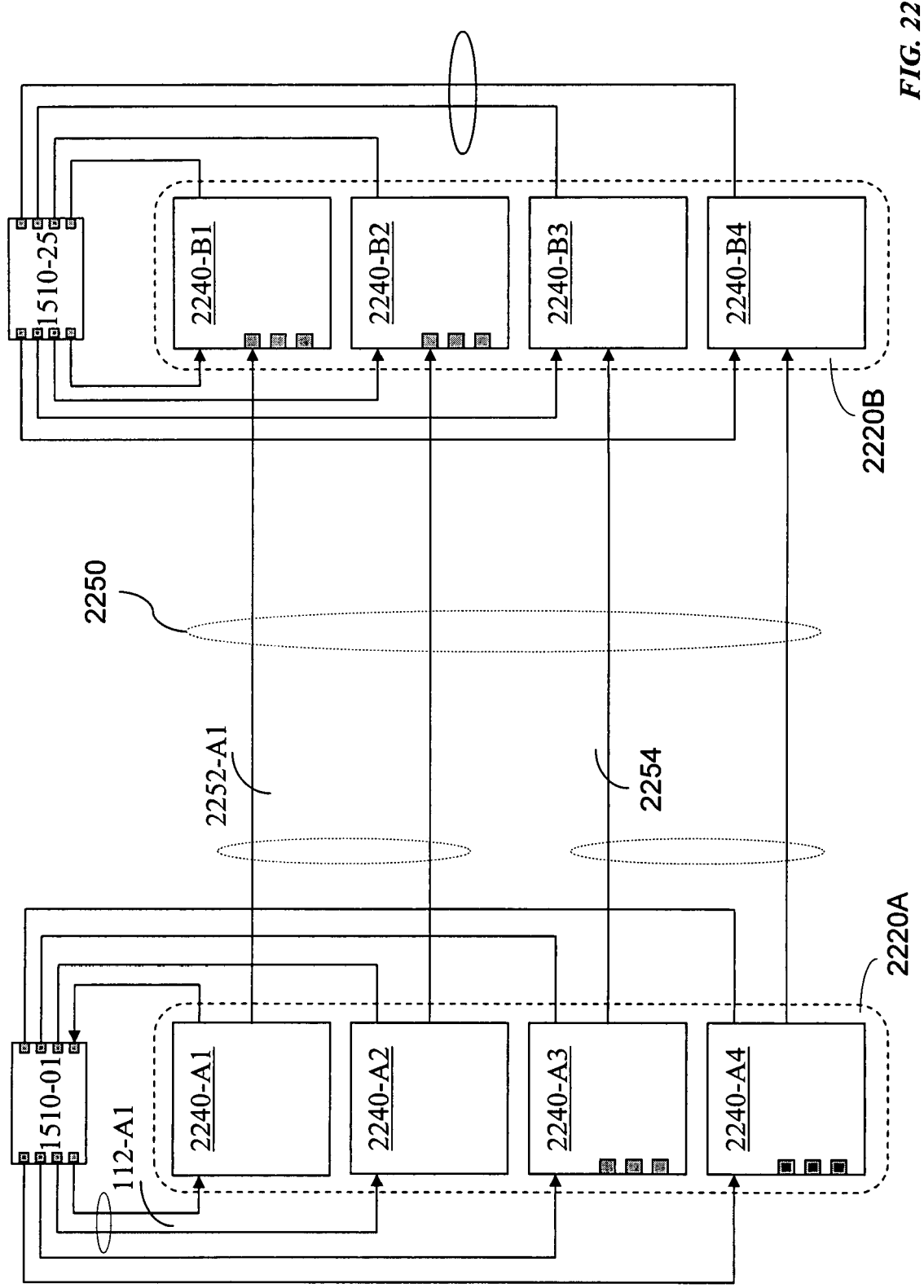
FIG. 22 illustrates an arrangement for connecting optical switches each comprising a plurality of switch fabric with selected inward ports provided with buffers in accordance with an embodiment of the present invention.

FIG. 22 illustrates two core nodes 2220A and 2220B. A core link 2250 between two core nodes 2220A and 2220B may be a wavelength-division-multiplexed (WDM) fiber-optic link and, to realize high-capacity, some of the core nodes may comprise a multi-plane switch having two or more switch planes each plane being an optical switch fabric. Each of the two core nodes in this example has four switch planes 2240. An edge node may connect to a multi-plane core node by several upstream channels and several downstream channels. The switch planes of a core node need not be identically configured. In the illustrated example, two switch planes, 2240A1 and 2240A2, have no buffers while switch planes 2240A3 and 2240A4 of core node 2220A have the configuration of FIG. 19, where some inward ports are provided with buffers. Core node 2220B is similarly configured with two switch planes 2240B1 and 2240B2 having the configuration of FIG. 19 and the other two switch planes, 2240B3 and 2240B4, are bufferless. Two core channels 2252 connect the bufferless switch fabrics 2240A1 and 2240A2 of core node 2220A to the two switch fabrics 2240B1 and 2240B2 of core node 2220B that have inward buffers as illustrated. Two core channels, 2254, connect switch fabrics 2240A3 and 2240A4 to the two bufferless switch fabrics 2240B3 and 2240B3. A path along a core channel 2252 may carry time-limited signals to be switched in a switch plane 2240B1 or 2240B2 in a manner similar to that described above with reference to FIG. 21A. A path along a core channel 2254 may carry time-limited signals to be switched in a switch plane 2208B3 or 2208B4, with some signals possibly double switched through switch plane 2240B3 or 2240B4 as described with reference to FIG. 21B.

Figure 23:
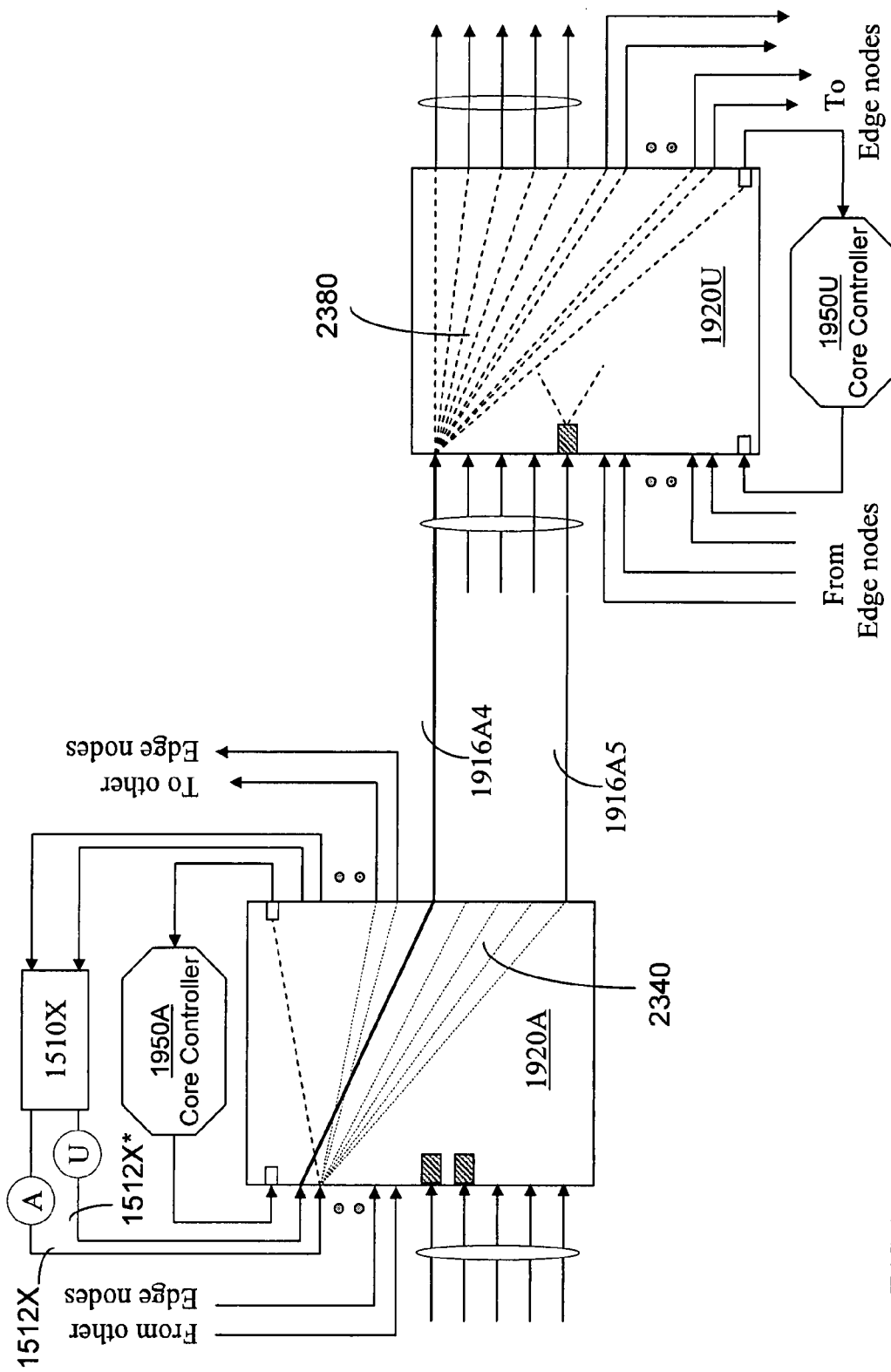
FIG. 23 illustrates time-locking of a path traversing two core nodes of the type illustrated in FIG. 19 in accordance with an embodiment of the present invention.

FIG. 23 illustrates a path from an edge node 1510X, adjacent to a core node 1920A, to a core node 1920U. The path comprises an upstream channel 1512X and a core channel 1916A4 that connects a bufferless outward port of core node 1920A to a bufferless inward port of core node 1920U. The upstream channel 1512X is exclusively switched to the core channel 1916A4 through core node 1920A. In order to establish the internal path through core node 1920A, edge node 1510X must be able to communicate with the controller 1950A of core node 1920A. Furthermore, in order to establish switched paths 2380 from edge node 1510X through core node 1920U, edge node 1510X must be time-locked to core node 1950U.

The edge node 1510X may have out-of-band control channels (not illustrated) to and from the controller 1950A of adjacent core node 1920A, in which case the edge node 1510X can send a connection request to core controller 1950A to establish the internal connection across core node 1920A. Out-of-band control requires that each edge node dedicate a control channel to each adjacent core node.

If the edge node 1510X is to transmit in-band time-interleaved control signals to core controller 1950A, it must apply a time-locking process as described earlier with reference to FIG. 10. Time-locking edge node 1510X to core node 1920A precludes time locking the edge node 1510X to core node 1920U. However, if edge node 1510X has at least two upstream channels 1512 to core node 1920A, then at least one of the upstream channels may time-lock to core node 1920A in order to enable edge node 1510X to exchange control signals with core controller 1950A, and at least one of the remaining upstream channels from edge node 1510X to core node 1920A may be channel switched (i.e., exclusively switched) through internal connection 2340 to core channel 1916A4 leading to an inward port of core node 1920U. Core node 1920U would then become effectively adjacent to edge node 1510X, until the path from the edge node 1510X to core node 1920U is terminated, and the aforementioned time-locking process can be applied with an exchange of timing messages between the edge controller of edge node 1510X and core controller 1950U. In FIG. 23, upstream channel 1512X\* is time-locked to core node 1920A and time-limited signals carried by upstream channel 1512X\* can be switched to core channel 1916A5 leading to a buffered input port of core node 1920U from which the time-limited signals may be switched to several output ports of core node 1920U.

Figure 24:
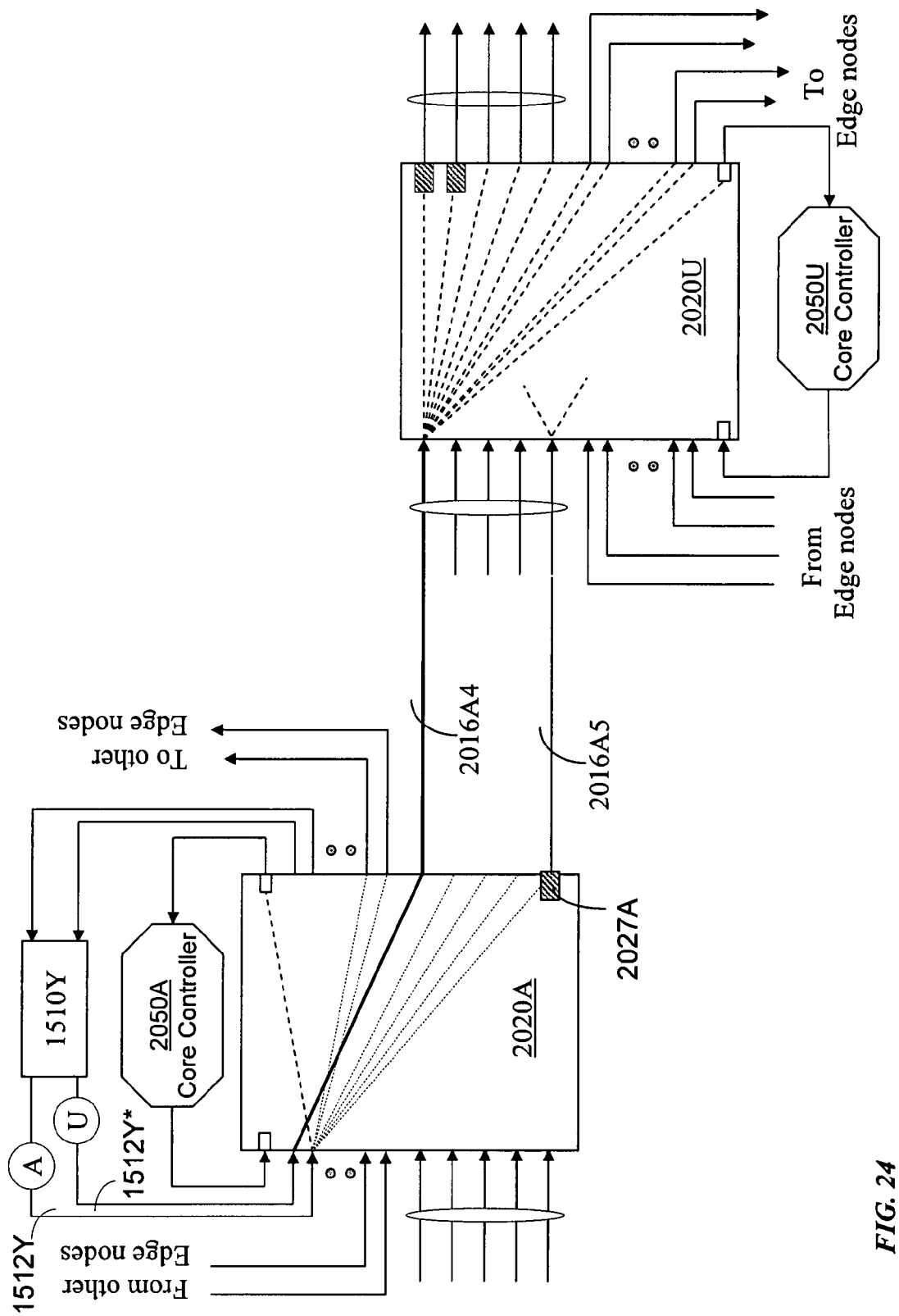
FIG. 24 illustrates time-locking of a path traversing two core nodes of the type illustrated in FIG. 20 in accordance with an embodiment of the present invention.

FIG. 24 illustrates a time-locked path from an edge node 1510Y to a core node 2020U. The path comprises an upstream channel 1512Y and a core channel 2016A4. An upstream channel 1512Y\* is time-locked to core node 2020A and in-band signaling is used in a manner similar to that described with reference to FIG. 23. Time-limited signals carried by upstream channel 1512Y\* are switched to a buffered outward port 2027A of core node 2020A. The buffered outward port 2027A can time-lock to core node 2020U and, hence, can switch the time-limited signals it receives from the plurality of input ports of core node 2020A to several output ports of core node 2020U.

Connectivity

The number of adjacent core nodes to an edge node is determined by the number of upstream links of the edge node. For example, if each edge node has 128 outbound ports, each port supporting one wavelength channel, and using WDM links each carrying a multiplex of 32 wavelength channels, then an edge node can directly access a maximum of four core nodes using four WDM upstream links and four WDM downstream links. Thus, the edge node would have four adjacent core nodes. Each core node preferably has a number of parallel switch planes equal to the number of wavelength channels per WDM link; 32 in this example. To form a high-performance composite-star network, each edge node connects to each core node. The number of edge nodes would be equal to the number of dual ports per switch plane. The entire network would then have only four core nodes, which limits the geographic coverage of the network. Increasing the number of core nodes would require that each WDM link carry fewer wavelength channels. In order to increase the number of core nodes while exploiting WDM economy, wavelength routers, well known in the art, may be collocated with core nodes in order to direct wavelength channels of each WDM link originating from an edge node to several core nodes.

Mesh Networks

Figure 25:
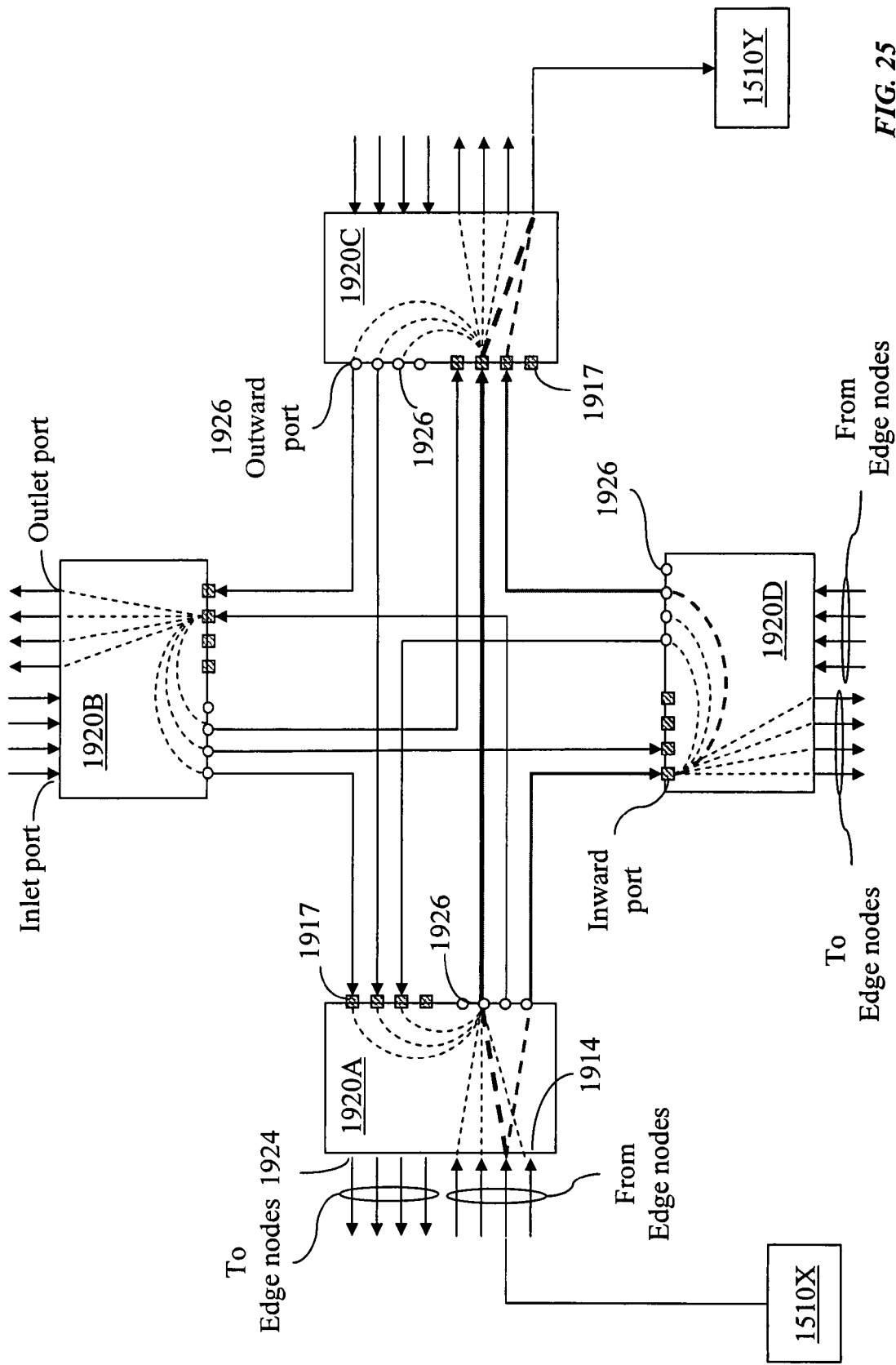
FIG. 25 illustrates a mesh network interconnecting core nodes having inward buffers in accordance with an embodiment of the present invention.

FIG. 25 illustrates a mesh network 2500 comprising core nodes 1920 each having an optical switch fabric 1940. Each core node 1920 includes a core controller 1950, illustrated in FIG. 19 (not illustrated in FIG. 25) operable to communicate with core controllers of other core nodes 1920 to exchange connection-scheduling data. Each optical core node 1920 has inward ports 1916/1917 and outward ports 1926, as described above with reference to FIG. 19. Preferably, each core node has inlet ports 1914, outlet ports 1924. However, some core nodes may not have subtending edge nodes and function only as transit nodes. At least one outward port 1926 of each core node 1920 has a core channel connecting to an inward port 1916/1917 of another core node. Preferably, each core node 1920 connects to each other core node to form a full mesh. Each inlet port receives optical signals from subtending edge nodes, and each outlet port transmits optical signals to subtending edge nodes. Each inward port receives optical signals from other core nodes and each outward port transmits optical signals to other core nodes. A path from a source edge node connecting to an inlet port of a core node 1920X to a destination edge node connecting to an outlet port of the same core node 1920X is switched internally within the core node 1920X. The source edge node may time-lock to the core node 1920X and, hence, time-limited signals from the source edge node to the sink edge node may be switched, together with time-limited signals received from other subtending edge nodes, through the core node 1920X.

A direct path from a source edge node connecting to an inlet port of a first core node 1920X to a destination edge node connecting to an outward port of a second core node 1920Y traverses a core channel from an outward port of the first core node to an inward port of the second core node 1920Y. The inward ports of the second core node 1920Y may receive uncoordinated signals from several other core nodes 1920 and, hence, the received signals may require time alignment. Thus, each received signal may have to be delayed before being switched through the bufferless switch fabric of core node 1920Y. In the mesh network 2500 of FIG. 25, buffers are provided at selected, or all, inward ports of each core node 1920.

An indirect path from a source edge node connecting to an inlet port of a first core node 1920x to a destination edge node connecting to an outward port of a second core node 1920Y traverses a first core channel from an outward port of the first core node to an inward port of a transit core node 1920T and a second core channel from an outward port of the transit core node 1920T to an inward port of the second core node 1920Y. In a full mesh structure having N>1 core nodes, where each core node connects to each other core node, there may be (N−1) indirect paths from any source edge node subtending to a given core node to any destination edge node subtending to another core node. An indirect path may carry time-multiplexed signals from several edge nodes if the inward ports it traverses, excluding the inward port connecting to the source edge node, is provided with a buffer. The inward port connecting to the source edge node need not have a buffer.

Figure 26:
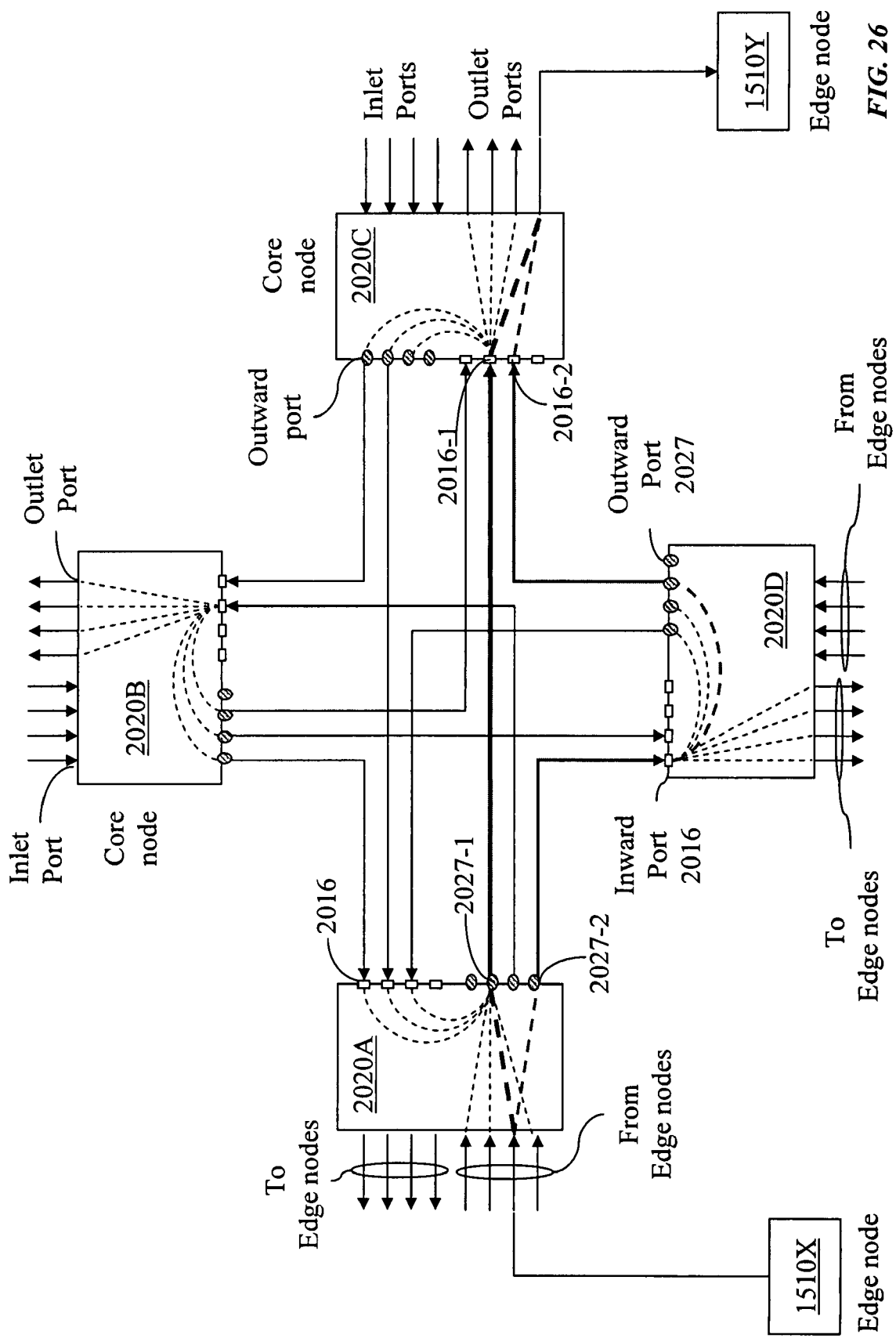
FIG. 26 illustrates a mesh network interconnecting core nodes having outward buffers in accordance with an embodiment of the present invention.

FIG. 26 illustrates a mesh network 2600 similar to mesh network 2500 of FIG. 25. The network comprises core nodes 2020 each having an optical switch fabric 2040, as described earlier with reference to FIG. 20 Each core node 2020 includes a core controller 2050 as illustrated in FIG. 20 (not illustrated in FIG. 26) operable to communicate with core controllers of other core nodes 2020 to exchange connection-scheduling data.

To enable switching time-limited signals, an outward port of the first core node time-locks to the second core node. Time-locking implies delaying signals at the outward port of the first core node. The required delay at the outward port may be realized through a process of optical-to-electrical (O-E) conversion of an optical signal, placing the electrical output in an electronic memory, and reading the stored signal after a predetermined period of time. The delayed electronic signal then modulates an optical carrier (a wavelength) which is transmitted to the second core node. Network 2600 differs from network 2500 in the application of delay to signals transmitted from an outward port of a first core node to an inward port of a second core node. In Network 2600, the delay is applied at the outward port of the first core node while in network 2500 the delay is applied at the inward port of the second core node. The delay may be applied anywhere along the core channel connecting the outward port of the first core node to the inward port of the second core node. It is, however, preferable that the delay be applied at either end of the channel.

Bimodal Burst Transfer

A core controller 1950/2050 may be adapted to function as a bimodal controller. A bimodal controller receives both first-mode and second-mode burst-transfer requests. In a first-mode request, data bursts may be rate regulated at an outbound port of a source edge node and descriptors of each data burst waiting at the outbound port and eligible for transfer to the core node are sent to the controller of the core node. The eligibility of a waiting data burst is determined by a flow-rate regulator. In the second-mode, flow-rate allocations for each burst stream are determined and communicated to the bimodal controller of the core node. The bimodal controller then determines a burst descriptor for each burst stream and generates burst-transfer requests that are evenly spaced in the time domain. The burst-descriptors received from the outbound port according to the first-mode, and the burst descriptors generated by the core controller according to the second mode, are submitted to the same burst scheduler associated with the core node which computes a schedule for each individual data burst, regardless of whether it is a waiting burst (first mode) or anticipated burst (second mode) and sends the burst schedules to the outbound port of the edge node. A burst scheduler is described in the aforementioned U.S. patent application Ser. No. 09/750,071. Thus, a first-mode request is required for each waiting burst at an outbound port while a second-mode request is required only when the flow-rate-allocation of a burst stream is modified. The burst schedules transmitted by the bimodal core controller identify the mode associated with each burst to enable the outbound port to transmit the appropriate burst. Notably, the outbound port must be time-locked to the core node in order to enable the outbound port to time the transmission of bursts according to the schedule it receives from the core node.

Proximity and Storage Indices

The round-trip propagation delay between an edge node and a core node may be used to define their proximity and, hence, the mode of burst transfer. A proximity index may be defined as the ratio of the round-trip propagation delay and a prescribed delay tolerance. For example, if the round-trip propagation delay from an edge node to a first core node is 1 millisecond and the delay tolerance for a first burst stream transmitted from the edge node to the first core node is 500 microseconds, then the proximity index is 2.0. If the round-trip propagation delay from the edge node to a second core node is 20 milliseconds and the delay tolerance of a second burst stream transmitted from the edge node to the second core node is 100 milliseconds, then the proximity index is 0.20. Thus based on absolute proximity, the first mode of burst transfer would be selected for use between the edge node and the first core node while the second mode would be selected for use from the edge node to the second core node. However, based on the proximity indices, the selection is reversed with the first burst stream using the second mode of burst transfer.

Another factor that may be considered in determining the burst-transfer mode is the flow rate of a burst stream. The flow rate may be expressed in bits per second. The product of the aggregate flow rate $\rho$ of burst streams using the first mode of burst transfer and the round-trip propagation delay $\tau$ (in seconds) approximates the cumulative mean size of the data bursts waiting at a respective outbound port of an edge node. This value may be restricted to be an acceptable fraction of the buffer size at the respective outbound port. Thus, a storage index may be defined as the ratio $\rho \times \tau / \Lambda$ where $\Lambda$ is the total size of the outbound buffer under consideration. If the addition of a new burst stream to burst streams already using the first mode results in a storage index exceeding a predefined threshold, the new burst stream uses the second mode of burst transfer. The predefined threshold is preferably less than unity; 0.8 for example, to avoid buffer overflow.

Thus, the proximity index and the storage index may be used to select the burst transfer mode. The first burst transfer mode would be selected when the proximity index does not exceed unity and the storage index does not exceed a specified threshold. Otherwise, the second burst-transfer mode is used. The specified threshold may be dynamic, being determined according to observed buffer occupancy. Recall that a burst stream is defined according to the origin and destination edge nodes and a burst stream sent from an edge node to a core node may be directed to different output ports of the core node. The burst transfer mode may also be selected according to combined proximity and storage indices.

Referring to the above example, consider a first burst-stream from the edge node to the first core node with flow rate of 1 Gigabits per second (Gb/s) and a second burst stream from the edge node to the second core node with a flow rate of 10 Mb/s. The buffer size at each of the respective outbound ports is one megabyte ($8 \times 10^6$ bits). The storage indices are then $10^9 \times 0.001/(8 \times 10^6) = 0.125$ for the first burst stream and $10^7 \times 0.1/(8 \times 10^6) = 0.125$ for the second burst stream. Thus, if the specified storage threshold (less than unity) exceeds 0.125, and because the proximity index of the edge node with respect to the second core node is less than unity, the edge node may use the first mode of burst transfer without violating the delay tolerance or overflowing the respective outbound buffer of the edge node.

The core node is adapted to control the flow of data bursts according to one of the two burst-transfer modes described above. With the first mode, burst-transfer schedules are generated by the core controller for data bursts already waiting at respective edge nodes. The size of each data burst is known and the scheduler's task is to determine the required time of its transmission from the edge node in a manner that avoids collision at an output port in the core. With the second method, burst-transfer schedules are generated by the core controller for anticipated data bursts. Both the size of each burst and its transmission time are determined by the core controller. The size is determined according to a flow-rate-allocation associated with each data stream.

Bimodal Burst-Switching Network

The edge nodes subtending to a core node may be classified into two categories with respect to the core node according to their proximity to the core node. An edge node in the first category communicates with the core node according to the first-mode of burst transfer and an edge node in the second category communicates with the core node according to the second-mode of burst transfer. An edge node within a specified proximity from a core node sends descriptors of data bursts formed at an outbound port of the edge node to a core-node controller and receives burst-transmission schedules from the core-node controller while an edge node beyond the specified proximity sends flow-rate-allocation requests to the core-node controller and receives burst descriptors and their transmission schedules from the core-node controller.

The proximity of an edge node to a core node (and vice versa) may be determined according to known lengths of an uplink and a down link connecting the edge node to the core node. Preferably, the proximity is determined by measuring the round-trip propagation delay between the edge node and the core node.

As described earlier, in the first-mode of burst transfer, an edge node reports descriptors of waiting bursts and requests a schedule for transferring each burst. In the second-mode of burst transfer, an edge node reports a required flow rate for each data stream and a core node controller specifies a burst size for each data stream and determines a schedule for transferring the specified bursts. The burst schedule at the core node schedules bursts indiscriminately. It is preferable that each core node be adapted to handle both modes.

Applicant's U.S. patent application Ser. No. 10/437,676 filed on May 14, 2003 and titled "Regulating data-burst transfer, the specification of which is incorporated herein by reference, describes a flow-rate-regulation device for data bursts of arbitrary sizes. The device is operable in either of two modes. In the first mode, flow-rate-regulation is provided for already waiting bursts. In the second mode, the device is adapted to provide flow-rate-regulation for anticipated bursts.

Figure 27:
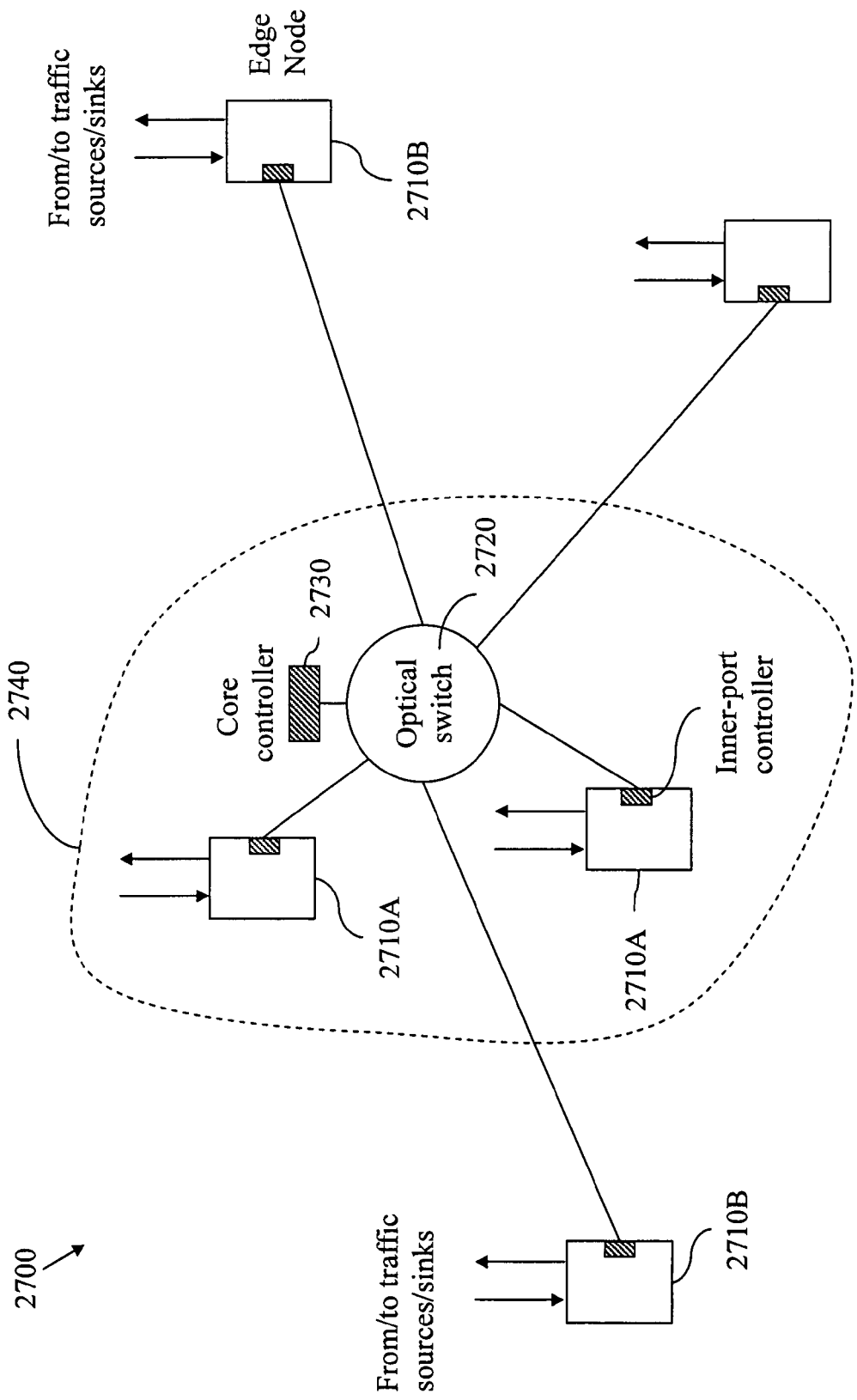
FIG. 27 illustrates a bimodal burst switching network as viewed from a core node, in accordance with an embodiment of the present invention.

FIG. 27 illustrates an optical core node 2720 connecting edge nodes 2710 that may be spread over a wide geographic area. Two of the edge nodes, each labeled as 2710A, are within a proximity boundary defined by a round-trip propagation delay between an edge node and the optical core node 2720. The remaining edge nodes, each labeled as 2710B, are remote edge nodes, being located outside the proximity boundary. According to an absolute proximity criterion, a nearby edge node 2710A preferably uses the first mode of burst-transfer control described earlier while a distant edge node 27108 preferably uses the second mode of burst-transfer control in which the edge node sends flow-rate-allocation requirements to a controller 2730 of the optical core node 2720 for the data streams traversing the optical core node. These flow-rate allocations may change frequently, every 1 millisecond for example. Using the proximity index defined above, rather than an absolute proximity threshold, for selecting the burst transfer mode, the pattern of FIG. 29 would apply only if all burst streams have the same delay tolerance.

Figure 28:
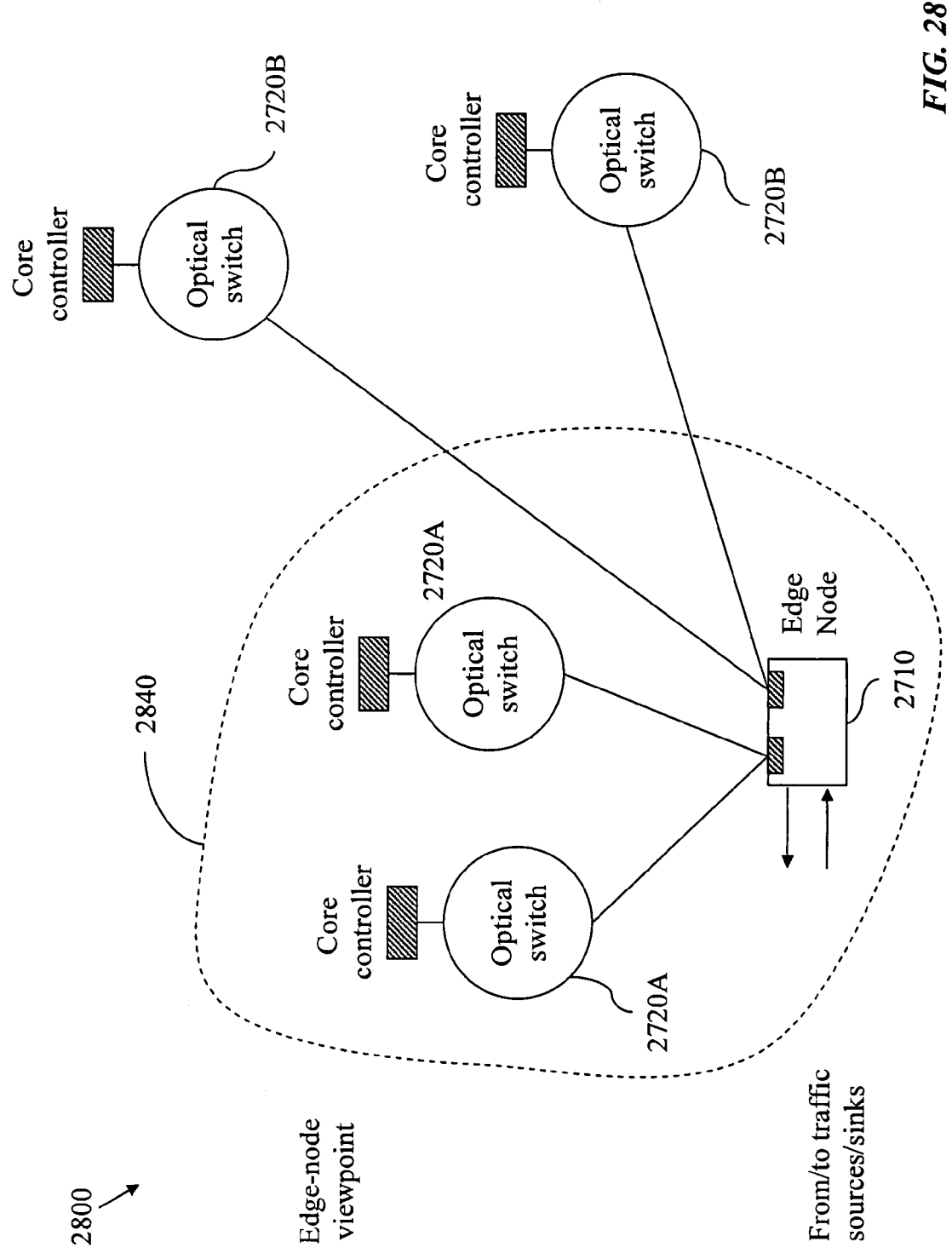
FIG. 28 illustrates a bimodal burst switching network as viewed from an edge node, in accordance with an embodiment of the present invention.

FIG. 28 illustrates an edge node 2710 connecting to core nodes 2720 within and beyond a proximity boundary with respect to the edge node 2710. Core nodes, referenced individually or collectively as 2720A, are within a proximity boundary with respect to the edge node 2710 and core nodes, referenced individually or collectively as 2720B, are beyond the proximity boundary. With uniform delay tolerance, edge node 2710 communicates burst-scheduling requests to a core node 2720A within the proximity boundary but communicates flow-rate-allocation requests to a core node 2720B beyond the proximity boundary, the proximity being determined on the basis of round-trip propagation delay, in accordance with an embodiment of the invention. An outbound port of edge node 2710 leading to an optical core node 2720A uses a flow-rate-regulation device operable according to the first mode of burst transfer while an outbound port of edge node 2710 leading to a core node 2720B uses a rate-regulation device operable according to the second mode of burst transfer. An outbound port may also be equipped with a bimodal flow-rate-regulation device which functions according to both modes. The control signal sent by the outbound port to a core node would include an indication of the required mode.

Figure 29:
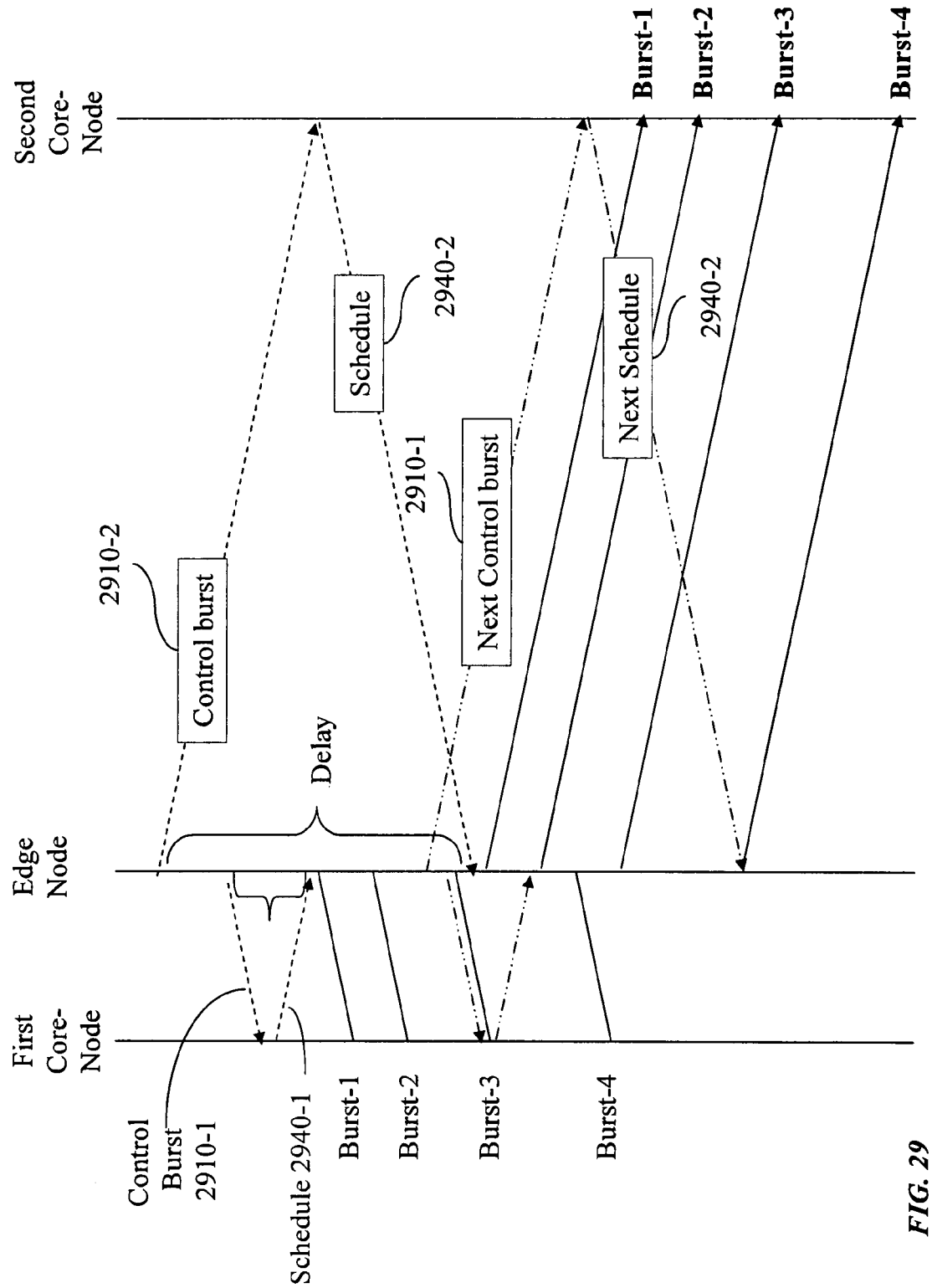
FIG. 29 illustrates a first-mode of burst transfer from an edge node to two core nodes.

FIG. 29 illustrates a first mode of burst transfer from an edge node 2710 to two bufferless core nodes 2720A. Control bursts 2910 are sent from edge node 2710 to a neighbouring core node 2720A and to a distant core node 2720B. The edge node 2710 sends, to the controller of core node 2720A, a control burst 2910-1 that includes descriptors of at least one burst waiting at an outbound port of the edge node connecting to an upstream channel leading to an inward port of core-node 2720A. Likewise, the edge node 2710 sends a control burst 2910-2 to the controller of core node 2720B, the control burst indicating descriptors of bursts waiting at an outbound port of edge node 2710 connecting to an upstream channel leading to an inward port of core node 2720B. Edge node 2710 receives, at two inbound ports, burst transfer schedules 2940-1 from the controller of core node 2720A and burst-transfer schedules 2940-2 from the controller of core node 2720B. The schedules indicate an instant of time at which each waiting burst is to arrive at its respective core node. When an outbound port of edge node 2710 is time-locked to the core node to which it connects through an upstream channel, the required arrival time at the core node is identical to the transmission time from the outbound port as read from a time counter, according to the time-locking method described in the aforementioned U.S. Pat. No. 6,570,872. Time at the outbound port and the core-node controller is indicated by identical cyclical time counters.

While the edge node continues to transmit bursts according to a received schedule, it may also send new control bursts 2910-1 and 2910-2 and receive new schedules 2940-1 and 2940-2 so that idle time can be significantly reduced or entirely eliminated. The scheduler at the core node 2720 schedules burst in continuous future time as described in the aforementioned U.S. patent application Ser. No. 09/750,071.

Consider, for example, the case where the round-trip propagation delays between edge node 2710 and core nodes 2720A and 2720B are one millisecond and 100 milliseconds, respectively. The delay between sending a control burst 2910-1 and receiving a schedule 2940-1, which includes processing time, would be slightly larger than one millisecond. The delay between sending a control burst 2910-2 and receiving a schedule 2940-2 would exceed 100 milliseconds. A descriptor of a burst is included in the control burst 2910-2 after the burst has already been formed at the respective outbound port of the edge node 2710. It is preferable then, when the round-trip propagation delay is large, to send the flow-rate allocation for the data streams traversing core node 2720B and let the controller of core node 2720B determine a nominal burst size and a transfer schedule according to the second mode of burst transfer described earlier. In either of the two burst-transfer modes, flow-rate regulation may be required. In the first mode, the flow-rate regulation takes place at a respective outbound port of an edge node and in the second mode the flow-rate regulation takes place at a core-node controller.

Figure 30:
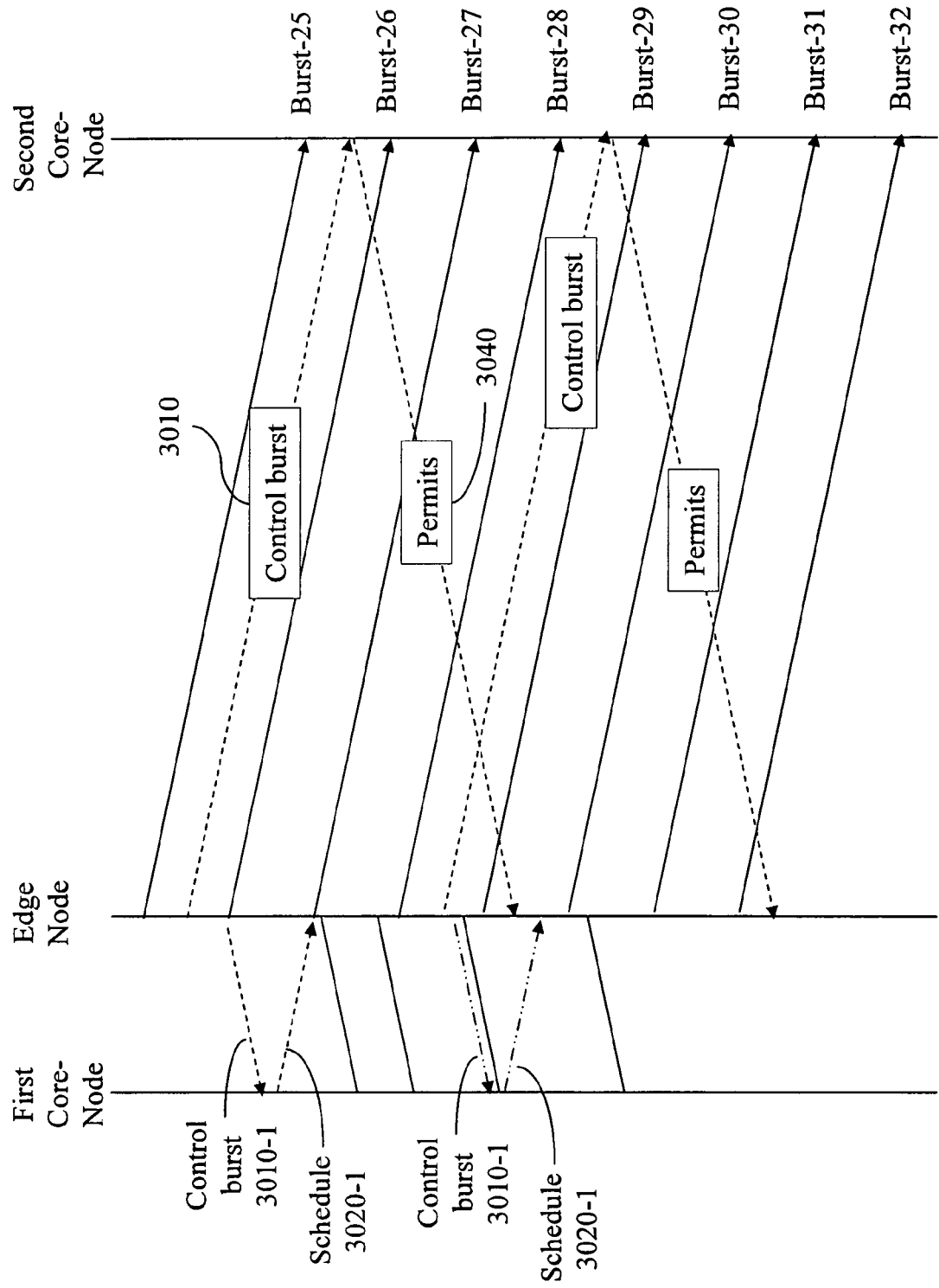
FIG. 30 illustrates the use of the first-mode of burst transfer from an edge node to a first core node and a second mode of burst transfer from the edge node to a second core node in accordance with an embodiment of the present invention.

FIG. 30 illustrates the use of a first burst-transfer control mode from the edge node 2710 to a near core node 2720A and a second burst-transfer control mode from the edge node to a distant core node 2720B. Control bursts 2910-1 are sent from an edge node 2710 to a neighbouring core node 2720A in a manner similar to that of FIG. 29. The edge node sends control bursts 3010-2 to distant core node 2720B. Control burst 3010-2 contains flow-rate allocations for each burst stream transmitted from the edge node to core node 2720B. Edge node 2710 receives, at two inbound ports, burst transfer schedules 2940-1 from the controller of core node 2720A and burst-transfer permits 3040-2 from the controller of core node 2720B. The schedules indicate an instant of time at which each waiting burst is to arrive at its respective core node while the permits indicate a specified burst size and an instant of time at which a burst formed according to the specified size is to arrive at the core node. As illustrated in FIG. 30, the outbound port of the edge node 2710 is continually transmitting bursts according to the latest permits it receives. A control burst 3010-2 need not be continuously sent if the flow-rate specifications do not change. FIG. 30 illustrates the receipt of two permits; each may contain schedules for several burst streams.

Figures 31A, 31B:
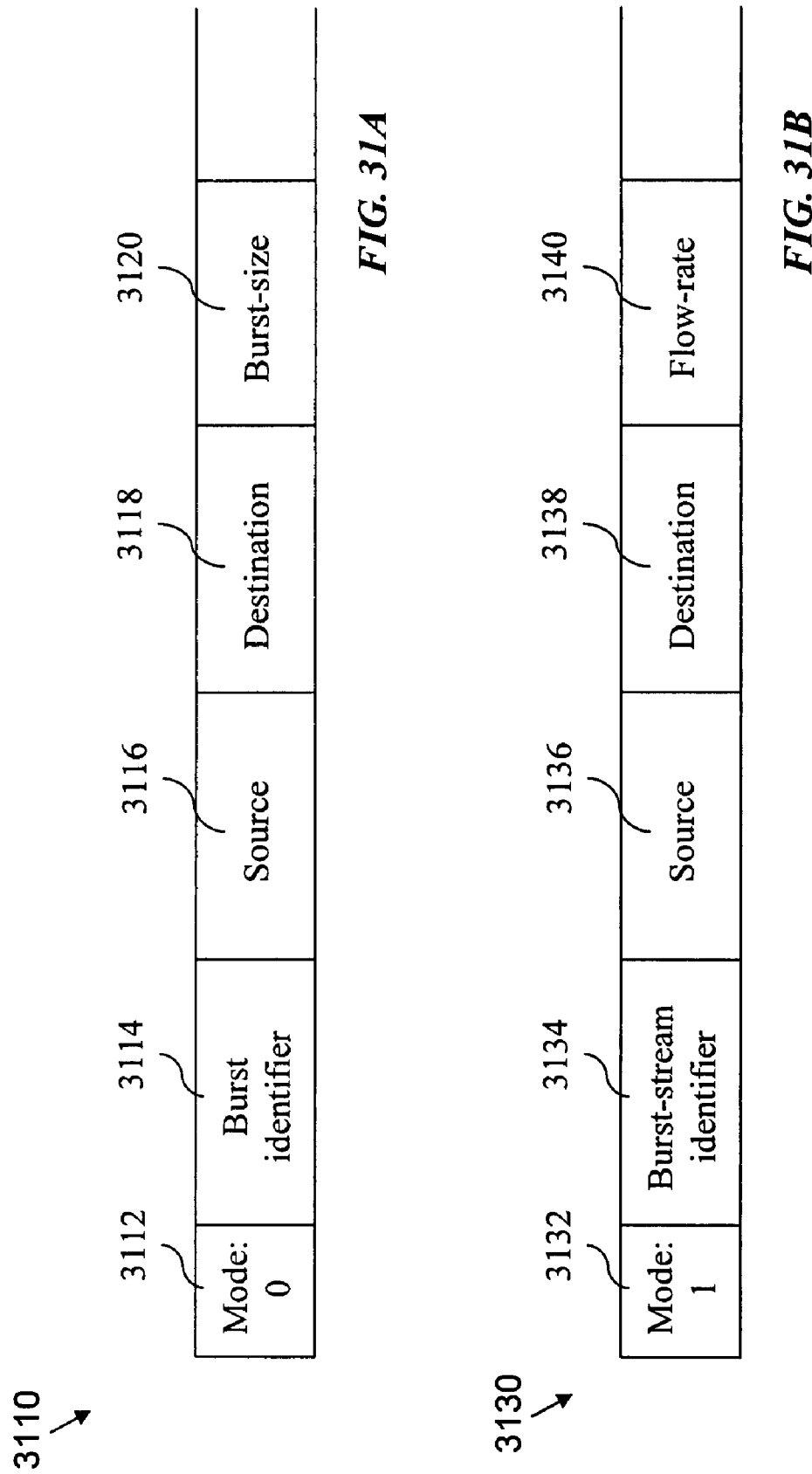
FIG. 31-A illustrates the format of a first mode communication request and FIG. 31-B illustrates the format of a second-mode communication request in a bimodal burst-switching network in accordance with an embodiment of the present invention.

FIG. 31-A illustrates a first-mode burst transfer request 3110 sent from an outbound port of an edge node 2710 to a core node 2720. The request includes a fixed mode identifier 3112 (set equal to zero), a burst identifier 3114 which can be a cyclic number identifying each burst transmitted from the outbound port to the core node 2720, an identifier 3116 of the source edge node, an identifier 3118 of a sink edge node, and the burst size 3120. FIG. 31-B illustrates a second-mode burst transfer request 3130 sent from an outbound port of an edge node 2710 to a core node 2720. The request includes a fixed mode identifier 3132 (set equal to one), a burst-stream identifier 3134 which can be a cyclic number identifying each burst stream flowing from the outbound port to the core node 2720, an identifier 3136 of the source edge node, an identifier 3138 of a sink edge node, and a required flow rate 3140. Other fields may be added to both the first mode and second mode requests for further control functions. Several requests 3110 may be aggregated in a control burst 2910 (FIG. 29) and several requests 3130 may be aggregated in a control burst 3010 (FIG. 30).

Figure 32A:
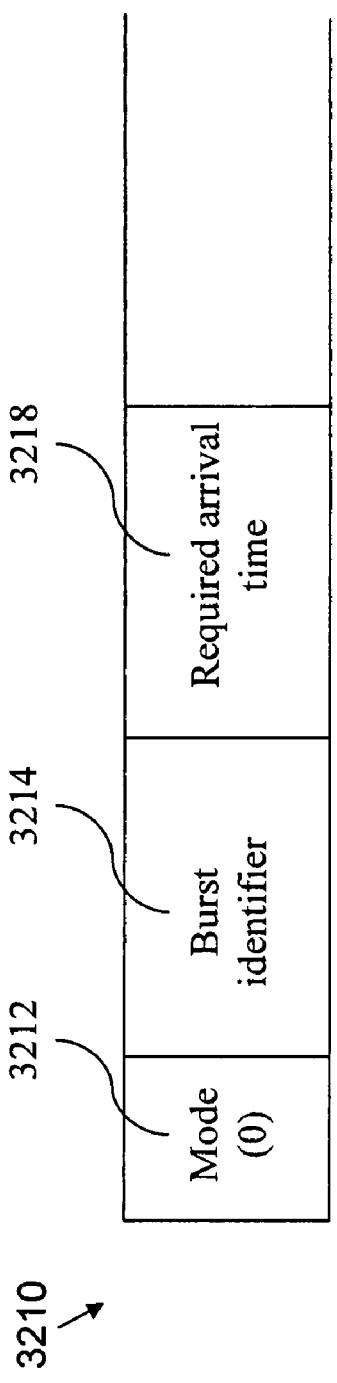
FIG. 32A illustrates a burst-schedule sent by a core node to an outbound port of an edge node and FIG. 32B illustrates a burst-transfer permit sent by a core node to an outbound port of an edge node.
Figure 32B:
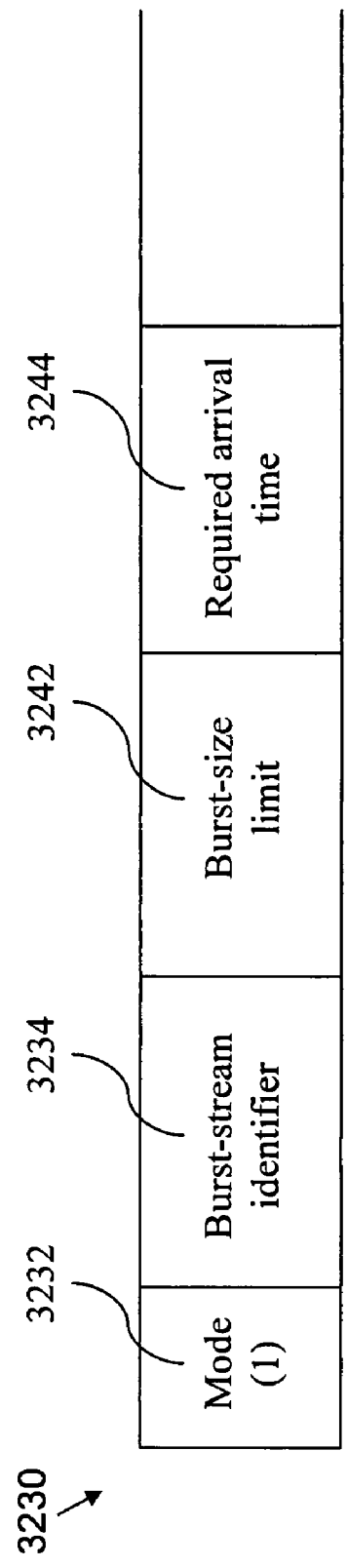

FIG. 32-A illustrates a response 3210 sent by the core controller of core node 2720 in response to first-mode burst transfer request 3110. The response includes a fixed mode identifier 3212 (set equal to zero), a burst identifier 3214 which is the identifier 3114 of the scheduled burst, and a burst-arrival time 3218, which is the time at which the scheduled burst is to arrive at the core node 2720, as determined by a master time counter at the core node. It is also the time, as determined by an edge time counter at the edge node, at which the burst is to be transmitted, the edge time counter being time-locked to the master (core) time counter.

FIG. 32-B illustrates a response 3230 sent by the core controller of the core node 2720 in response to the second-mode burst transfer request 3130. The response includes a fixed mode identifier 3232 (set equal to one), a burst-stream identifier 3234 which corresponds to a burst stream 3134, a burst-size limit 3242, and an arrival time 3244 at which a burst belonging to burst stream 3234 and having a size not exceeding the limit 3242 is to arrive at the core node 2720. Several responses 3210 may be aggregated into a burst-transfer schedule 2940 (FIG. 29) and several responses 3230 may be aggregated into a burst-transfer permit 3040 (FIG. 30). An outbound port of an edge node may transmit both first-mode (mode 0) and second mode (mode 1) requests and receive a grant burst containing responses 3210 and 3230.

Bimodal Core Controller

Figure 33:
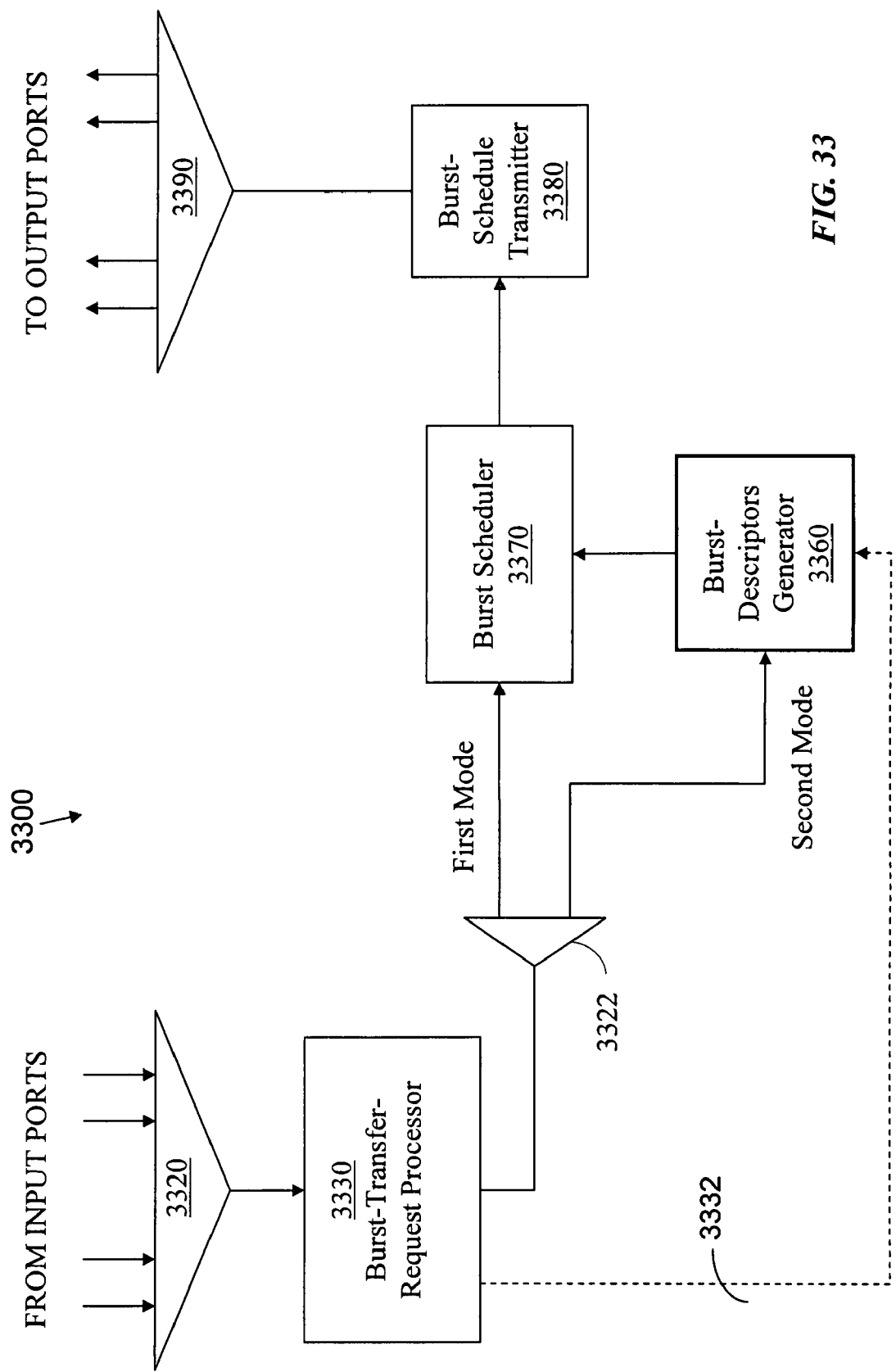
FIG. 33 illustrates a bimodal burst-switching mechanism provided at a core node, in accordance with an embodiment of the present invention.

FIG. 33 illustrates a bimodal core controller 3300 of a core node adapted to receive optical control signals. The optical control signals, received at inlet ports of a core node, are demodulated to extract and parse the baseband control signals. Each control signal includes an indication of whether it is a first-mode control signal or a second-mode control signal. A first-mode control signal includes the size of the burst and its point of origin, amongst other data. A second-mode control signal includes a required flow-rate-allocation for a respective data stream.

A multiplexer 3320 multiplexes control signals from input ports of the core node. Multiplexer 3320 may be a separate physical entity receiving time-interleaved optical control signals from the input ports of a core node structure of the type described with reference to FIG. 16. Multiplexer 3320 may also be a representation of a switching function within a switching fabric where input ports direct control signals to a control output port of the switching fabric and the combined optical control signals at the control output port are submitted to a core controller as in the structure of the core node of FIG. 17.

A demultiplexer 3390 distributes control signals produced by core controller 3300 to output ports of the core node. Demultiplexer 3390 may be a separate physical entity receiving optical control signals from a core controller through an electrical-optical interface if the structure of the core node is of the type described with reference to FIG. 16. Alternatively, demultiplexer 3390 may be a representation of a switching function within a switching fabric where a control input port of the switching fabric receives control signals from a core controller and distribute them, through the switching fabric, to respective output ports of the switching fabric, as in the core node described with reference to FIG. 17.

A burst-transfer-request may be a first-mode or a second-mode request. Burst-transfer-request processor 3330 determines the request mode, directs a first-mode request directly to a burst scheduler 3370, and directs a second-mode request to a burst-descriptor generator 3360. A first-mode request specifies, amongst other descriptors, the size and destination of a burst. The burst may belong to a burst stream that has been subjected to flow-rate regulation at an outbound port of an edge node 2710. A second-mode request specifies, amongst other descriptors, a destination and a flow-rate requirement for a burst stream and it is the duty of burst-descriptor generator 3360 to specify an appropriate burst size, and tentative arrival times at the core node of the specified bursts. Notably, the burst-descriptor generator 3360 produces a continuous sequence of burst descriptors that is modified or terminated only upon receipt of a new request. The new request, associated with an existing data stream may require a change in the flow-rate allocation or may request terminating the data stream by setting the flow-rate-allocation requirement equal to zero.

For each data stream, the specified burst size and tentative arrival times are submitted to burst scheduler 3370. Burst scheduler 3370 need not be aware of the request mode and its function is to schedule the arrival time at the core node of the burst-transfer requests it receives. When the arrival times are decided, they are sent to respective edge nodes 2710 which transmit the bursts at time instants that ensure arrival at the core node at precisely the specified arrival instants. Time coordination may be realized by means of a prior-art time locking process described in U.S. Pat. No. 6,570,872.

A burst-schedule transmitter 3380 generates burst-transfer schedules for both first-mode requests and burst-transfer permits for second-mode requests and submits the schedules and permits to demultiplexer 3390 which directs them to respective edge nodes 2710.

Figure 34:
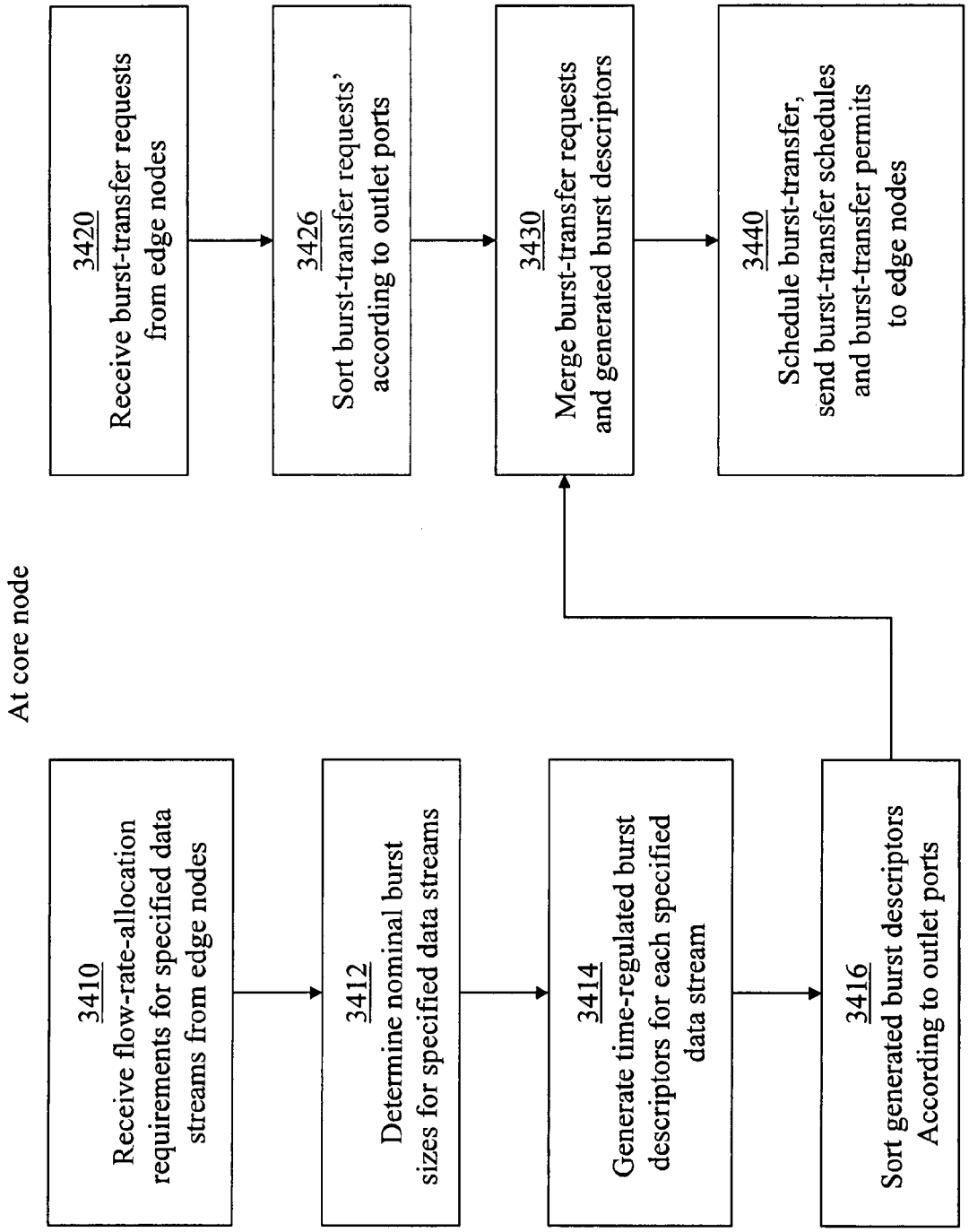
FIG. 34 is a flow chart describing the operation of the mechanism of FIG. 33.

FIG. 34 illustrates the scheduling function at a core controller 2730. The controller 2730 of a core node receives from edge nodes 2710 flow-rate allocations for specified data streams (step 3410) and determines a nominal burst size for each specified data stream (step 3412). The core-node controller 2730 includes a flow-rate regulator which attempts to generate time-regulated burst descriptors, each descriptor including a burst size and a corresponding data stream. The flow-rate regulator selects the dequeueing instants such that the burst length is approximately equal the flow-rate allocation of a corresponding burst stream multiplied by the inter-burst interval. A process of determining dequeueing instants is described in the aforementioned Applicant's U.S. patent application Ser. No. 10/437,676. Thus, in step 3414, time-regulated bursts are generated for each specified data stream and the descriptors are sorted according to the output ports of the core node to which they are routed towards respective destination sink nodes (step 3416). The burst-descriptors of different data streams still have to be scheduled to prevent contention at the output ports of the core node. The scheduling process (step 3440) may introduce some delay jitter due to output contention.

The descriptors sorted in step 3416 may be submitted directly to the scheduler (step 3440). However, a core-node controller may also receive burst-transfer requests from some outbound ports of edge nodes where bursts are formed first at the outbound ports as indicated in step 3420. Each burst-transfer request includes a burst size and an indication of a destination sink node. In step 3426, the burst-transfer requests may be sorted according to the outlet ports of the core node and the sorted burst-transfer requests are merged with the burst descriptors sorted in step 3416 into output queues, one output queue per output port of the core node (step 3430). The scheduler then determines a required arrival time, at the core node, for each burst for which a burst descriptor or a burst-transfer request has been issued (step 3440).

An upstream channel from an outbound port of an edge node to an inlet port of a core node may carry several data streams, each bound to a respective sink node. A data stream may include bursts defined by the outbound port and/or bursts defined by the controller of the core node. A dual-mode of burst switching can be realized as described below.

If an edge node is within a predefined proximity to a given core node, it is preferable that a controller of an output port determine the total flow-rate-allocation requirement of each data stream carried by the upstream link, compute a nominal burst size based on the flow-rate requirement, assemble a burst having a size that does not exceed the computed nominal burst size, and communicate the actual size of the assembled burst to the core-node controller as described with reference to FIG. 27 and FIG. 28. The core-node controller would then schedule the burst and communicate the schedule to the edge node. An outbound port then transmits the burst according to the received schedule.

If an edge node is beyond the predefined proximity to a given core node, it is preferable that a controller of an output port determine the total flow-rate-allocation requirement of each data stream carried by the upstream link, and let the controller of the core node compute a nominal burst size based on the flow-rate requirement and generate a stream of bursts for each data stream. The core node controller then schedules each generated burst and communicates the schedule to the edge node. An output port of the edge node then assembles waiting packets of each data stream to form bursts where the size of each does not exceed a nominal burst size determined by the core-node controller and transmits the burst according to schedule.

As described earlier, an edge-node controller may select the burst-transfer mode according to other criteria, such as delay tolerance and storage capacities at the edge. The type of data or terms of a service-level-agreement may also influence the burst-transfer-mode selection.

It is emphasized that the burst-size in the first mode corresponds to a burst that is already waiting at the output port while a burst-size in the second mode is the size of a burst to be formed from data packets anticipated to be present and assembled at the outbound port before the transmission time indicated in the schedule computed by the core node.

It is also noted that, in the second mode, a data stream may change its flow-rate allocation requirement to zero, and the core-node controller would then generate and schedule only control bursts for the data stream. Control bursts are generally very short and sent at a low rate, thus consuming a negligible fraction of the capacity of the channels. The main reasons for maintaining a connection despite its zero flow-rate requirement are to maintain the time locking of the output port to the core node to which it connects through an upstream and a downstream channel and to communicate a required flow-rate allocation when needed. Regardless of the proximity to a core node, each edge node must have means for time locking to the core node to ensure that a burst transferred from each edge node is timed to arrive at the core node at the instants of time specified by a schedule.

Figure 35:
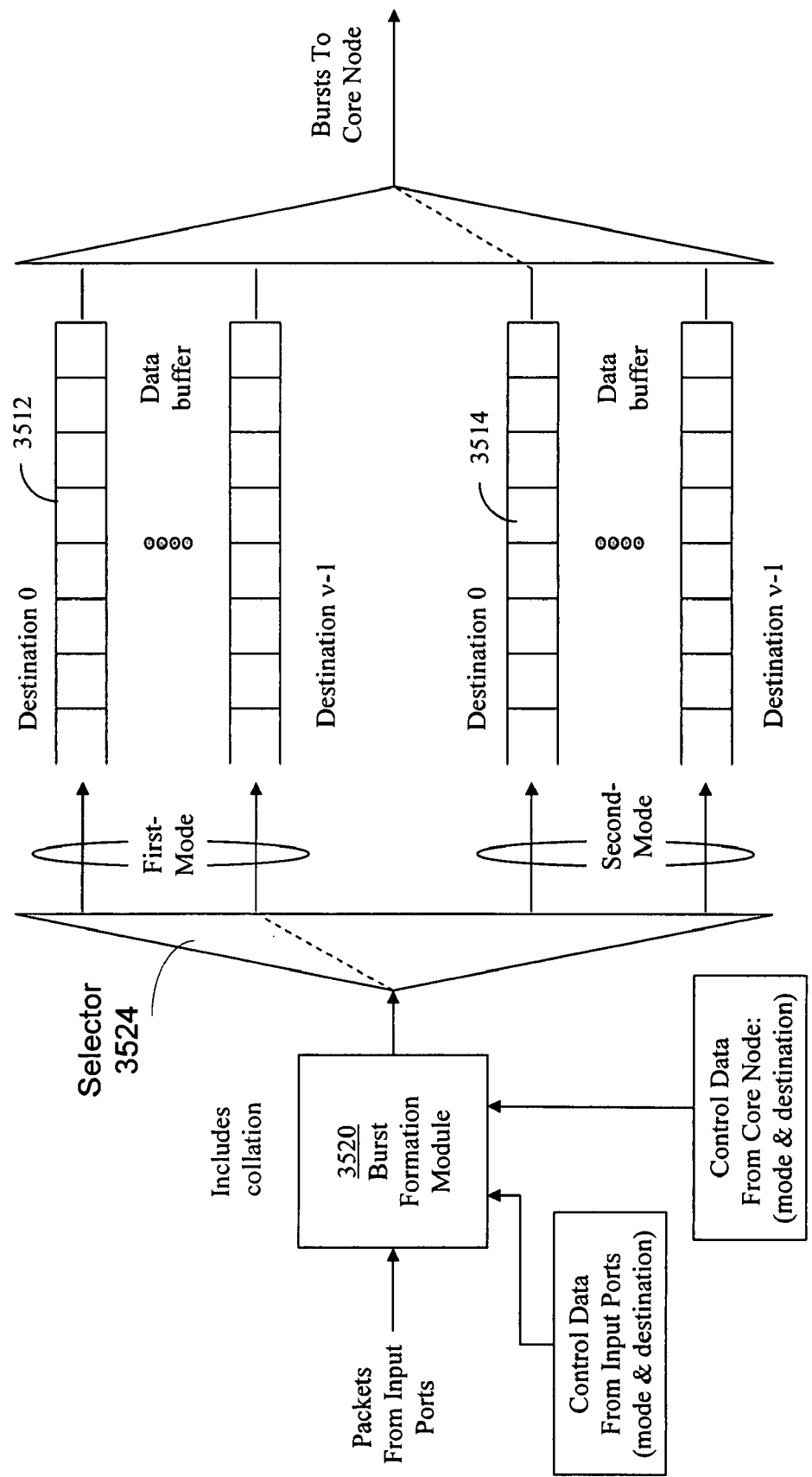
FIG. 35 illustrates a mechanism provided at an outbound port of the edge node of FIG. 15 to facilitate selective burst switching in accordance with an embodiment of the present invention.

FIG. 35 illustrates the process of forming data bursts at an outbound port 1526 of an edge node 1500 (FIG. 15) and storing the data bursts according to a corresponding burst-stream mode and destination. Burst selection for transmission to the core node is performed according to the burst-transfer mode and burst destination indicated in a burst schedule. A burst-formation device 3520 forms bursts for either mode of burst transfer. A formed burst is directed to a buffer 3512 or 3514 through a selector 3524. If the first mode is used, the burst-formation device 3520 forms bursts from data packets it receives from ingress ports and from inbound ports then sends scheduling requests to an external node selected according to a routing plan. A formed burst is then placed, through selector 3524, in a first-mode buffer 3512 corresponding to the destination of the burst. Notably, inbound ports of an edge node receive data bursts that may be parsed at the inbound ports into their constituent data packets and the constituent data packets may be switched to either egress ports 1524 or outbound ports 1526 (FIG. 15). If the second mode is used, the burst-formation device 3520 receives, from a core node, burst-transfer permits each specifying a burst-size limit then forms bursts each having a size not exceeding the specified limit. A formed burst is then placed, through selector 3524, in a second-mode buffer 3514 corresponding to the burst's destination.

Thus, two sets of buffers are provided, one corresponding to the first mode and the other to the second mode. Each set of buffers includes one buffer for each destination; with v destinations, there are 2v buffers. It is noted that, at any instant of time, only one burst can be transmitted from the outbound port and, hence, the 2v buffers are preferably logical buffers sharing the same memory device.

Multi-Source Connection

Connection requests can be classified in three categories, labeled type-1, type-2, and type-3. A type-1 connection relates to an individual burst-transfer (one-to-one) request using the first mode of burst transfer. A type-2 connection relates to a nodal connection request where a node may multicast to two or more other nodes (one-to-many) using the second mode of burst transfer. A type-3 connection relates to a network connection specifying several node pairs (many-to-many).

Control bursts sent by the edge nodes are scheduled to arrive at the core-node controller during non-overlapping intervals. In accordance with the present invention, three types of control bursts are provided. The first type corresponds to the first mode burst switching while the second and third types correspond to the second mode of burst switching. A control-burst of the first type requests scheduling individual bursts. Flow-rate control of the bursts may be applied at the source edge node. A control burst of the second type, sent by a particular edge node, requests adjusting the flow-rate allocation for each traffic stream originating from the particular edge node. A control burst of the third type, sent by a particular edge node, requests adjusting flow-rate allocations for traffic streams defined by different source-nodes and sink nodes. A new flow-rate allocation adjusts the flow-rate requirement from zero to a specified value. Termination of allocated capacity of a path from a source edge node to a sink edge node is realized by adjusting a respective flow-rate allocation to equal zero. Hereinafter, a control-burst of the second type is called a nodal request and a control-burst of the third type is called a network request. A network request controls an entire embedded network within a larger parent network.

In summary, three types of connection requests are defined:

(1) a type-1 connection requests relates to an individual burst, and hence to the first-mode of burst switching;

(2) a type-2 connection request relates to at least one burst stream from a given source node to at least one sink node, each stream being allocated a respective flow-rate; and (3) a type-3 connection request relates to at least one burst stream from each of a plurality of source nodes to at least one sink node, each stream being allocated a respective flow-rate.

Figure 36:
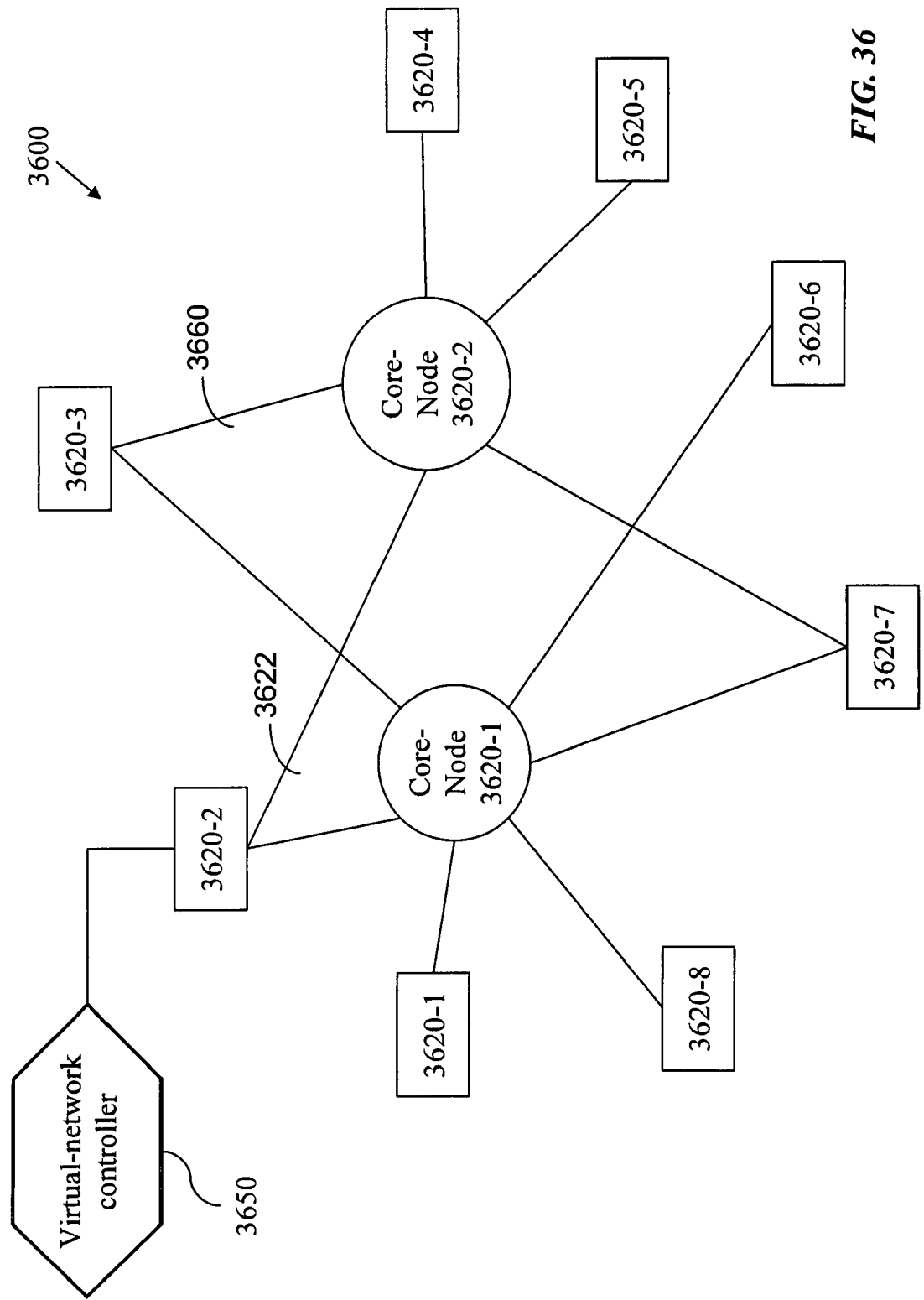
FIG. 36 illustrates a network comprising edge nodes and core nodes with a virtual-network controller connecting to one of the edge nodes in accordance with an embodiment of the present invention.

FIG. 36 illustrates a network of eight edge nodes referenced as 3610-1 to 3610-8, and two core nodes 3620-1 and 3620-2. A network 3200 can be divided into several embedded networks, also called virtual networks, each of which covering selected edge nodes with virtual-links, i.e., capacity partitions of physical links, interconnecting the selected edge nodes and having capacities that can be adapted in real-time to follow traffic-pattern variations. At least one of the edge nodes may support an embedded-network controller adapted to form multiple-source flow-rate allocation requests each of the requests specifying flow-rate allocations to a plurality of paths from several source nodes to several sink nodes. The embedded network can be established through several core nodes, each of which having a burst-transfer regulator. The embedded-network controller may modify the flow-rate allocation requests according to traffic data it receives from the edge nodes constituting the embedded network. The embedded-network controller receives traffic data from source nodes that constitute the embedded network.

Edge node 3610-2 supports a virtual-network controller 3650. The virtual-network controller sends a type-3 request to modify the capacity allocation (flow-rate allocation) of a virtual network that covers five of edge nodes 3610-1, 3610-2, 3610-3, 3610-4, and 3610-7. The required flow-rate allocations are indicated in the virtual-network-capacity indicated in FIG. 37.

FIG. 37 illustrates flow-rate-allocation requirements for selected pairs of edge nodes 3610-1, 3610-2, 3610-3, 3610-4, and 3610-7 that constitute a virtual network. The flow rates are expressed in an arbitrary unit. For example, if the unit is selected to be one Mb/s, then the traffic from node 3610-1 to node 3610-7 requires 820 Mb/s. The flow-rate-allocation requirements are based on exchange of traffic-volume (flow rate) information between the virtual-network controller 3650 and each of the edge nodes that are members of the virtual network. The flow-rate-allocation requirements may change frequently as the spatial traffic distribution changes with time. To be responsive, the virtual network should be able to reconfigure rapidly, with a reconfiguration latency determined primarily by the propagation delays for the node pairs affected by reconfiguration. A virtual network covering the North American continent, for example, can be reconfigured in less than 100 milliseconds. The flow-rate allocation for a node pair may vary from zero to a maximum determined by the available free capacity of the shared parent network.

Figure 38:
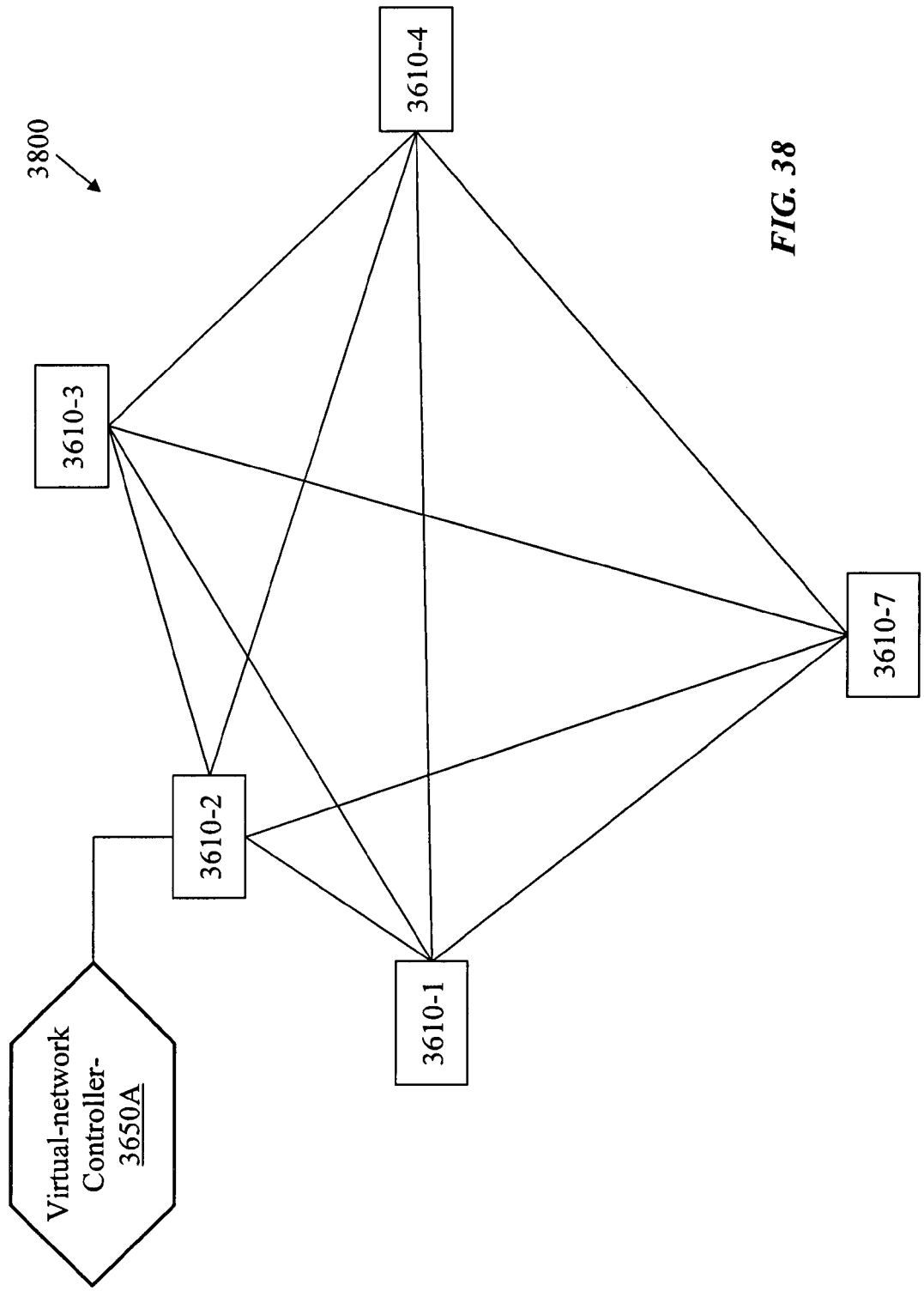
FIG. 38 illustrates a virtual network embedded in the parent network of FIG. 36 in accordance with an embodiment of the present invention.

FIG. 38 illustrates a virtual network created through the two core nodes 3620-1 and 3620-2 of a composite-star network 3200 with the flow-rate allocations for pairs of edge nodes corresponding to demand matrix 3700. The virtual-network controller may base its flow-rate allocation matrix 3700 on estimated traffic load of the virtual network taking into consideration the possibility of tandem switching at edge nodes 3610. For example a connection from edge node 3610-1 to edge-node 3610-4, where a direct path through the core nodes is not provided, may be made through edge node 3610-7. The virtual-network comprises edge nodes 3610-1, 3610-2, 3610-3, 3610-4, and 3610-7, and its controller is connected to edge node 3610-2.

To summarize, a parent network 3200 comprises edge nodes 3610 each having an edge controller (not illustrated in FIG. 32, see FIG. 15) and core nodes 3620 each having a core controller (not illustrated in FIG. 32, see FIG. 17). Links 3622 connect edge nodes 3610 to core nodes 3620. Preferably, each edge controller is adapted to form multiple-source flow-rate-allocation requests where each multiple-source flow-rate-allocation request specifies flow-rate allocations from two or more edge nodes to at least one edge node.

An edge node forming multiple-source flow-rate-allocation requests selects a core node for each request. The requests may, however, be directed to one core node. At least one core controller includes burst-descriptor generator 3360 (FIG. 33, not illustrated in FIG. 36) that generates burst descriptors complying with a flow-rate specification. A burst-descriptor generator may use a burst-transfer regulator described in the aforementioned U.S. patent application Ser. No. 10/437,676.

An embedded network, such as network 3800, may be dynamically created to include a subset of edge nodes 3610. Each edge node 3610 in the subset communicates with a controller 3650 of the embedded-network. The embedded-network controller 3650 modifies the flow-rate allocation requests according to traffic data it receives from at least one of the edge nodes 3610. In one embodiment, one of the edge nodes 3610 may host the embedded-network controller 3650. In another embodiment one of the core nodes 3620 may host the embedded-network controller 3650.

Figure 39:
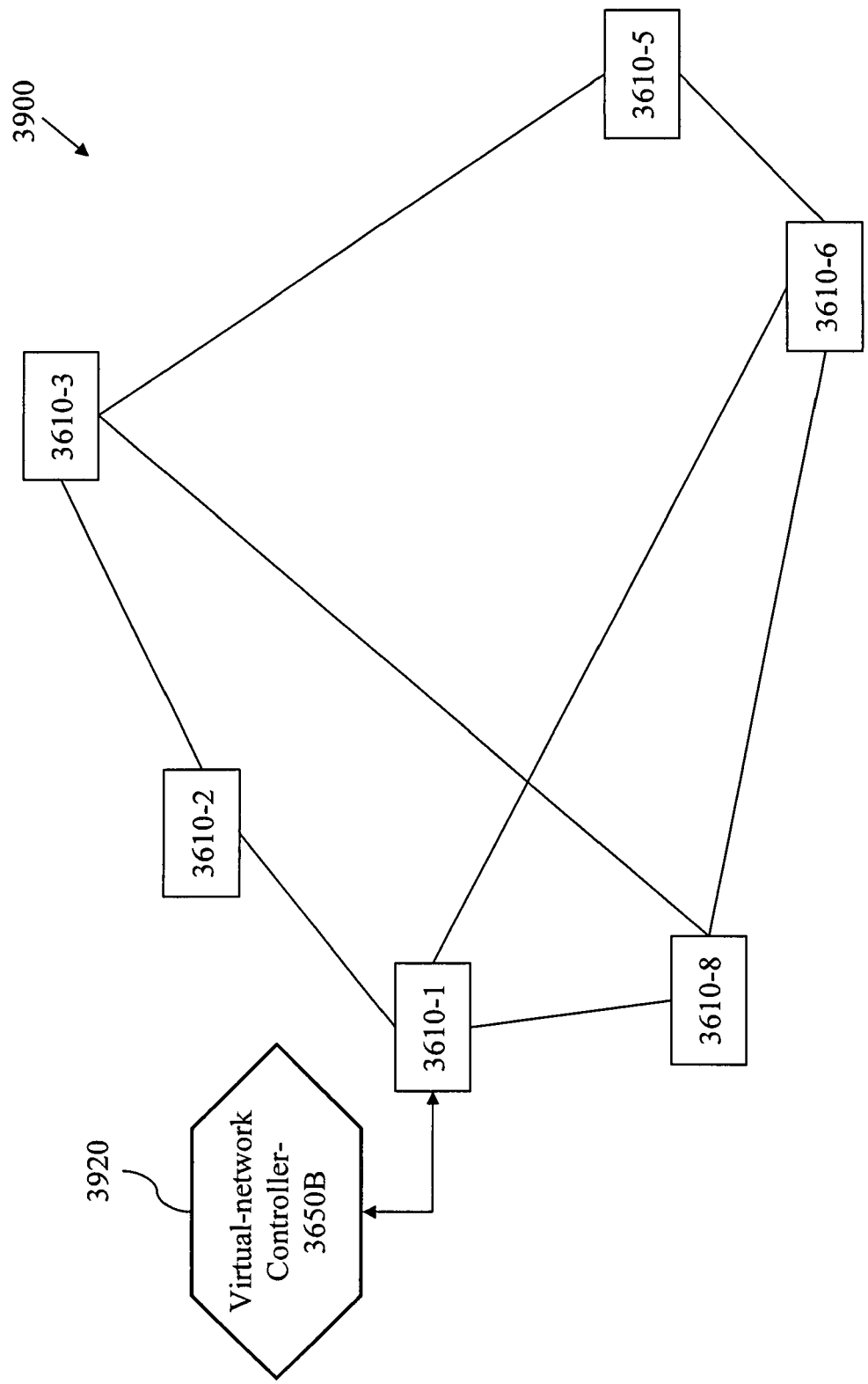
FIG. 39 illustrates a second virtual network embedded in the parent network of FIG. 36.

FIG. 39 illustrates another virtual network created through the two core nodes 3620-1 and 3620-2 with the flow-rate allocations for pairs of edge nodes corresponding to a demand matrix similar in structure to that of FIG. 37. The virtual-network comprises edge nodes 3610-1, 3610-2, 3610-3, 3610-5, 3610-6, and 3610-8, and its controller is connected to edge node 3610-1.

Figure 40:
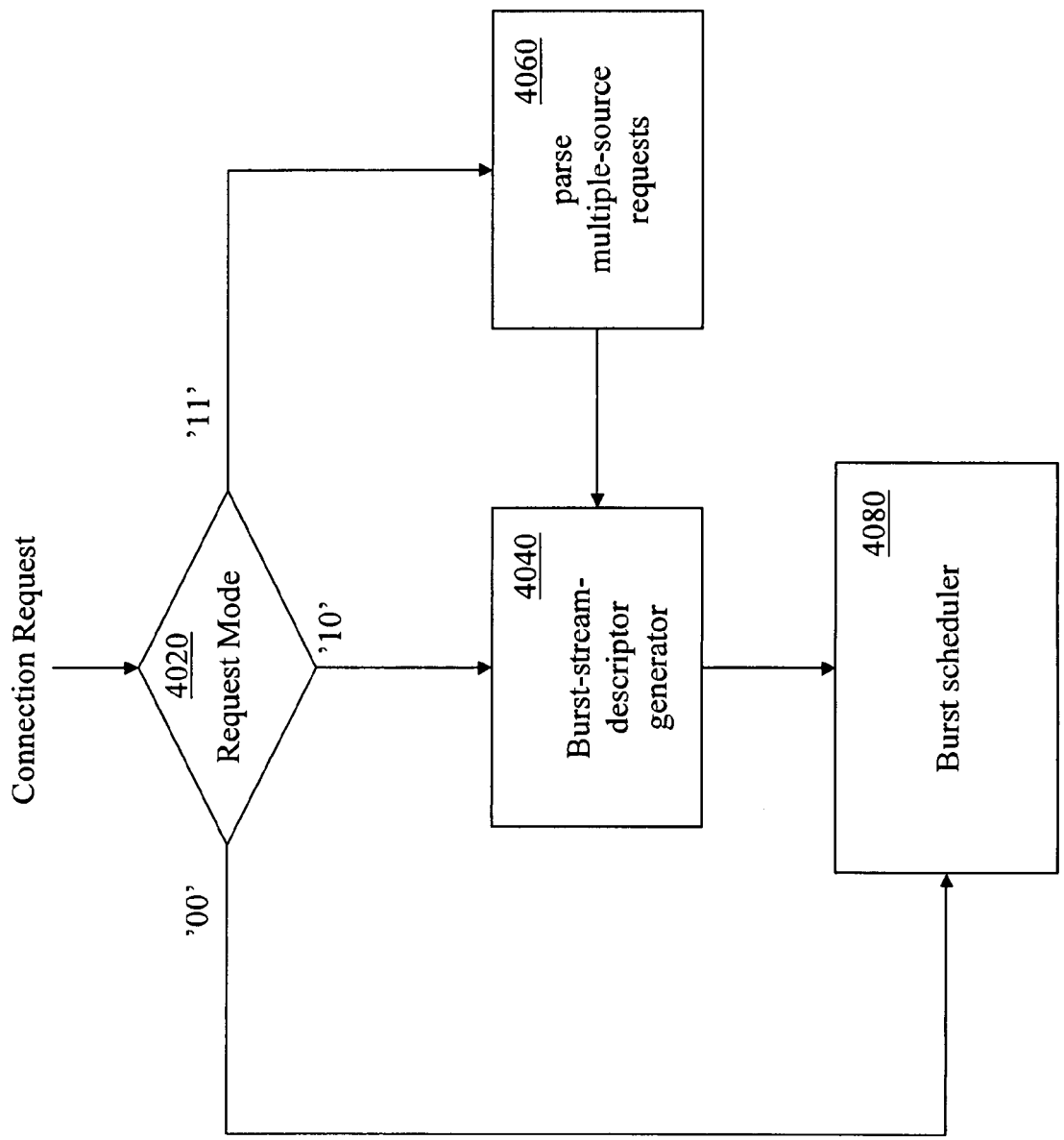
FIG. 40 illustrates steps of bimodal-burst-switching control associated with a multiple-source connection request, in accordance with an embodiment of the present invention.

FIG. 40 illustrates the logic used by a mechanism provided at a core-node controller for processing connection requests of different types. If a received connection request code is '00' (type-1), step 4020 directs the request to step 4080 for burst scheduling. If the code is '10', the controller interprets the request as a flow-rate-allocation request and directs the request to step 4040 where burst descriptors are generated then submitted to the scheduler 4080. If the code is '11', the received request is interpreted as a multiple-source multiple destination request. The request is parsed into constituent single-source multiple destination requests and each of the constituent requests is submitted to the burst scheduler which issues burst-transfer permits and distribute them to respective edge nodes. Each single-source multiple destination requests is treated at a respective core node as multiple single-source single destination requests.

Using techniques well known in the art, the virtual-network controller acquires an awareness of the network topology and, hence, can divide the multiple-source requests among the core nodes. The virtual-network controller preferably uses an optimizing algorithm to create an order of preference of a core node for each edge-node-pair.

A route set is a listing of selected routes from the source edge node to the sink edge node. A source edge node and a sink edge node define a "node-pair" and a route set is associated with each node pair. In order to facilitate the process of finding a route having a sufficient free capacity to accommodate a connection request, a route set for each edge-node pair is created and sorted according to a prescribed criterion. The derivation of the route set is an "off-line" process that need only be executed whenever relevant topological changes take place. The routes in a route set are sorted according to some route merit index. Each edge node maintains a route set and communicates same to the controller of the virtual network. The network 3600 may include several virtual networks, each having its own virtual-network controller 3650. An edge node need not be used exclusively for a specific virtual network; it may participate in more than one virtual network.

Figure 41:
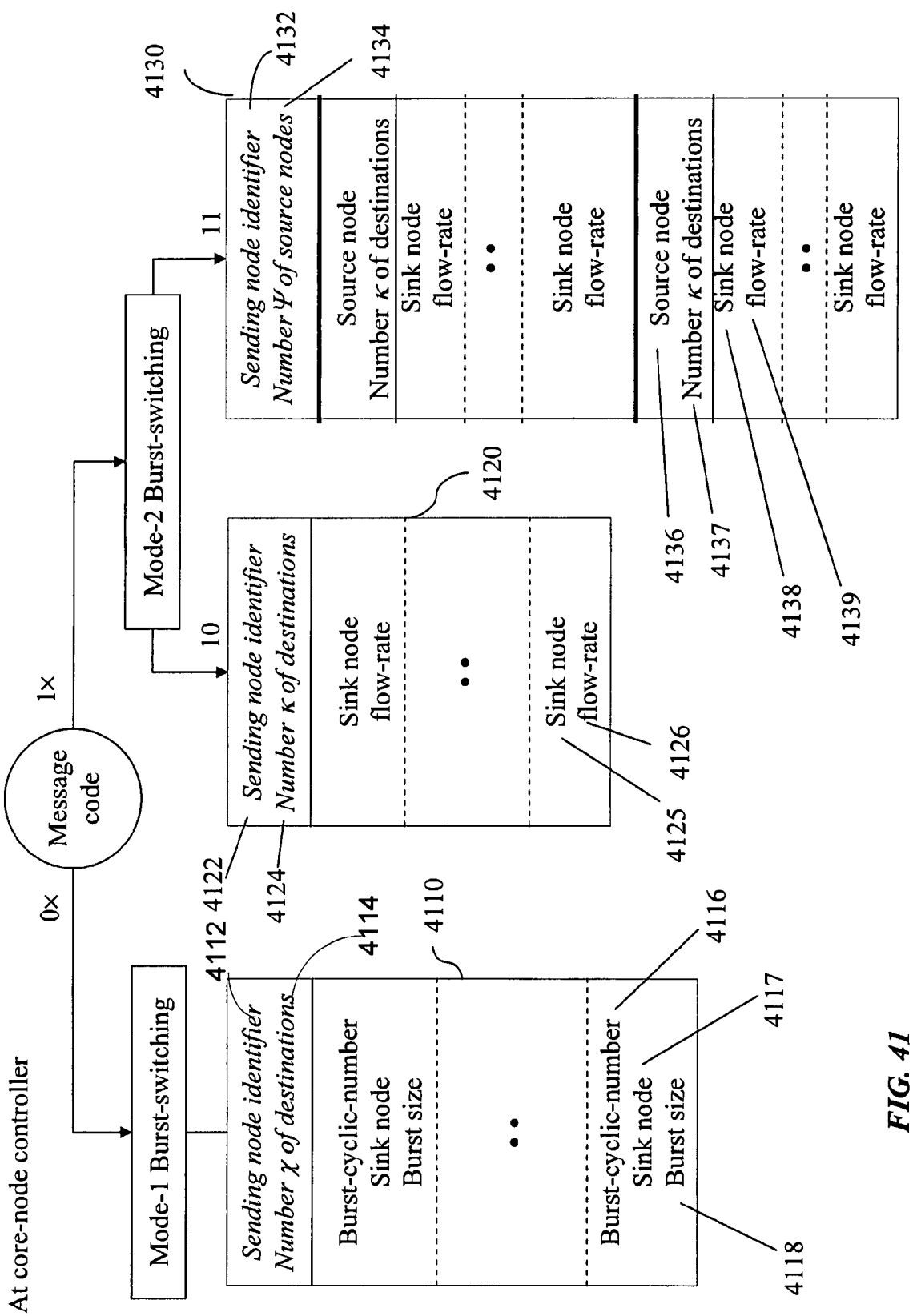
FIG. 41 illustrates structures of messages sent by an edge node to an optical core node to request connections according to a first-mode of burst switching and a second mode of burst switching with connections of the second mode including nodal connections and network connections in accordance with an embodiment of the present invention.

FIG. 41 illustrates the format of a control burst. A control burst includes two bits that identify the control-burst type. The first bit identifies the burst-switching mode, for example '0' indicates the first mode and '1' indicates the second mode. The second bit determines whether the request is a nodal request or a network request. Thus, the first two bits may be selected as '00' indicating a mode-1 burst-switching, '10' indicating a second-mode nodal switching, or '11' indicating a second-mode network request. A first-mode request is always a nodal request. A mode-1 network request is meaningless because it would require knowledge of the burst-sizes waiting at different edge nodes, other than the reporting edge node, and such information would not be available to the reporting edge node. For both type-2 and type-3 requests, releasing allocated capacity is done by specifying a flow-rate requirement of zero. One important advantage of mode-2 burst switching is the ease of increasing and reducing flow-rate allocations for edge-node pairs.

Following the 2-bit request-type field '00', a type-1 request has a field 4112 that contains an identifier of the reporting edge node and a field 4114 that indicates the number $\chi$ of destinations for which burst-scheduling is requested. These are followed by $\chi$ records, each record including a cyclic burst number 4116, relevant to the reporting edge node, a sink edge-node number 4117 to which a burst is destined from the reporting edge node, and a burst size 4118 expressed in a prescribed unit, for example bytes or a block of bytes.

Following the 2-bit request-type field '10', a type-2 request has a field 4122 that contains an identifier of the reporting edge node and a field 4124 that indicates the number κ of destinations for which burst-transfer permits are requested. These are followed by κ records, each record including a sink edge-node number 4125 to which a stream of bursts is destined from the reporting edge node and a required flow-rate 4126 expressed in a prescribed unit, for example units of 16 kilobits per second.

Following the 2-bit request-type field '11', a type-3 request has a field 4132 that contains an identifier of the reporting edge node and a field 4134 that indicates the number Ψ of source nodes for which flow-rate allocations to specified sink nodes are requested. These are followed by Ψ super-records, each super record including a field 4136 indicating an identifier of a source node followed by a field 4137 indicating the number κ of destination sink nodes for which flow-rate allocation from the source node are requested. These two fields are followed by κ records each including a sink edge-node number 4138 to which a stream of bursts is destined from the source node corresponding to the super record, and a required flow-rate 4139 expressed in a prescribed unit.

FIG. 42A and FIG. 42B illustrate two type-3 requests sent to core nodes 3640-1 and 3640-2, respectively, in order to realize the flow-rate-allocation requirements of matrix 3700 (FIG. 37) The virtual-network controller 3650 is aware of the topology of network 3600 and, in this example, it decided to seek capacity-allocation through the two core nodes 3620-1 and 3620-2 according to network connectivity. The request of FIG. 42A, which is directed to the controller of core node 3620-1, indicates, in a first field 4132 that the reporting source node is 3610-2, and in a second field 4134 it indicates that four super records follow. The first super record corresponds to source node 3610-1 and specifies three destinations. The three destinations are edge nodes 3610-2, 3610-3, and 3610-7, and the required flow-rates are 242, 1922, 820 units, respectively. The second super record corresponds to source node 3610-2 (which is also the reporting source node) and specifies two destinations 3610-3 and 3610-7, with flow-rate requirements of 1520 units and zero. Notably, the zero flow-rate requirement is sent by the virtual-node controller to release an existing path between source node 3610-2 and sink node 3610-7. The third and fourth super records are likewise interpreted.

The second type-3 request of FIG. 42B is sent from reporting source-node 3610-2 to the controller of core-node 3620-2. The parsing of the request follows the same process used to parse the request of FIG. 42A. A connection request can specify zero capacity requirement and, therefore, there is no need to send a release request when a connection is terminated.

In summary, a core node, or a core network comprising several core nodes, may be shared by several independent networks each having its own control system. An independent network, also called an embedded network or a virtual network, comprises edge nodes, a dynamic share of the core, and an exclusive configuration controller. An exclusive configuration controller may be centralized or distributed. An exclusive configuration controller of a given independent network preferably has means for determining flow-rate requirements for each directed pair of edge nodes in the given independent network and means for determining capacity requirements of paths between each edge node in the given independent network and each core node. An edge node may not need a path to each core node. The configuration controller communicates capacity requirements to respective edge nodes of its independent network and to respective core nodes. The capacity requirements may be determined by an automated network-sizing algorithm associated with the configuration controller so that the capacity requirements can be updated to follow spatial and temporal traffic-level fluctuations.

Each core node has a core controller for scheduling capacity requirements within the core node and communicating specifics of scheduled capacity to respective exclusive configuration controllers. An exclusive configuration controller may be associated with a selected edge node or a selected core node. The exclusive configuration controller may also comprise control modules associated with a selected edge node and a selected core node. A core node may host several exclusive configuration controllers or several modules of exclusive configuration controllers.

The invention thus provides methods and apparatus for controlling the transfer of data bursts of variable sizes so that data bursts traversing a network path from a source node to a sink node are constrained by an allocated bit rate. While data bursts are segmented and, where necessary, null-padded to facilitate switching at edge nodes, the data bursts are transferred across a network in their native form and rate regulated as such. The invention also enables the configuration of a bimodal loss-free burst-switching network that provides low-delay and high-efficiency. Finally, the invention enables the configuration of a multiplicity of virtual burst-switching networks within a parent high-capacity optical-core network.

Other modifications will be apparent to those skilled in the art and, therefore, the invention is defined in the claims.

What is claimed is:

1. A bimodal burst-switching network comprising a plurality of edge nodes each having an edge controller, said plurality of edge nodes connecting to at least one core node where at least one edge node:

determines proximity of the edge node to a selected core node;

selects a first-mode of burst transfer when said proximity is within a predefined proximity threshold; and selects a second-mode of burst transfer when said proximity is beyond said predefined proximity threshold;

wherein a controller of an outbound port of an edge node determined to be within said predefined proximity threshold from said selected core node:

forms data bursts;

sends descriptors of said data bursts to a core-node controller of said selected core node;

receives burst-transmission schedules from said core-node controller; and transmits said data bursts to said selected core node according to said burst-transmission schedules.

2. A bimodal burst-switching network comprising a plurality of edge nodes each having an edge controller, said plurality of edge nodes connecting to at least one core node where at least one edge node:

determines proximity of the edge node to a selected core node;

selects a first-mode of burst transfer when said proximity is within a predefined proximity threshold; and selects a second-mode of burst transfer when said proximity is beyond said predefined proximity threshold;

wherein a controller of an outbound port of an edge node not within said predefined proximity threshold from said selected core node:

sends flow-rate allocations to said core-node controller;

receives nominal burst descriptors and nominal-burst-transmission schedules from said core-node controller;

forms data bursts according to said nominal burst descriptors; and transmits said data bursts to said selected core node according to said burst-transmission schedules.

3. The network of claim 1 wherein said selected core node is a bufferless core node comprising an optical-switching fabric, a core controller, and means for exchanging time-locking measurements with at least one of said plurality of edge nodes, and wherein said proximity is determined as a function of propagation delay and service-quality criteria, where said service-quality criteria include burst-transfer delay.

4. The network of claim 3 wherein said proximity is determined as a function of propagation delay and flow-rate allocation.

5. The network of claim 3 wherein said proximity is determined as a function of propagation delay and storage capacity at said at least one edge node.

6. The network of claim 5 wherein said proximity is determined as the ratio $\rho \times \tau / \Lambda$ where $\rho$ is an allocated flow-rate for a burst stream, $\tau$ is a round-trip propagation delay between said selected edge node and said selected core node, and $\Lambda$ is the total size of an outbound buffer at a respective outbound port of said at least one edge node.

7. In a network comprising a plurality of independent bufferless core nodes interconnecting a plurality of edge nodes, each of said plurality of edge nodes having an edge-node controller and each of said core node having a core-node controller, a method of bimodal burst scheduling implemented by a first edge node selected from among said edge nodes, the method comprising steps of:

determining a total flow-rate requirement for a connection from said first edge node to at least one destination edge node;

selecting a candidate core node from among said core nodes through which to route the connection;

computing a proximity index of said first edge node with respect to said candidate core node; and selecting one of burst-transfer modes according to said proximity index wherein burst transfer according to a first mode of said burst transfer modes comprises steps of:

forming a data burst according to said total flow-rate requirement;

sending burst transfer requests, each specifying a destination edge node and a burst size, to said core controller; and receiving from a candidate core controller a schedule for burst transmission.

8. The method of claim 7 wherein burst transfer according to a second mode of said burst transfer modes includes steps of:

sending requests for flow-rate-allocations, each request specifying a destination edge node and a flow-rate requirement; and receiving from said candidate core node burst-transfer permits each specifying a burst-size limit, a destination, and a corresponding transmission time.

9. The method of claim 8 wherein said proximity index is determined as a function of service-quality criteria and a round-trip propagation delay between said first edge node and said candidate core node, said service quality criteria including burst-transfer delay.

10. The method of claim 9 wherein the proximity index is determined as the ratio of the round-trip propagation delay between said first edge node and said candidate core node to a prescribed delay tolerance.

11. The method of claim 10 wherein, when the proximity index does not exceed unity, said first mode is selected.

12. The method of claim 10 wherein, when the proximity index exceeds unity, said second mode is selected.

13. The method of claim 7 further comprising a step of first edge node time locking to said candidate core node, where time locking ensures that a burst transferred from said first edge node is timed to arrive at said candidate core node at an instant of time specified by said selected core node.

14. The method of claim 13 wherein said forming includes a step of aggregating data packets into said data burst of a size at least equal the sum of lengths of said data packets.

15. The method of claim 13 wherein each edge node aggregates data packets into a burst so that the sum of the length of said data packets does not exceed a specified burst-size limit.

16. The method of claim 10 further comprising computing a storage index based on a storage capacity at said first edge node, a flow-rate allocation and said round-trip propagation delay between said first edge node and said candidate core node.

17. The method of claim 16 including a further step of selecting said first mode if said proximity index is less than unity and said storage index is less than a predetermined threshold having a value less than unity.

* * * * *